United States Patent
Mizoshita et al.

(10) Patent No.: US 10,451,771 B2
(45) Date of Patent: Oct. 22, 2019

(54) ANTIREFLECTION MEMBER, TRANSFER MEMBER, AND METHOD FOR PRODUCING ANTIREFLECTION MEMBER

(71) Applicant: KABUSHIKI KAISHA TOYOTA CHUO KENKYUSHO, Nagakute-shi, Aichi (JP)

(72) Inventors: Norihiro Mizoshita, Nagakute (JP); Hiromitsu Tanaka, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 206 days.

(21) Appl. No.: 14/932,500

(22) Filed: Nov. 4, 2015

(65) Prior Publication Data

US 2016/0131802 A1    May 12, 2016

(30) Foreign Application Priority Data

Nov. 10, 2014  (JP) ................. 2014-228411
Oct. 20, 2015  (JP) ................. 2015-206065

(51) Int. Cl.
   *G02B 1/11*   (2015.01)
   *G02B 1/118*  (2015.01)

(52) U.S. Cl.
   CPC ............ *G02B 1/11* (2013.01); *G02B 1/118* (2013.01); *G02B 2207/109* (2013.01)

(58) Field of Classification Search
   CPC ...... G02B 1/11; G02B 2207/109; G02B 1/118
   See application file for complete search history.

(56) References Cited

U.S. PATENT DOCUMENTS

| 8,999,052 B2* | 4/2015 | Yabe ............... C01B 33/193 106/287.1 |
| 2008/0287288 A1* | 11/2008 | Ying ............... B82Y 10/00 502/159 |
| 2011/0268970 A1* | 11/2011 | Ying ............... B82Y 10/00 428/402 |
| 2012/0111400 A1* | 5/2012 | Wakefield ......... G02B 1/113 136/256 |
| 2012/0256336 A1 | 10/2012 | Yano et al. |
| 2013/0216807 A1* | 8/2013 | Wakefield ......... G02B 1/113 428/218 |

(Continued)

FOREIGN PATENT DOCUMENTS

| JP | H11-302561 A | 11/1999 |
| JP | 2002-006108 A | 1/2002 |

(Continued)

OTHER PUBLICATIONS

Sep. 1, 2017 Office Action issued in Japanese Patent Application No. 2015-206065.

(Continued)

*Primary Examiner* — Nathan L Van Sell
(74) *Attorney, Agent, or Firm* — Oliff PLC

(57) ABSTRACT

An antireflection member, including a resin base member; and a particle layer having mesoporous-silica nanoparticles directly fixed to a surface of the resin base member, wherein the nanoparticles are at least partially embedded in the surface of the resin base member, and the nanoparticles are arranged in a mono-particle layer to form the particle layer.

9 Claims, 27 Drawing Sheets

(56) References Cited

U.S. PATENT DOCUMENTS

| | | | |
|---|---|---|---|
| 2013/0323464 A1* | 12/2013 | Liang | C03C 17/42 |
| | | | 428/141 |
| 2015/0064405 A1* | 3/2015 | Koch, III | G02B 1/118 |
| | | | 428/147 |
| 2015/0079348 A1 | 3/2015 | Mizoshita et al. | |
| 2015/0138110 A1* | 5/2015 | Yairi | G06F 3/016 |
| | | | 345/173 |

FOREIGN PATENT DOCUMENTS

| | | |
|---|---|---|
| JP | 2009-040967 A | 2/2009 |
| JP | 2009-139796 A | 6/2009 |
| JP | 2010-217443 A | 9/2010 |
| JP | 2011-157506 A | 8/2011 |
| JP | 2012-097860 A | 5/2012 |
| JP | 2012-145748 A | 8/2012 |
| JP | 2012-173698 A | 9/2012 |
| JP | 2014-024219 A | 2/2014 |

OTHER PUBLICATIONS

Nov. 7, 2017 Office Action issued in Japanese Patent Application No. 2015-206065.

Feb. 20, 2018 Decision of Refusal issued in Japanese Patent Application No. 2015-206065.

Feb. 20, 2018 Decision to Decline the Amendment issued in Japanese Patent Application No. 2015-206065.

* cited by examiner

ANTIREFLECTION MEMBER, TRANSFER MEMBER, AND METHOD FOR PRODUCING ANTIREFLECTION MEMBER

BACKGROUND OF THE INVENTION

1. Field of the Invention

The present invention relates to an antireflection member, a transfer member, and a method for producing the antireflection member.

2. Related Background Art

Various types of anti-reflection films and antireflection materials have been studied from the past to prevent the reflection of light on a surface of an optical part or the like. For example, Japanese Unexamined Patent Application Publication No. 2009-40967 (Patent Document 1) discloses an antireflection base member on a surface of which a hardened coating of a resin composition for forming a low-refractive index coating containing low-refractive index particles comprising fine particles of mesoporous silica and a matrix formation material is formed. However, the antireflection base member disclosed in Patent Document 1 does not necessarily have a sufficient antireflection performance, although the mechanical properties thereof such as wear resistance are improved in comparison with those of an anti-reflection film comprising aggregations of fine particles of mesoporous silica.

Meanwhile, Japanese Unexamined Patent Application Publication No. 2011-157506 (Patent Document 2) discloses a coating film comprising: a matrix comprising a material which transmits visible light, such as a silane compound or a fluorine group-containing resin, and the like; and hollow mesoporous silica particles each having an silica-containing outer shell portion having a mesopores structure and a hollow portion present inside the outer shell portion and having an average primary particle diameter of 10 to 200 nm, as well as an anti-reflection film comprising the coating film. However, the anti-reflection film disclosed in Patent Document 2 does not necessarily have sufficient antireflection performance, because it is difficult to increase the porosity of the matrix portion.

SUMMARY OF THE INVENTION

Problems to be Solved by the Invention

The present inventors have examined antireflection materials in each of which an antireflection coating layer is coated (formed) on a surface of a resin base member, and found the following problems, in addition to the above-described problems. Specifically, the present inventors have found that an antireflection material in which a continuous film made of an antireflection coating layer is formed on a surface of a resin base member has the following problems. Specifically, when the antireflection material is heated or subjected to an external force by compression, bending, or the like, deformation (thermal expansion or mechanical deformation) of the resin base member occurs, which causes degradation or breakage of the antireflection coating layer or the like. For this reason, desired characteristics cannot be obtained, or such an antireflection material cannot be used as an antireflection material. Moreover, it has been also found that such a conventional antireflection material has a problem in that, to obtain desired optical characteristics, complicated control is required for the production, such as strict control of the film thickness at the application of an antireflection coating raw material liquid in the formation of the antireflection coating layer containing the nanoparticles, and hence it is difficult to apply such a conventional antireflection material to a resin part having a curved surface or a complicated shape.

The present invention has been made in view of the above-described problems, and an object of the present invention is to provide an antireflection member having a sufficiently good antireflection performance and a sufficiently high wear resistance and being excellent in durability against deformation of a base member. Another object of the present invention is to provide a method for producing an antireflection member which makes it possible to easily obtain the above-described antireflection member of the present invention and which can be easily applied also to a resin base member having a curved surface or a complicated shape, as well as a transfer member which can be used in the method to obtain an antireflection member in a simple and efficient manner.

Means for Solving the Problems

The present inventors have conducted intensive study to achieve the above-described objects, and consequently found that an antireflection member having a sufficiently good antireflection performance and a sufficiently high wear resistance and being excellent in durability against deformation of a base member can be obtained when the antireflection member is an antireflection member comprising: a resin base member; and a particle layer comprising mesoporous-silica nanoparticles directly fixed to a surface of the resin base member, wherein the nanoparticles are at least partially embedded in the surface of the resin base member, and the nanoparticles are arranged in a mono-particle layer to form the particle layer. This finding has led to the completion of the present invention.

Specifically, the antireflection member of the present invention comprises:

a resin base member; and a particle layer comprising mesoporous-silica nanoparticles directly fixed to a surface of the resin base member, wherein the nanoparticles are at least partially embedded in the surface of the resin base member, and the nanoparticles are arranged in a mono-particle layer to form the particle layer.

In the antireflection member of the present invention, the nanoparticles preferably have an average particle diameter of 50 to 300 nm, and an average value of depths of portions of the nanoparticles embedded in the surface of the resin base member is preferably 5 to 70% of the average particle diameter.

Meanwhile, a transfer member of the present invention comprises:

a release base member; and mesoporous-silica nanoparticles provisionally fixed to a surface of the release base member in a detachable state, while forming a mono-particle layer.

In the transfer member of the present invention, the nanoparticles preferably have an average particle diameter of 50 to 300 nm, and an average value of depths of portions of the nanoparticles embedded in the surface of the release base member is preferably 2 to 20% of the average particle diameter.

A method for producing an antireflection member of the present invention comprises the steps of:

embedding mesoporous-silica nanoparticles arranged on a surface of a resin base member at least partially in the surface of the resin base member placed in a flowable polymer state; and fixing the nanoparticles directly to the surface of the resin base member by hardening the surface of the resin base member in the flowable polymer state to obtain the above-described antireflection member of the present invention.

The method for producing an antireflection member of the present invention preferably further comprises the step of removing mesoporous-silica nanoparticles which have not been fixed to the surface of the resin base member.

In addition, in the method for producing an antireflection member of the present invention, the surface of the resin base member is preferably plasticized into the flowable polymer state by subjecting the surface of the resin base member to at least one plasticizing treatment selected from the group consisting of a solvent vapor treatment, a heat treatment, and a gas treatment.

Moreover, in the method for producing an antireflection member of the present invention, it is preferable that the resin base member comprise a thermosetting resin or a light-curable resin, and that the nanoparticles be arranged on the surface of the resin base member in an unhardened and flowable polymer state, and be at least partially embedded in the surface.

In addition, the method for producing an antireflection member of the present invention preferably further comprises the step of bringing the transfer member of the present invention into contact with the resin base member to arrange the mesoporous-silica nanoparticles on the surface of the resin base member by transfer.

Note that, although it is not exactly clear why the anti-reflection member of the present invention and the production method can achieve the above-described objects, the present inventors speculate as follows.

Specifically, in the present invention, the antireflection member comprises the particle layer comprising the mesoporous-silica nanoparticles at least partially embedded in and directly fixed to the surface of the resin base member. Accordingly, the present inventors speculate that since the mesoporous-silica nanoparticles having large surface areas are at least partially embedded in the resin and directly fixed to the resin base member, the resin and the nanoparticles are firmly bonded to each other. The present inventors speculate that, for this reason, even when the surface of the resin substrate is abraded with a cloth or the like, the nanoparticles on the surface of the resin base member are not easily peeled off, and hence an excellent wear resistance can be exhibited.

In addition, the present inventors speculate that the sufficiently good antireflection performance can be obtained, because the refractive index of the nanoparticles themselves is reduced owing to the mesoporous structure of the mesoporous-silica nanoparticles, and because a sharp change in the refractive index is reduced by the resin of the resin base member partially entering the nanoparticles.

Moreover, in the present invention, since the nanoparticles are arranged in a mono-particle layer to form the particle layer on the surface of the resin base member in the antireflection member, the mesoporous-silica nanoparticles are moderately exposed on the surface of the antireflection member to form a rugged structure having raised portions with moderate heights. The present inventors speculate that, for this reason, the antireflection performance is improved, without impairing the wear resistance.

In addition, in the antireflection member of the present invention, the individual and independent nanoparticles are fixed to the surface of the resin base member, and these nanoparticles are arranged in a single-particle layer (mono-particle layer) to form the particle layer. For this reason, the antireflection member of the present invention is resistant to degradation and breakage, even when deformation (thermal expansion, mechanical deformation, or the like) of the resin base member occurs, and hence the antireflection member is excellent in durability. Accordingly, the antireflection member of the present invention can be applied to a resin part having a curved surface or a complicated shape, a flexible substrate, or the like.

In the method for producing an antireflection member of the present invention, the mesoporous-silica nanoparticles arranged on a surface of a resin base member are at least partially embedded in the surface of the resin base member placed in a flowable polymer state. Since the mesoporous-silica nanoparticles have large surface areas, the nanoparticles are firmly bonded to the resin, when embedded in the surface of the resin base member placed in the flowable polymer state. When the nanoparticles are directly fixed to the surface of the resin base member by hardening the surface of the resin base member in the flowable polymer state, the resin and the nanoparticles are firmly and directly fixed to each other. The present inventors speculate that, in this manner, the above-described antireflection member of the present invention can be easily obtained.

In addition, in the method for producing an antireflection member of the present invention, the thickness of the thus formed layer which exhibits an antireflection effect is specified by using the particle diameters of the nanoparticles, and hence it is not necessary to precisely control the thickness in the formation of the particle layer. The present inventors speculate that, for this reason, the above-described antireflection member of the present invention can be easily fabricated, and the method for producing an antireflection member of the present invention can be easily applied also to a resin base member having a curved surface or a complicated shape.

Moreover, in the transfer member of the present invention, the mesoporous-silica nanoparticles are provisionally fixed to the surface of the release base member in a detachable state, while forming a mono-particle layer. For this reason, the mesoporous-silica nanoparticles can be efficiently arranged in a mono-particle layer on a surface of a resin base member by a simple transfer method in which the transfer member is brought into contact with the resin base member. For this reason, the use of the transfer member of the present invention in the above-described method for producing an antireflection member of the present invention makes it possible to obtain the antireflection member of the present invention in a simple and efficient manner. The transfer member of the present invention is especially effective, for example, when a thermosetting resin or a light-curable resin, which is liquid before curing but forms an insoluble cross-linked product after curing, is used for a resin base member to which the mesoporous-silica nanoparticles are transferred. Moreover, by using a flexible release base member as the release base member from which the mesoporous-silica nanoparticles are transferred, the mesoporous-silica nanoparticles can be efficiently arranged in a mono-particle layer also on a resin base member having a curved surface or a spherical surface.

Effects of the Invention

According to the present invention, it is possible to provide an antireflection member having a sufficiently good antireflection performance and a sufficiently high wear resistance and being excellent in durability against deformation of a base member. In addition, according to the present invention, it is possible to provide a method for producing an antireflection member which makes it possible to easily obtain the above-described antireflection member of the present invention and which can be easily applied also to a resin base member having a curved surface or a complicated shape, as well as a transfer member which can be used in the method to obtain an antireflection member in a simple and efficient manner.

Figure 7:
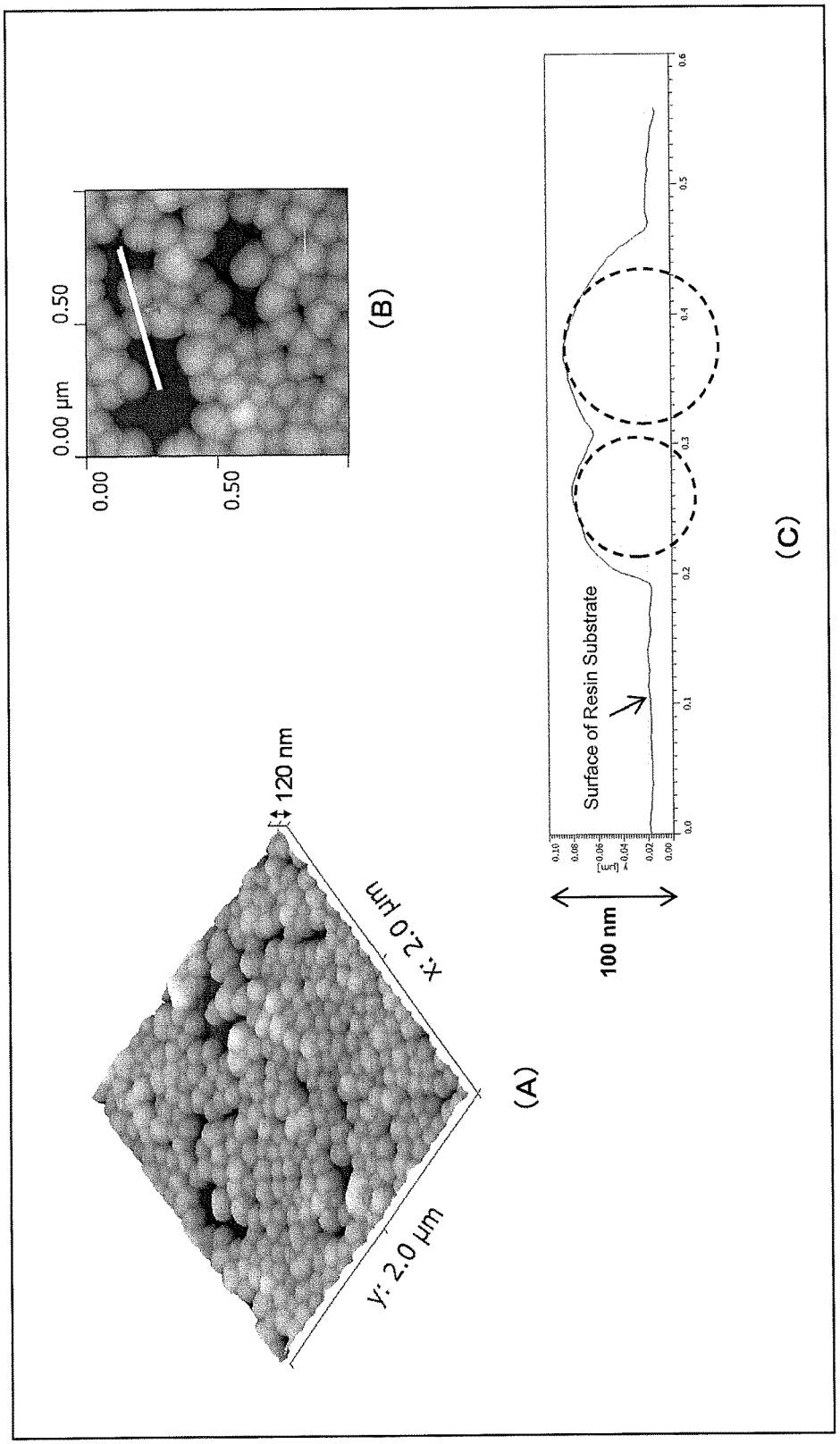

Part (A) of FIG. 7 is an atomic force microscope observation image (AFM image) of an antireflection member obtained in Example 1 of the present invention, part (B) of FIG. 7 is an enlarged AFM image of a portion of part (A), and part (C) of FIG. 7 is a graph showing a height profile of the white line segment in part (B).

Figure 8:
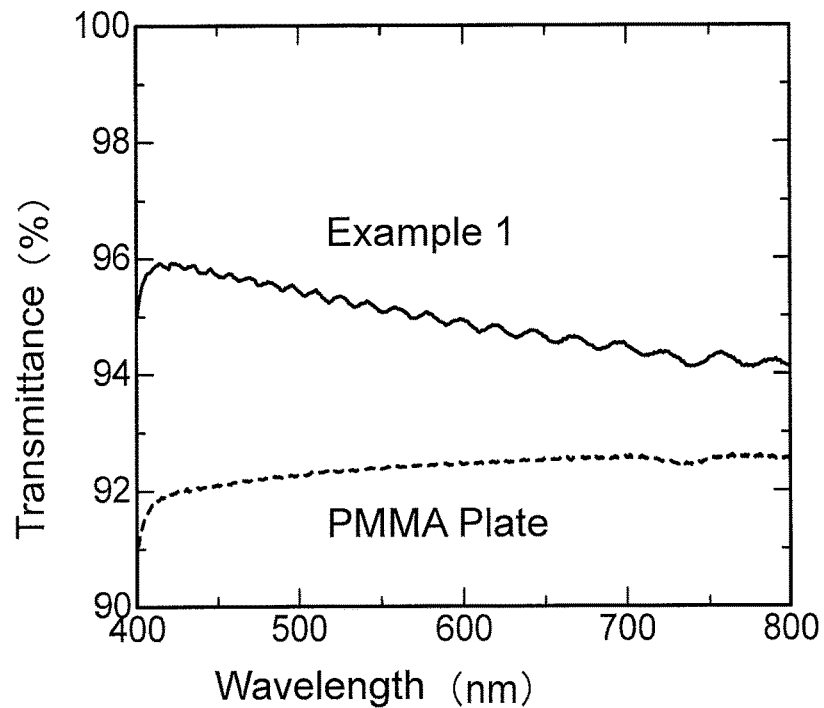

FIG. 8 is a graph showing wavelength dependence of light transmittance of the antireflection member obtained in Example 1.

Figure 9:
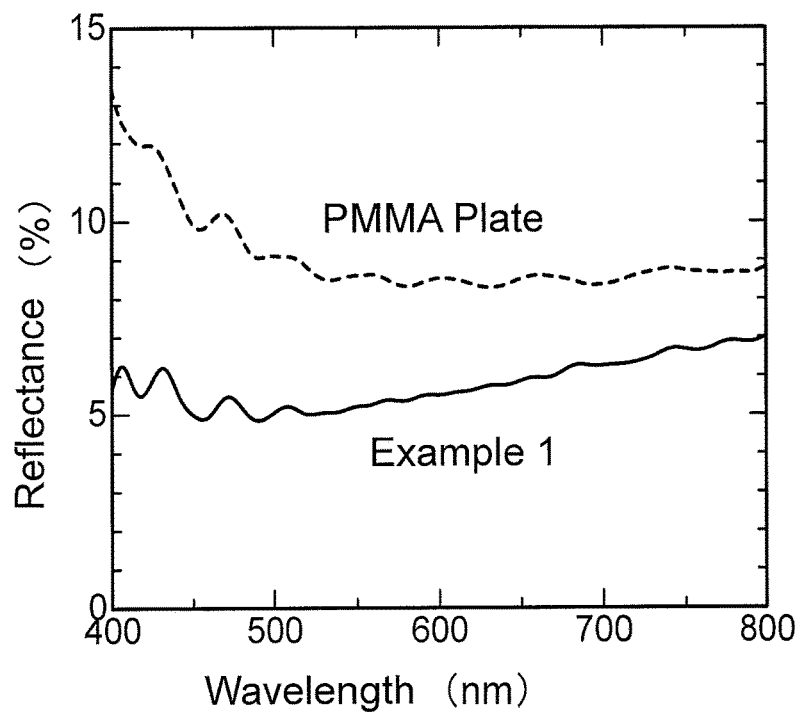

FIG. 9 is a graph showing wavelength dependence of light reflectance of the antireflection member obtained in Example 1.

Figure 10:
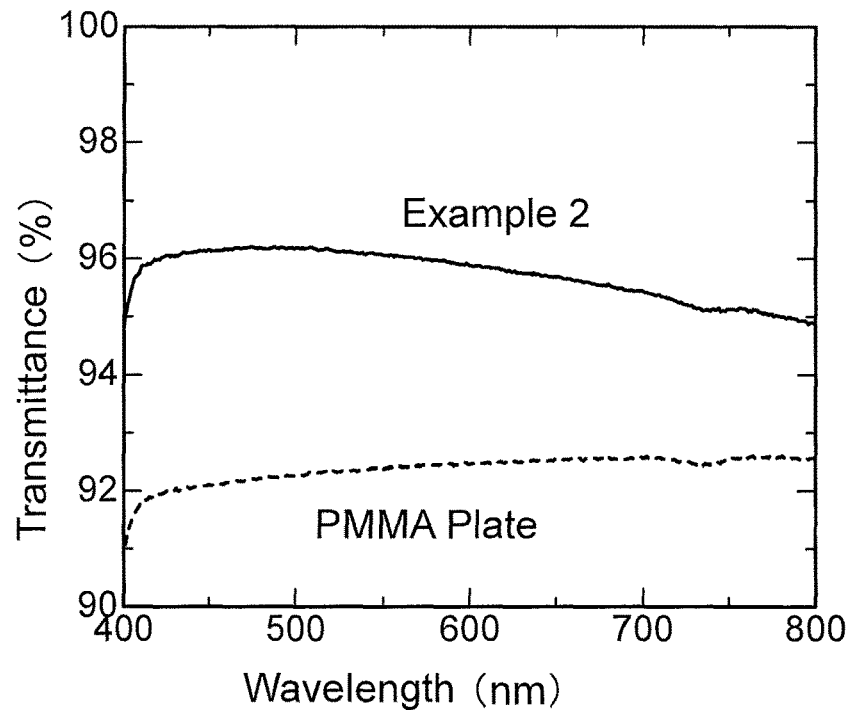

FIG. 10 is a graph showing wavelength dependence of light transmittance of an antireflection member obtained in Example 2.

Figure 11:
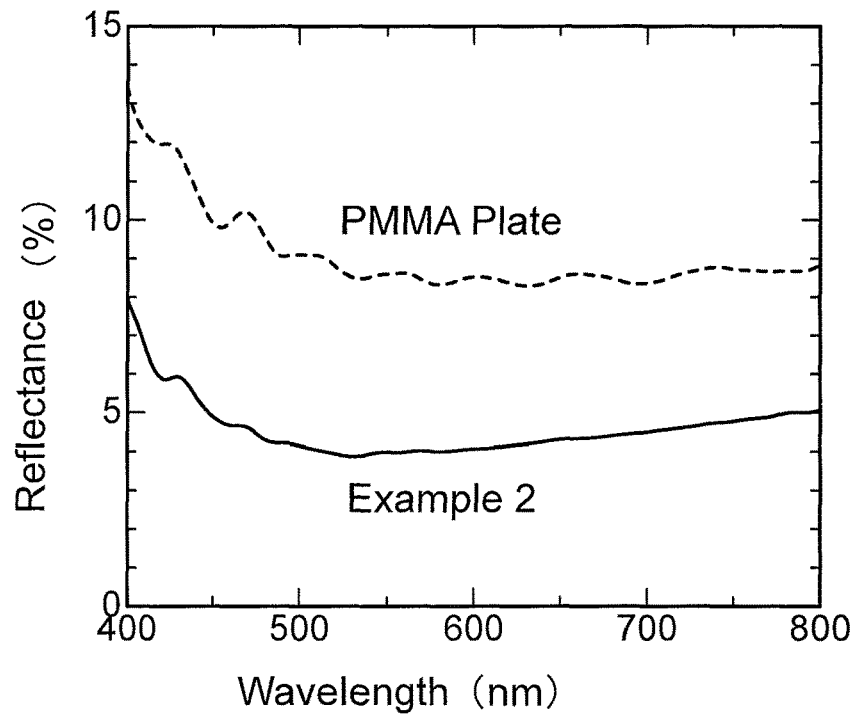

FIG. 11 is a graph showing wavelength dependence of light reflectance of the antireflection member obtained in Example 2.

Figure 12:
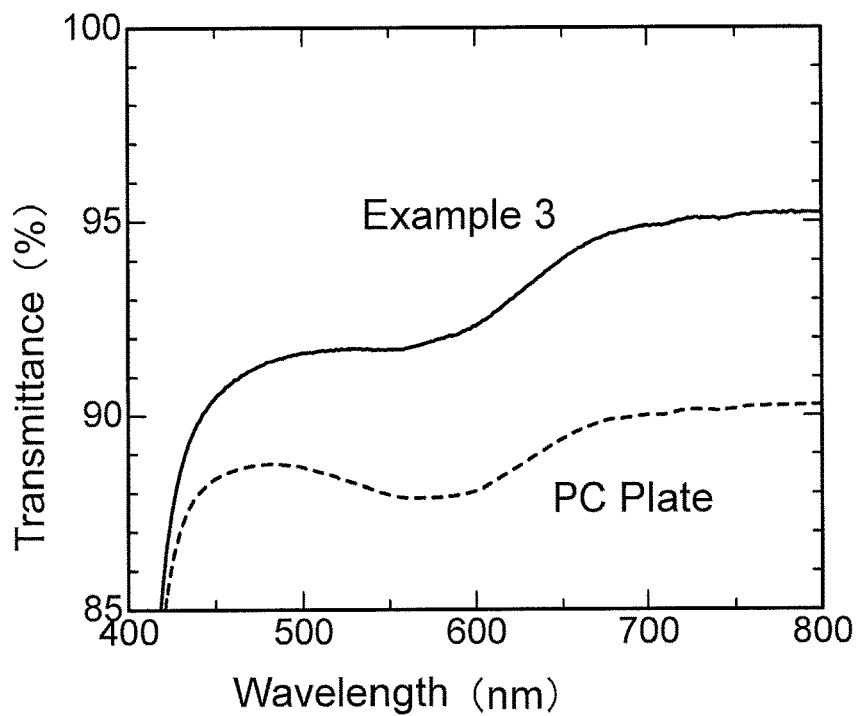

FIG. 12 is a graph showing wavelength dependence of light transmittance of an antireflection member obtained in Example 3.

Figure 13:
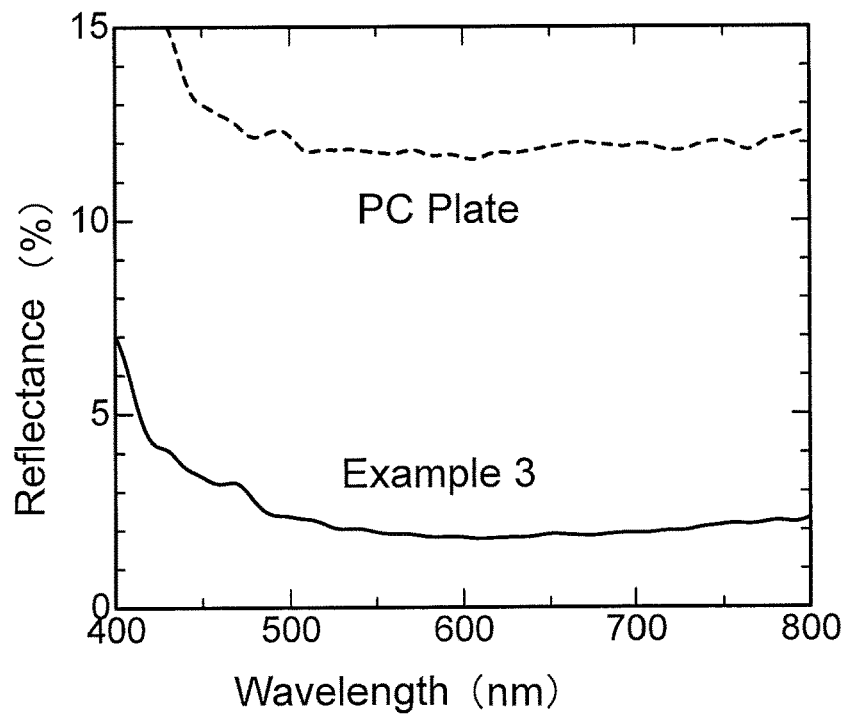

FIG. 13 is a graph showing wavelength dependence of light reflectance of the antireflection member obtained in Example 3.

Figure 14:
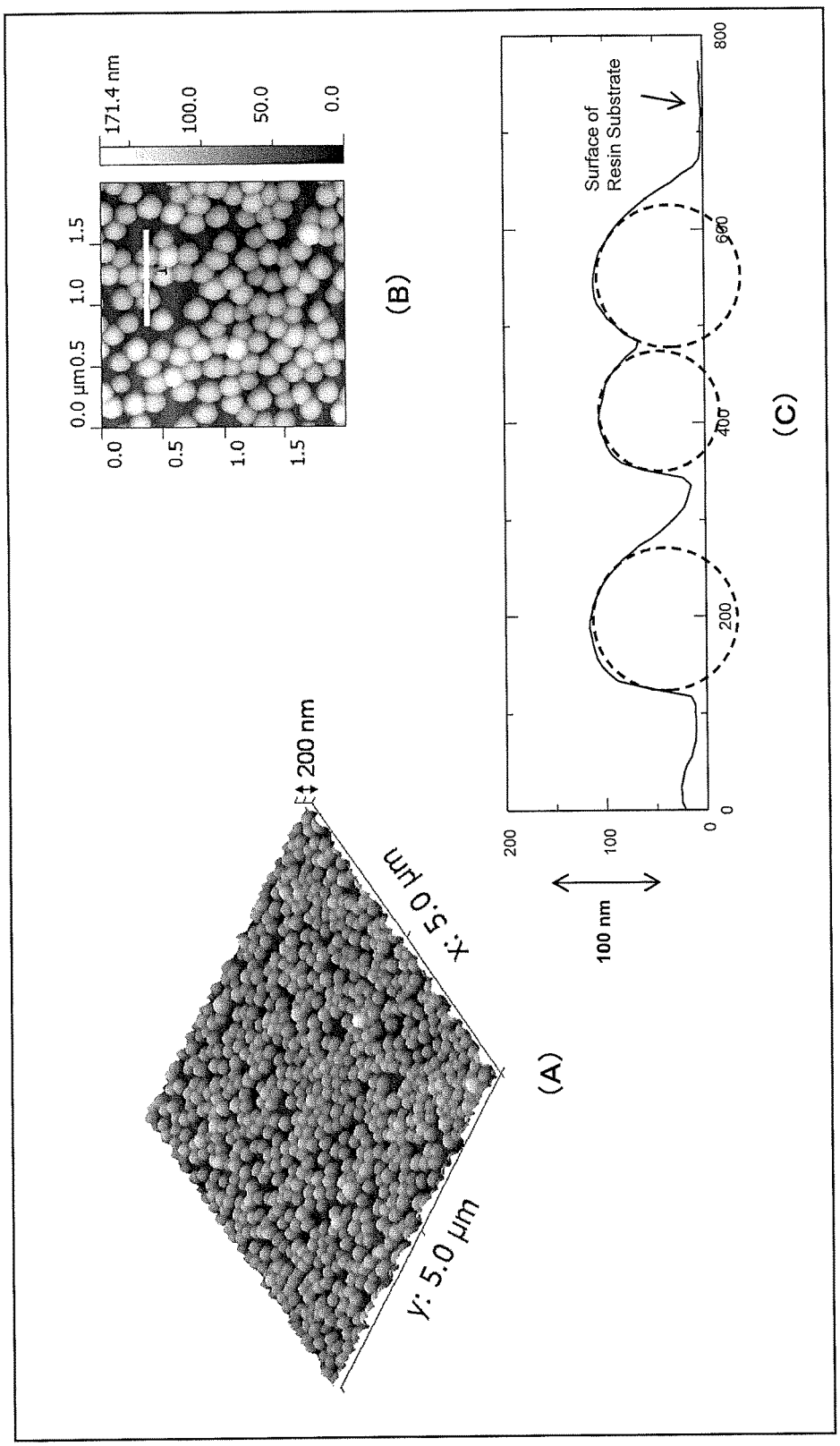

Part (A) of FIG. 14 is an atomic force microscope observation image (AFM image) of an antireflection member obtained in Example 4 of the present invention, part (B) of FIG. 14 is an enlarged AFM image of a portion of part (A), and part (C) of FIG. 14 is a graph showing a height profile of the white line segment in part (B).

Figure 15:
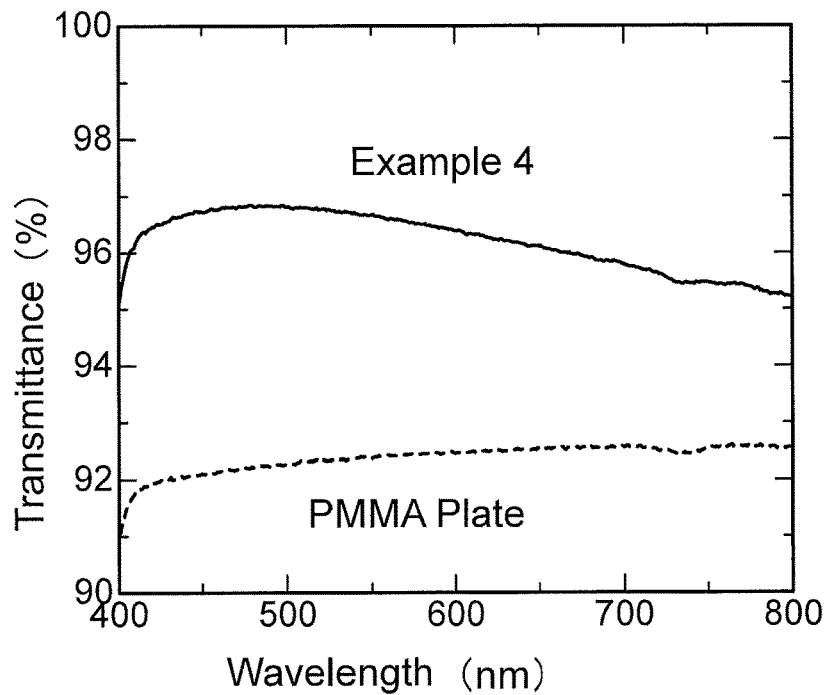

FIG. 15 is a graph showing wavelength dependence of light transmittance of the antireflection member obtained in Example 4.

Figure 16:
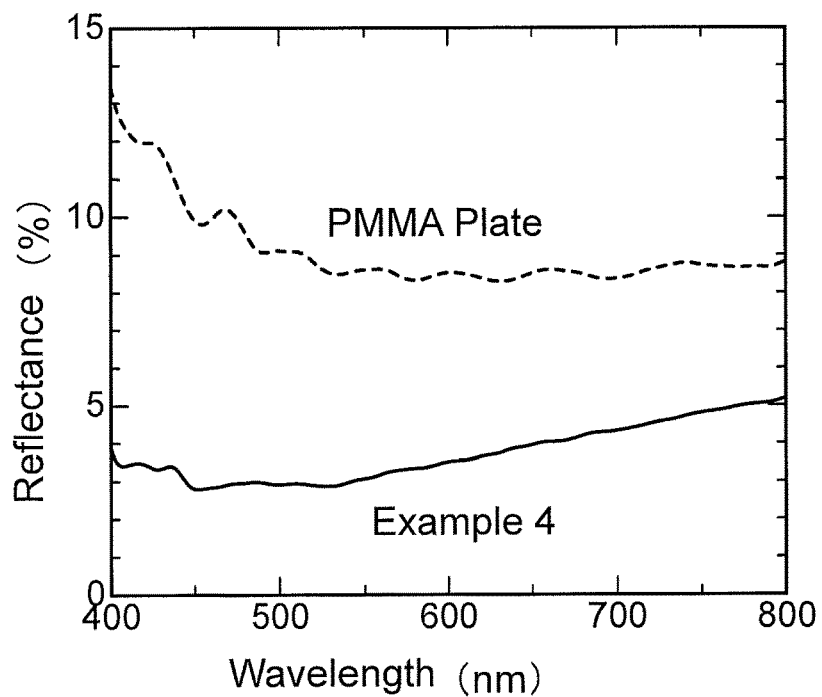

FIG. 16 is a graph showing wavelength dependence of light reflectance of the antireflection member obtained in Example 4.

Figure 17:
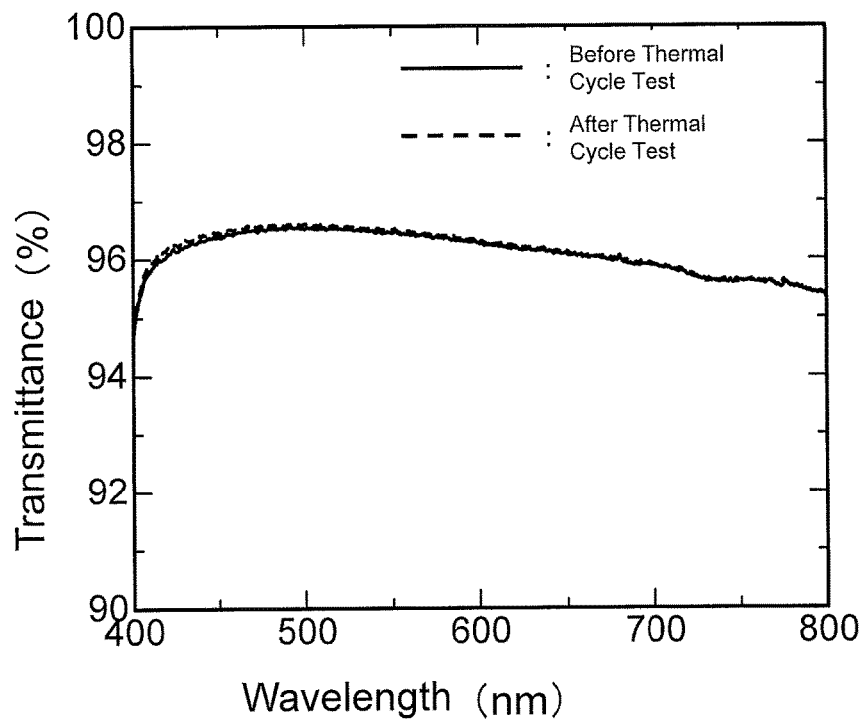

FIG. 17 is a graph showing results of a thermal cycle test of the antireflection member obtained in Example 4.

Figure 18:
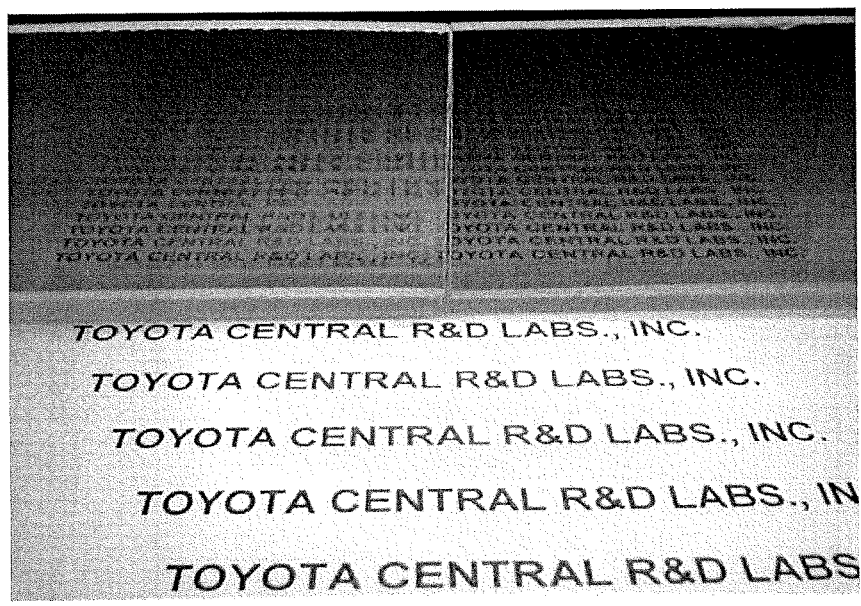

FIG. 18 is a photograph of fine patterns formed on a substrate of the antireflection member obtained in Example 4 and on a PMMA resin substrate of Reference Example 1 on each of which light scattered by paper on which letters are written is cast.

Figure 19:
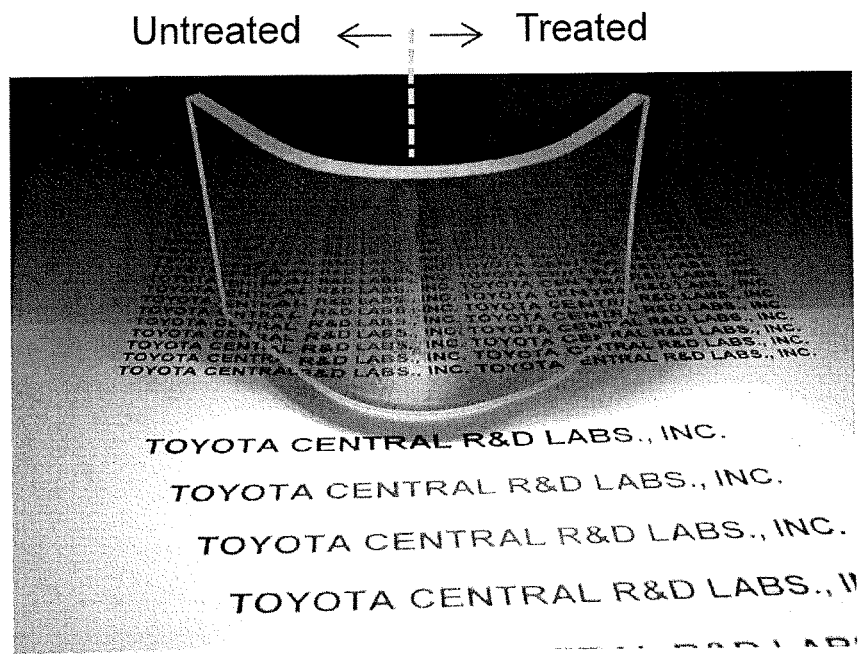

FIG. 19 is a photograph of fine patterns formed on a substrate of the antireflection member obtained in Example 5 and on a PMMA resin substrate having a curved surface of Reference Example 3 on each of which light scattered by paper on which letters are written is cast.

Figure 20:
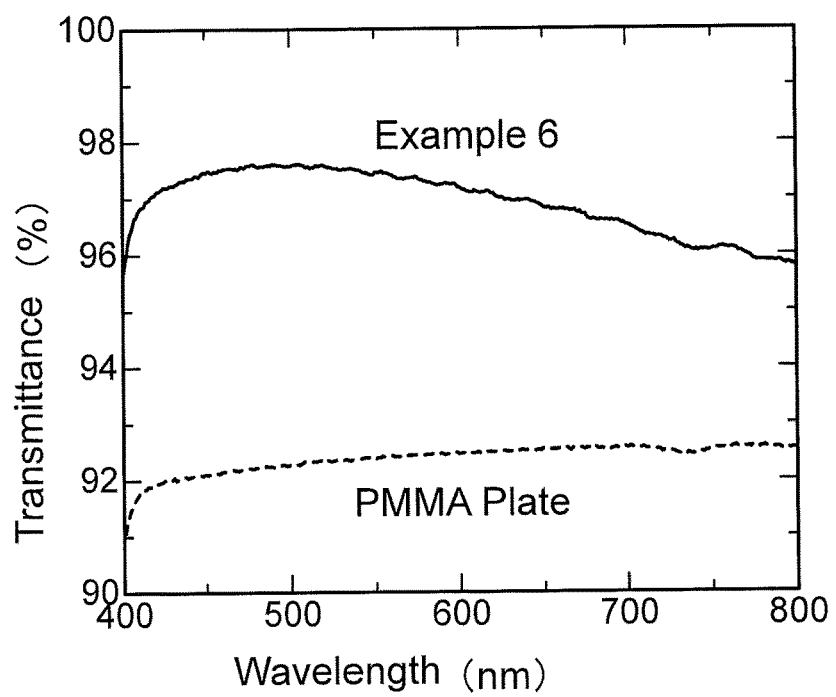

FIG. 20 is a graph showing wavelength dependence of light transmittance of an antireflection member obtained in Example 6.

Figure 21:
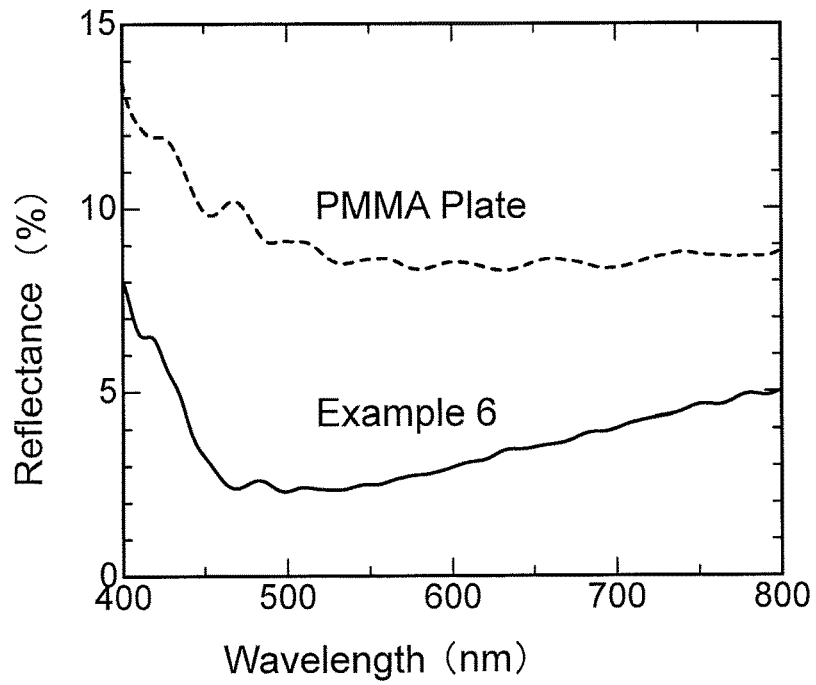

FIG. 21 is a graph showing wavelength dependence of light reflectance of the antireflection member obtained in Example 6.

Figure 22:
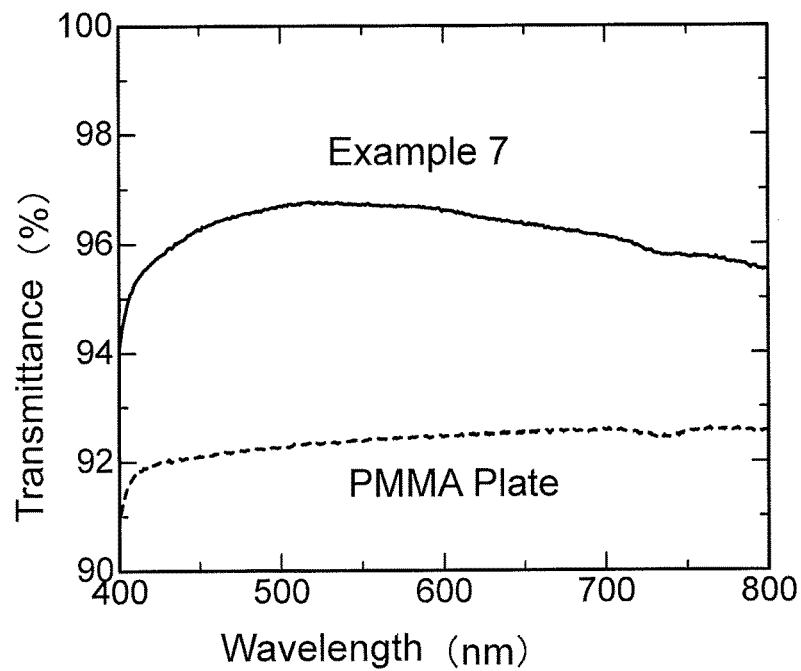

FIG. 22 is a graph showing wavelength dependence of light transmittance of an antireflection member obtained in Example 7.

Figure 23:
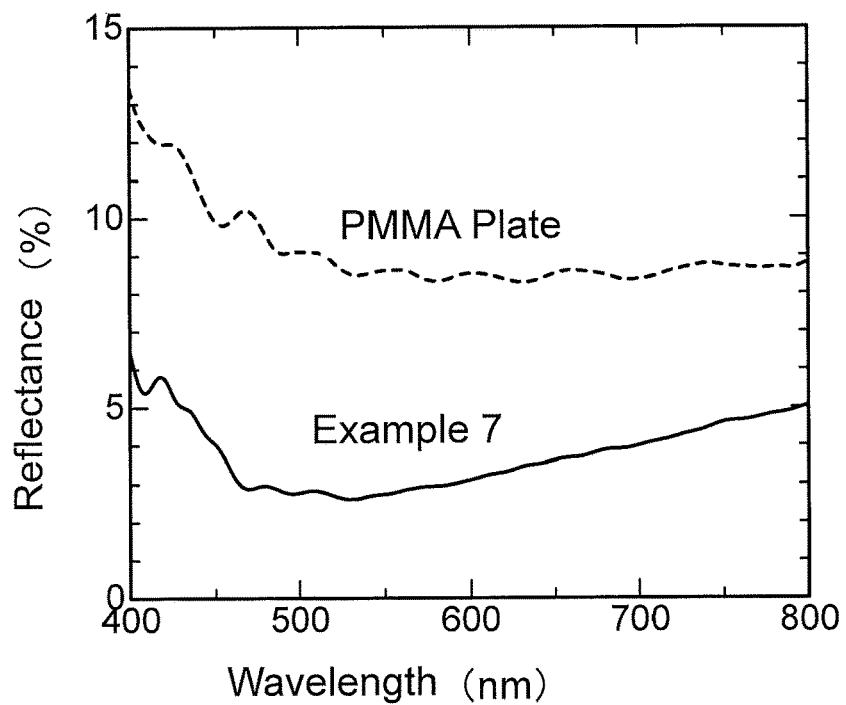

FIG. 23 is a graph showing wavelength dependence of light reflectance of the antireflection member obtained in Example 7.

Figure 24:
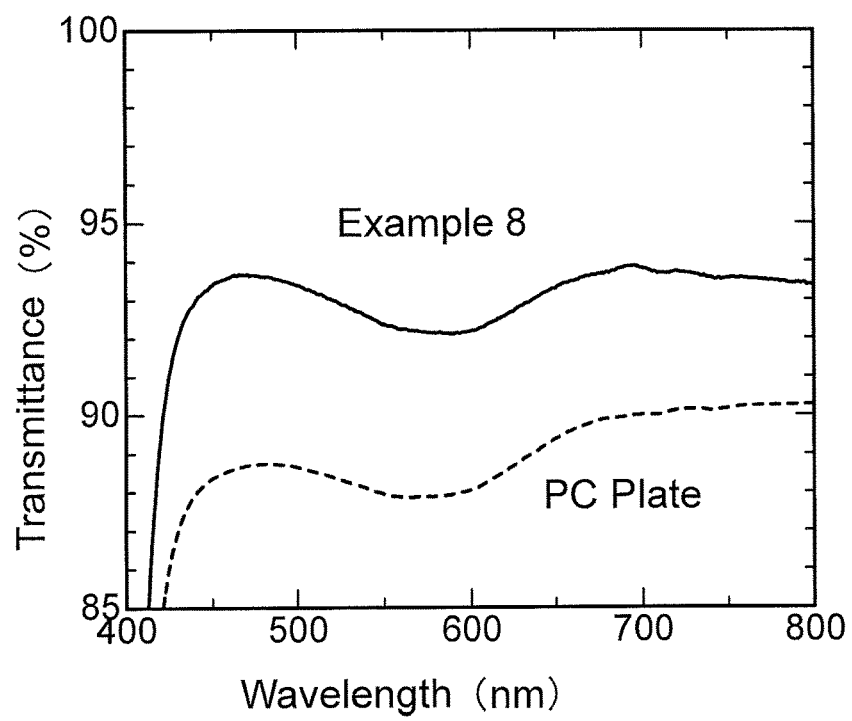

FIG. 24 is a graph showing wavelength dependence of light transmittance of an antireflection member obtained in Example 8.

Figure 25:
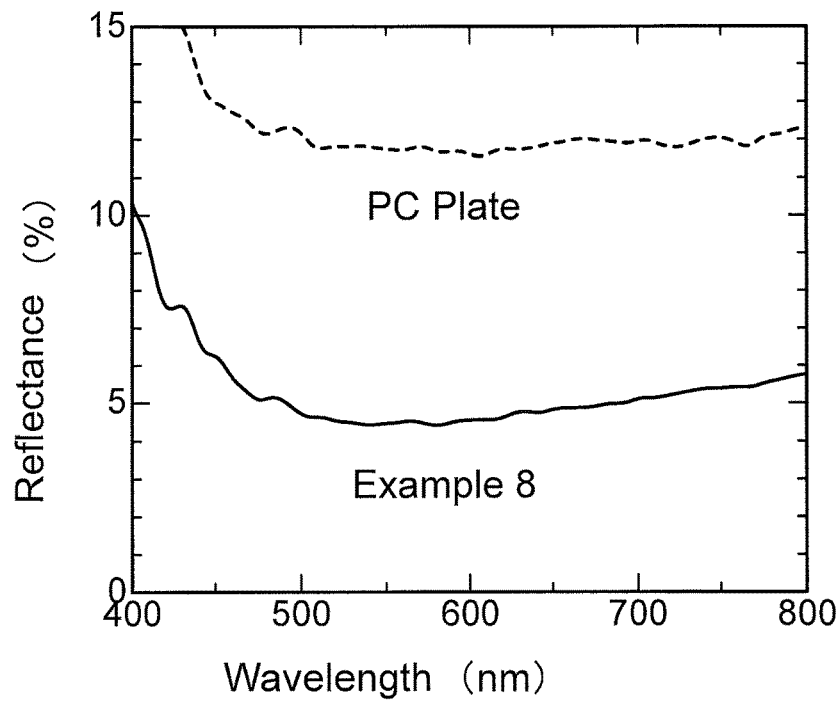

FIG. 25 is a graph showing wavelength dependence of light reflectance of the antireflection member obtained in Example 8.

Figure 26:
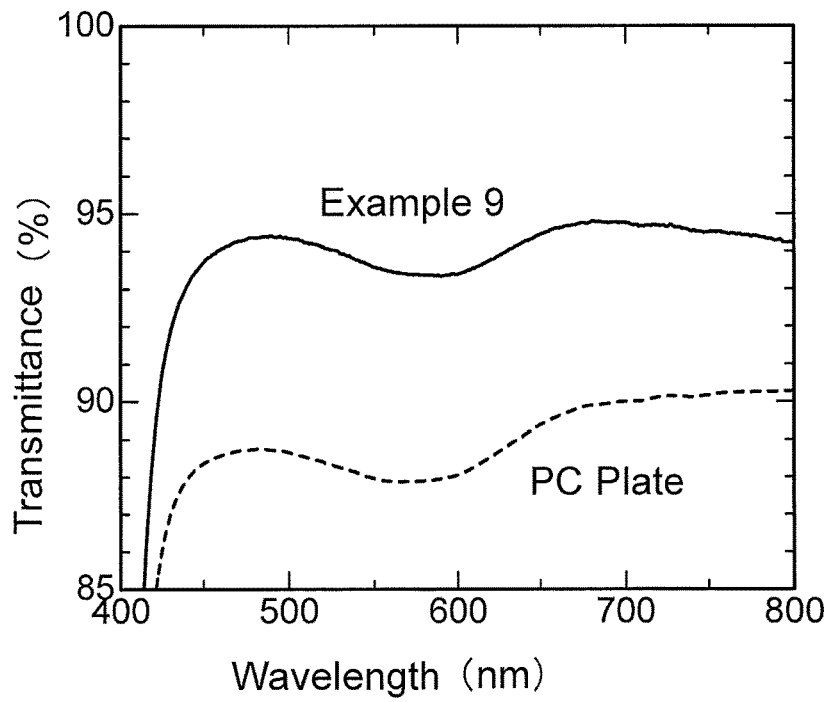

FIG. 26 is a graph showing wavelength dependence of light transmittance of an antireflection member obtained in Example 9.

Figure 27:
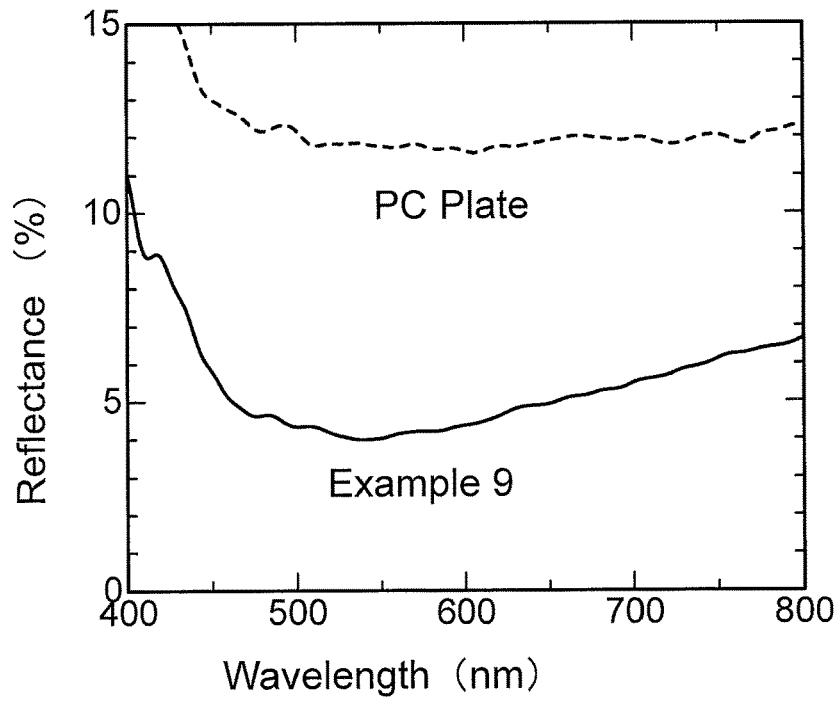

FIG. 27 is a graph showing wavelength dependence of light reflectance of the antireflection member obtained in Example 9.

Figure 28:
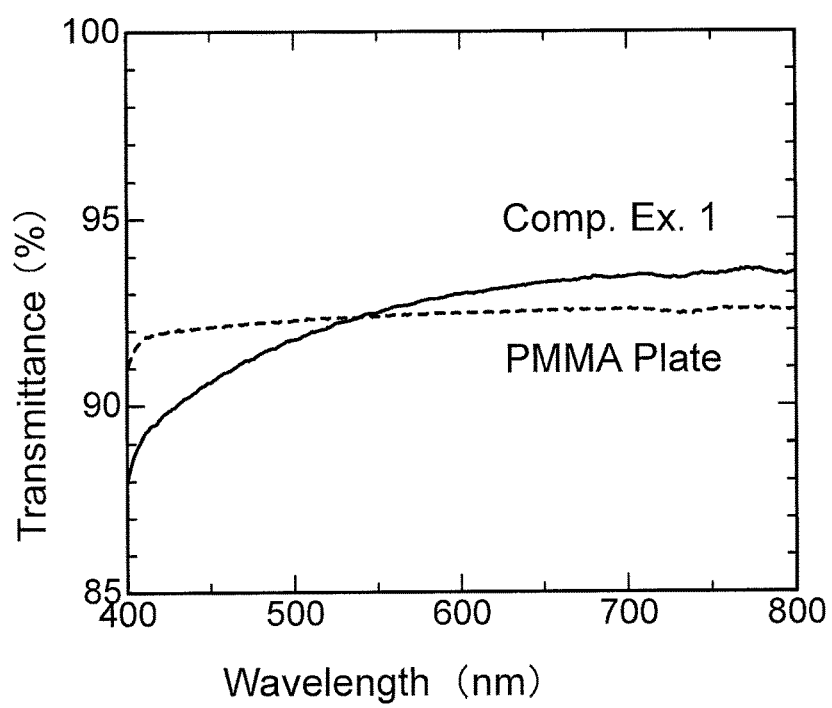

FIG. 28 is a graph showing wavelength dependence of light transmittance of a material for comparison obtained in Comparative Example 1.

Figure 29:
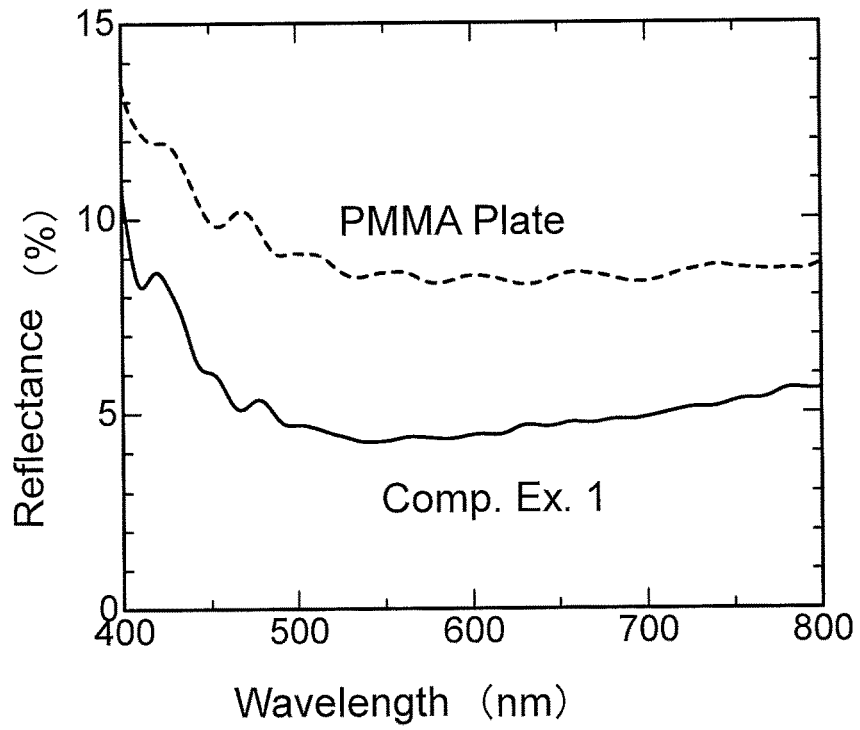

FIG. 29 is a graph showing wavelength dependence of light reflectance of the material for comparison obtained in Comparative Example 1.

Figure 30:
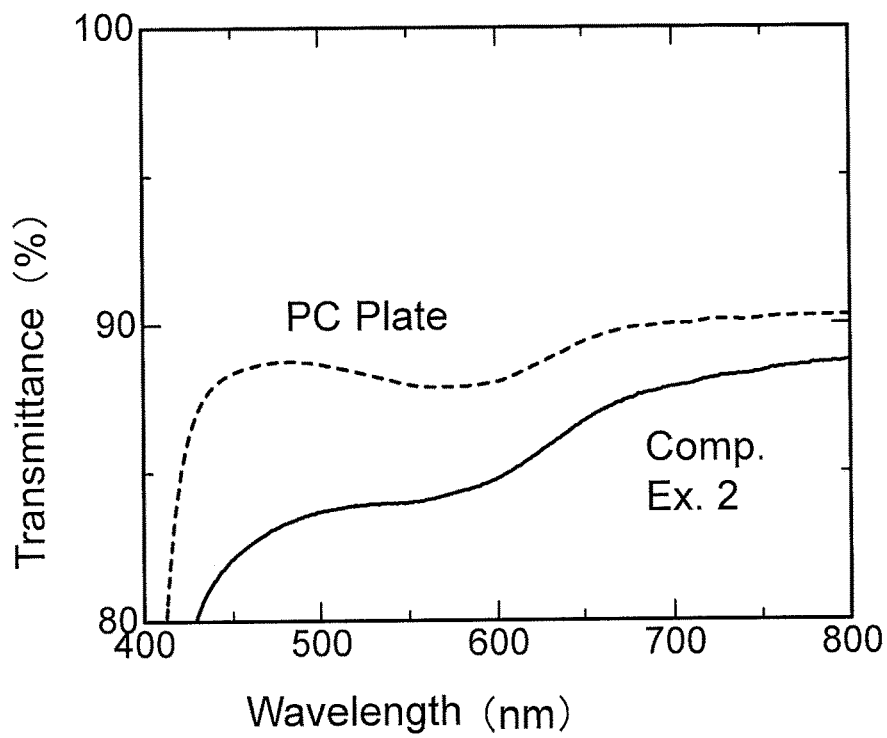

FIG. 30 is a graph showing wavelength dependence of light transmittance of a material for comparison obtained in Comparative Example 2.

Figure 31:
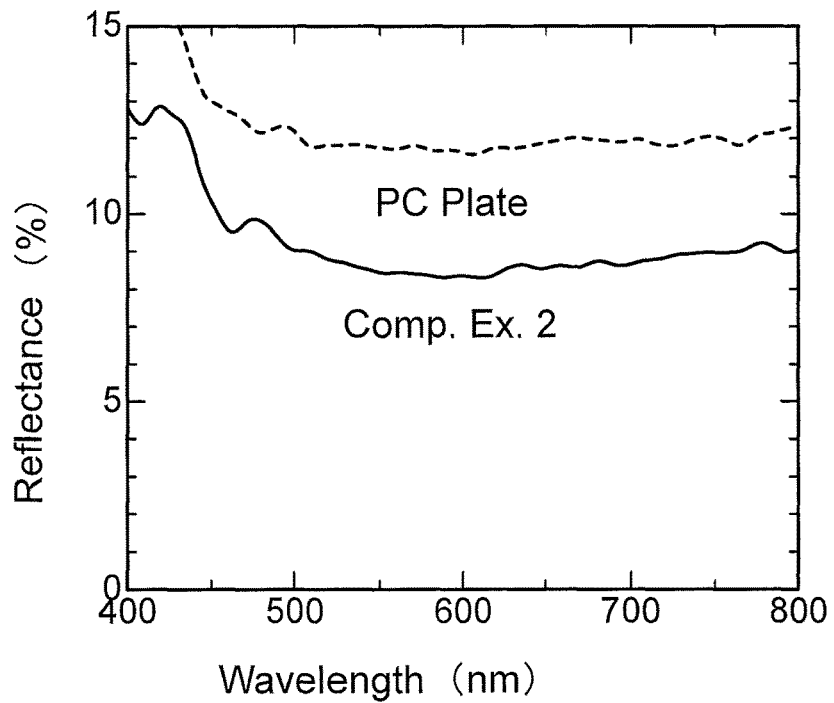

FIG. 31 is a graph showing wavelength dependence of light reflectance of the material for comparison obtained in Comparative Example 2.

Figure 32:
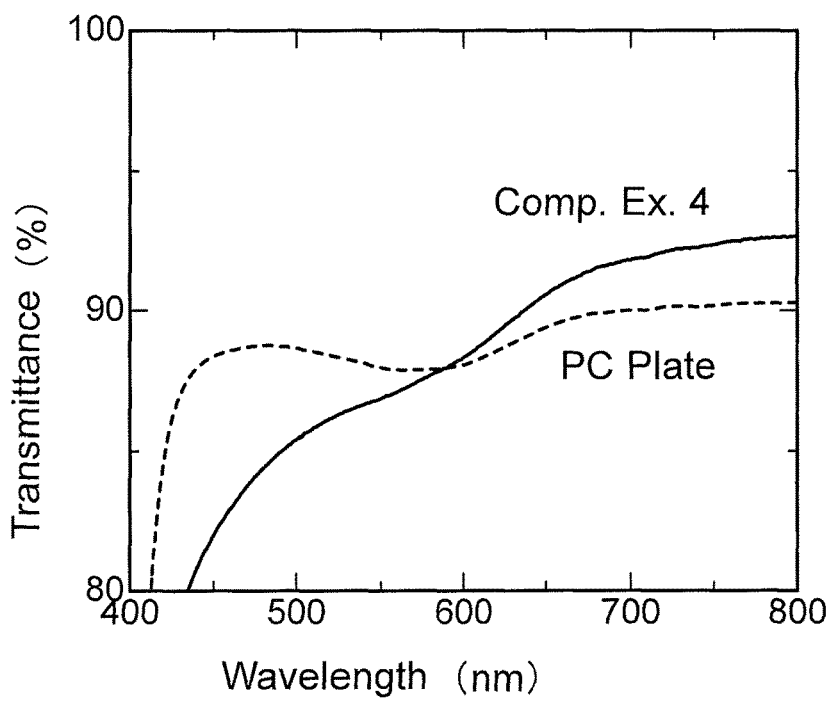

FIG. 32 is a graph showing wavelength dependence of light transmittance of a material for comparison obtained in Comparative Example 4.

Figure 33:
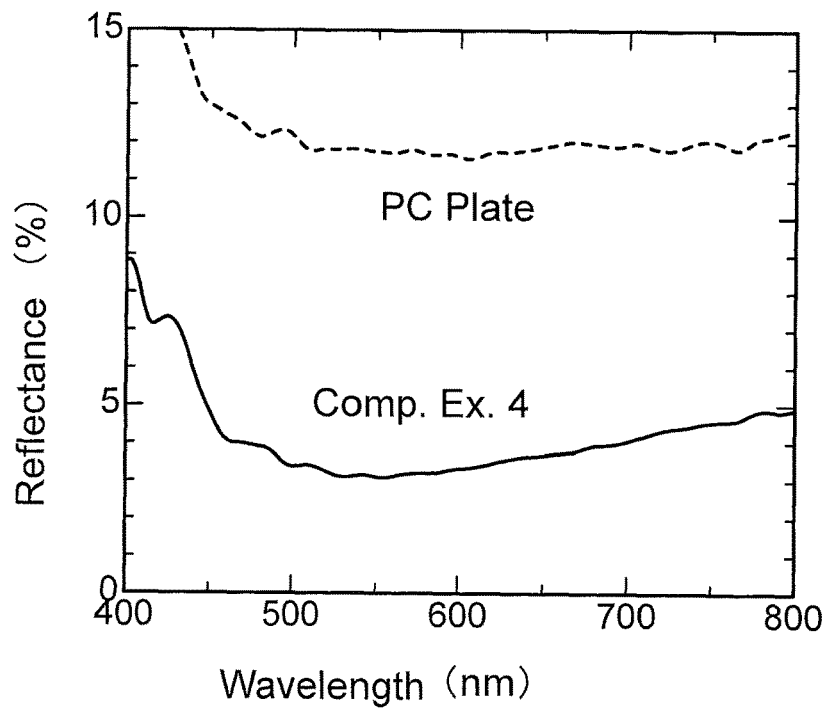

FIG. 33 is a graph showing wavelength dependence of light reflectance of the material for comparison obtained in Comparative Example 4.

Figure 34:
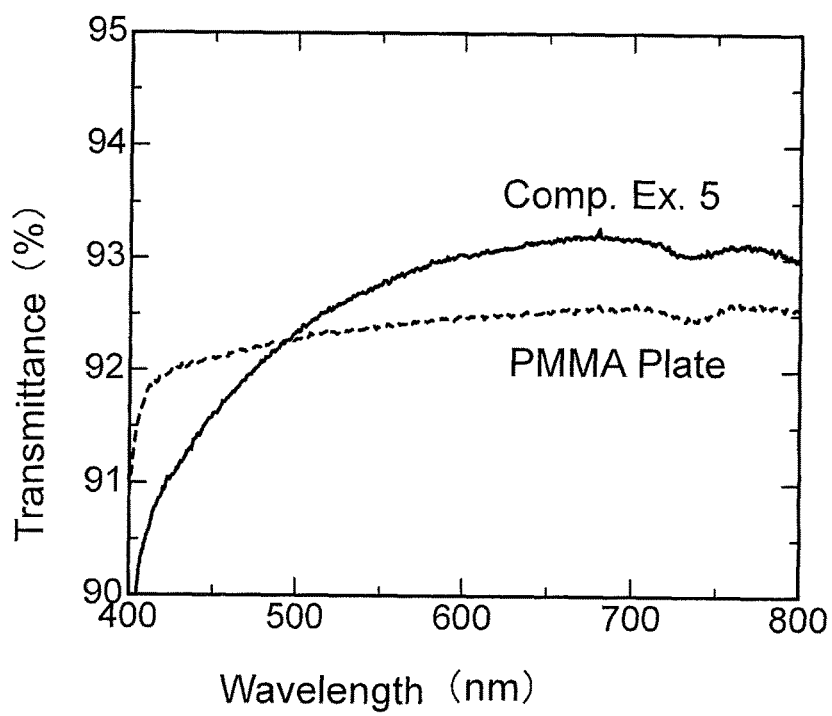

FIG. 34 is a graph showing wavelength dependence of light transmittance of a material for comparison obtained in Comparative Example 5.

Figure 35:
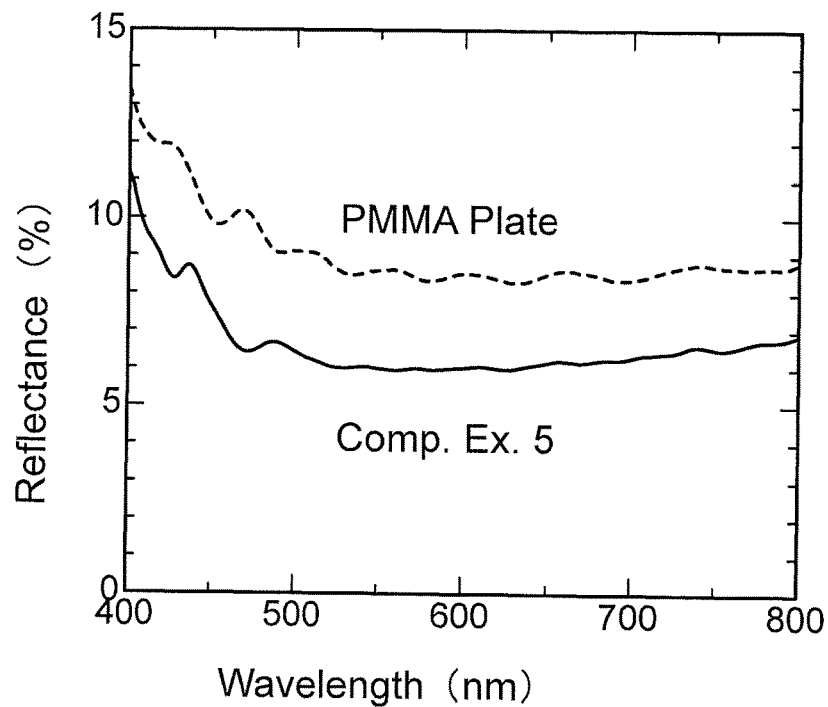

FIG. 35 is a graph showing wavelength dependence of light reflectance of the material for comparison obtained in Comparative Example 5.

Figure 36:
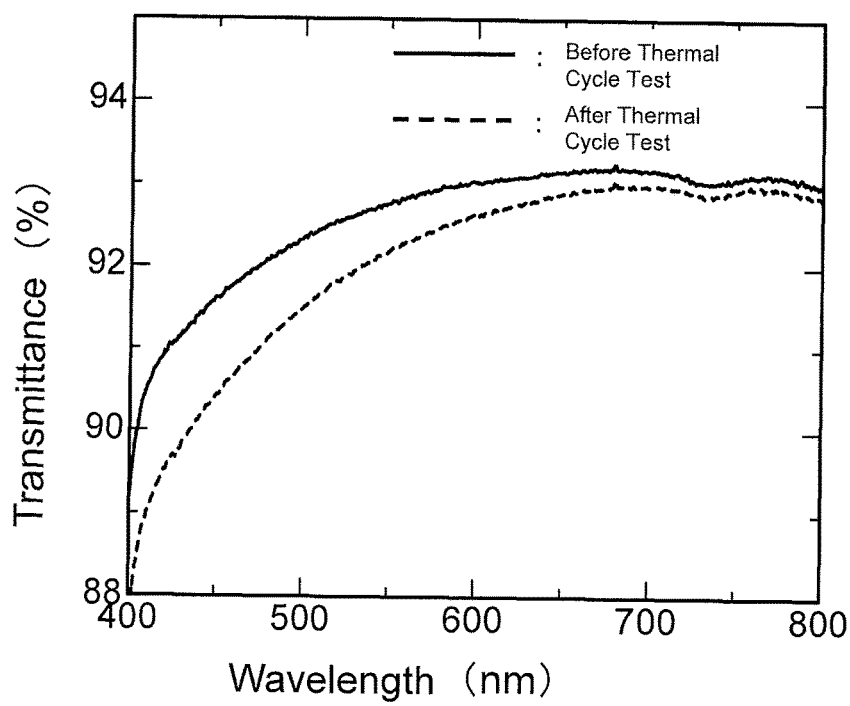

FIG. 36 is a graph showing results of a thermal cycle test of the material for comparison obtained in Comparative Example 5.

Figure 37:
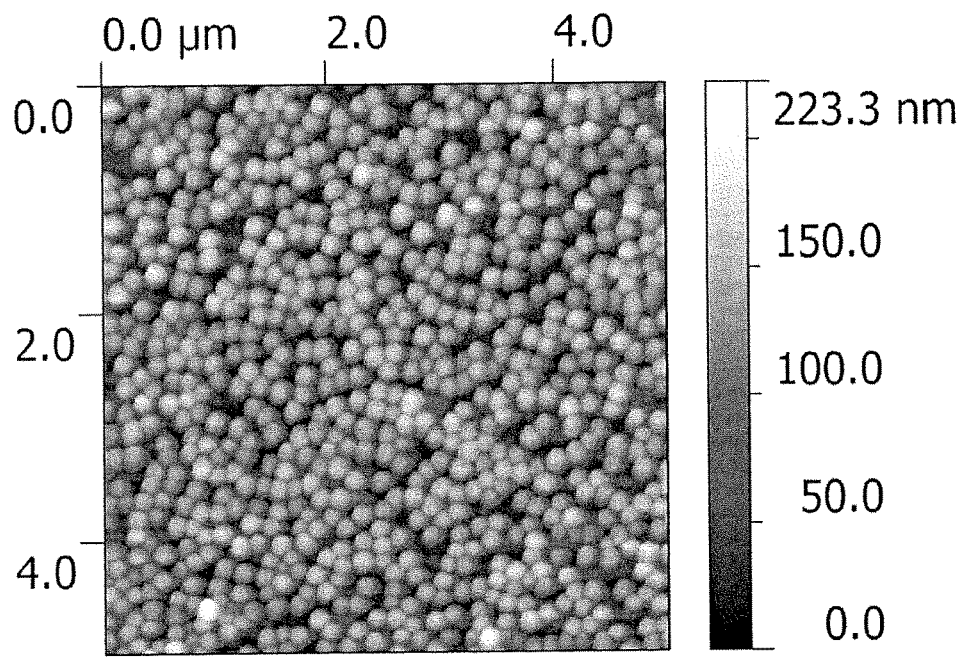

FIG. 37 is an atomic force microscopy observation image (AFM image) of a transfer member obtained in Example 10 before a tape peel test.

Figure 38:
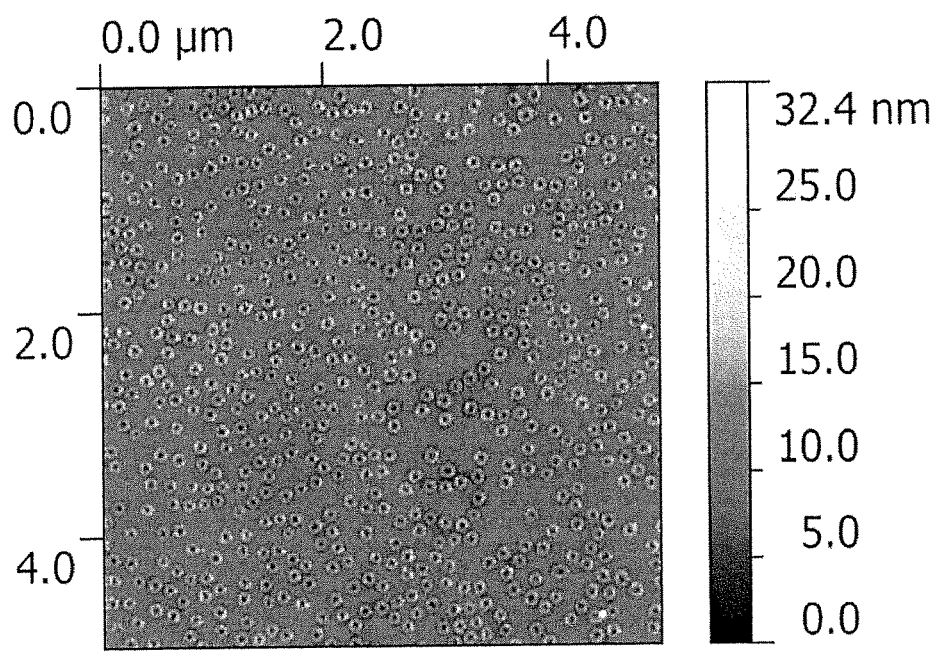

FIG. 38 is an atomic force microscopy observation image (AFM image) of the transfer member obtained in Example 10 after the tape peel test.

Figure 39:
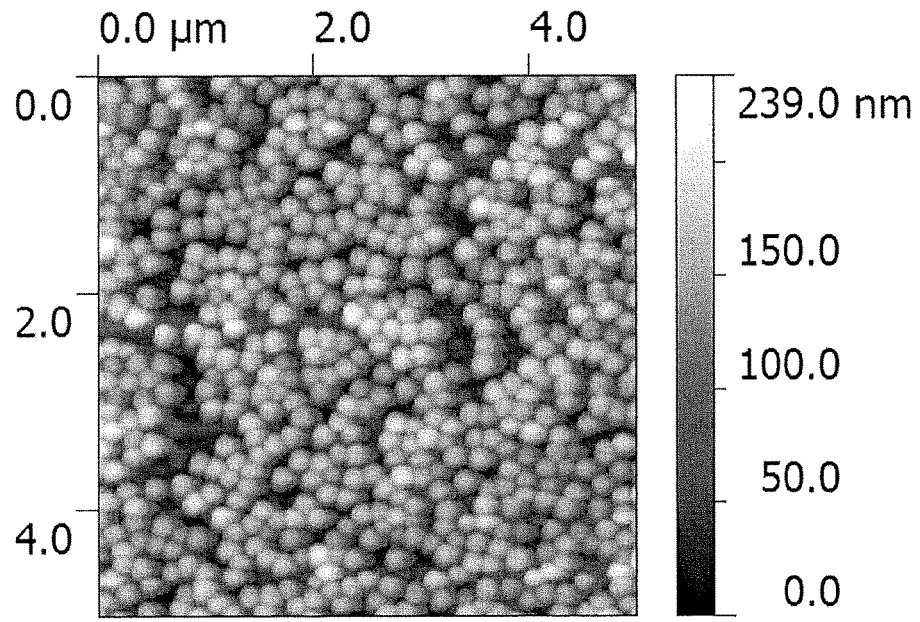

FIG. 39 is an atomic force microscopy observation image (AFM image) of a transfer member obtained in Example 11 before a tape peel test.

Figure 40:
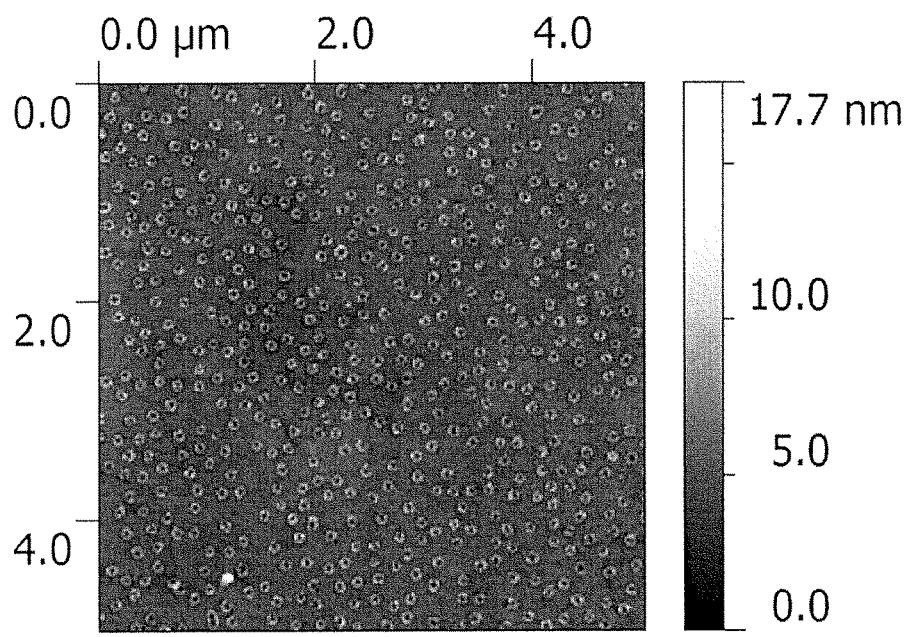

FIG. 40 is an atomic force microscopy observation image (AFM image) of the transfer member obtained in Example 11 after the tape peel test.

Figure 41:
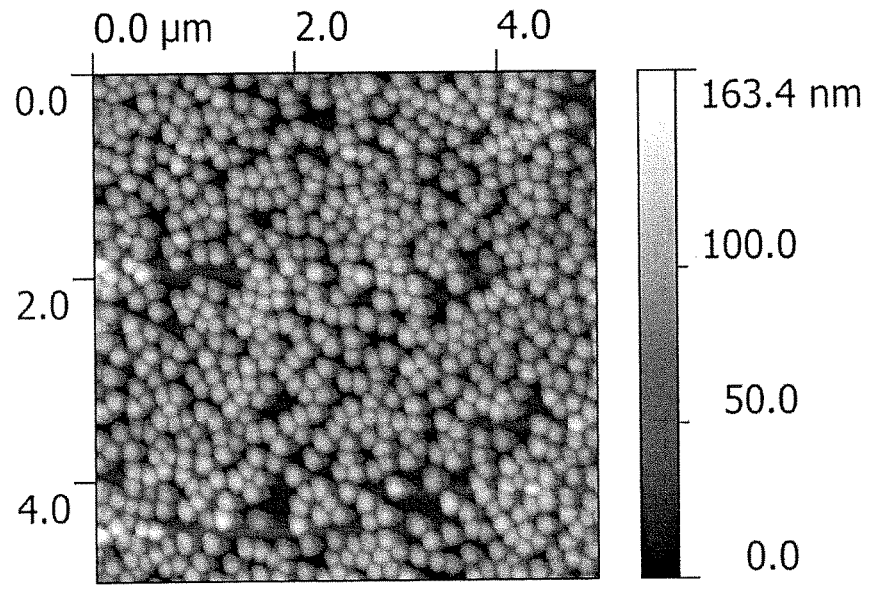

FIG. 41 is an atomic force microscopy observation image (AFM image) of an antireflection member obtained in Example 12.

Figure 42:
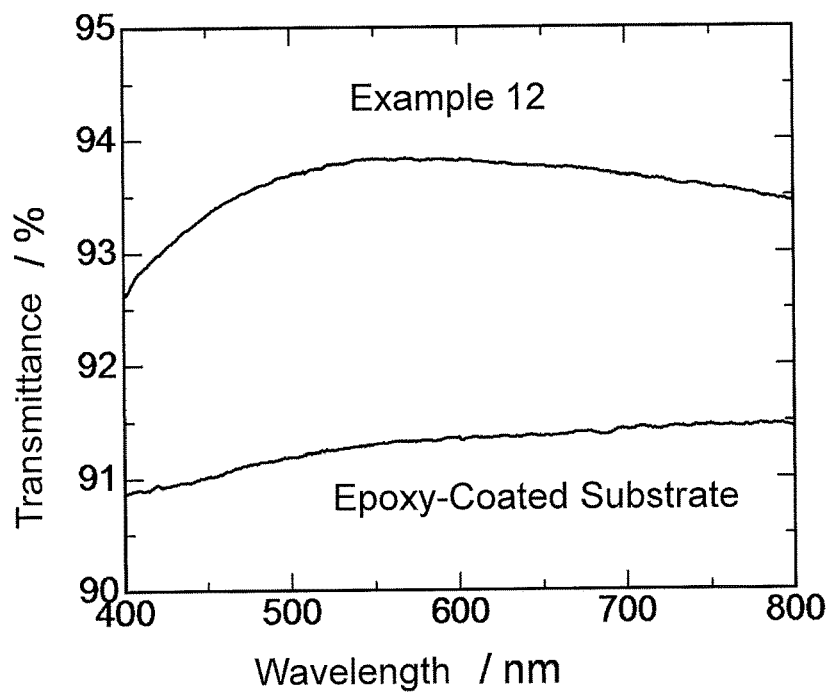

FIG. 42 is a graph showing wavelength dependence of light transmittance of the antireflection member obtained in Example 12.

Figure 43:
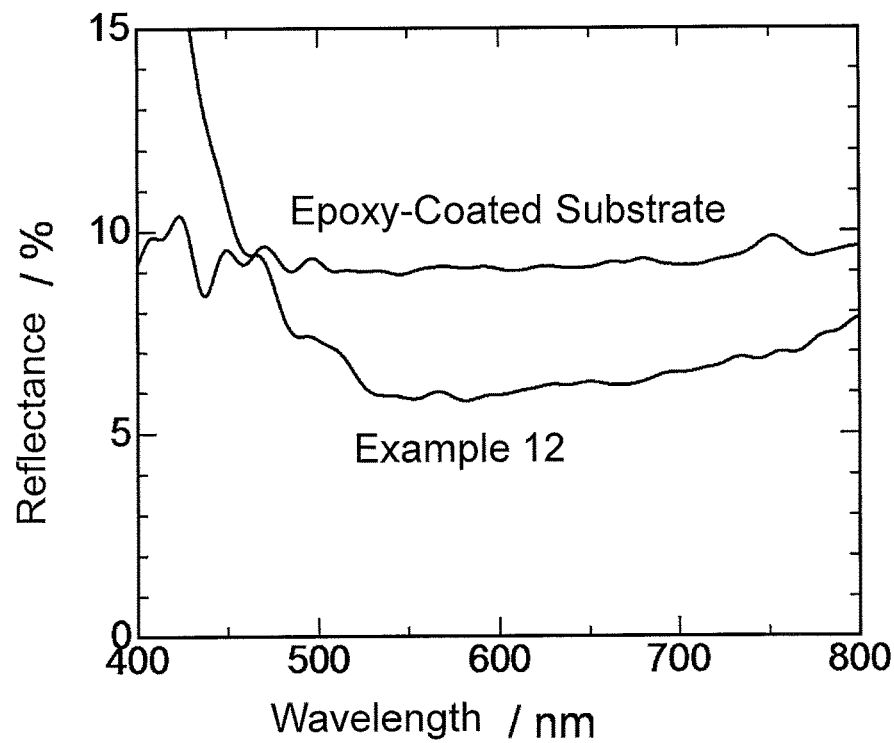

FIG. 43 is a graph showing wavelength dependence of light reflectance of the antireflection member obtained in Example 12.

Figure 44:
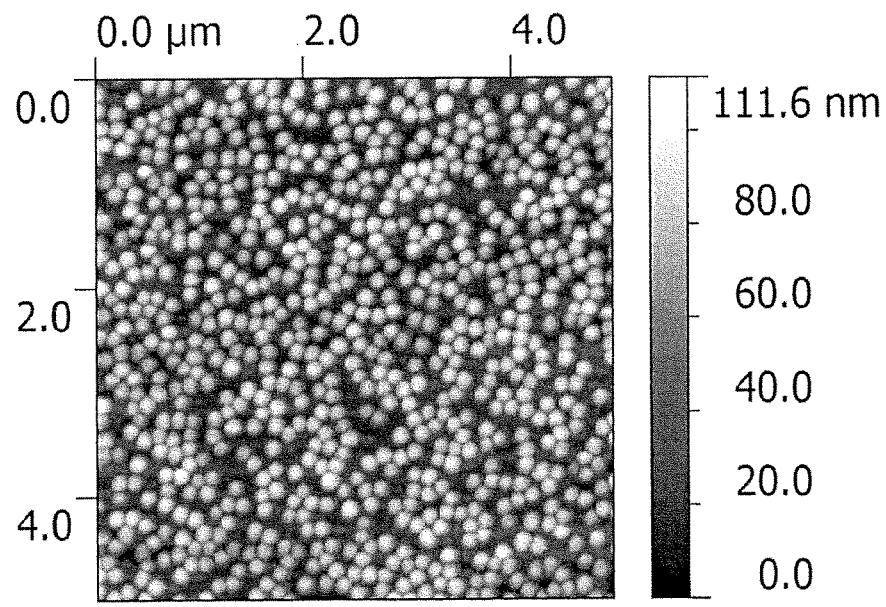

FIG. 44 is an atomic force microscopy observation image (AFM image) of an antireflection member obtained in Example 13.

Figure 45:
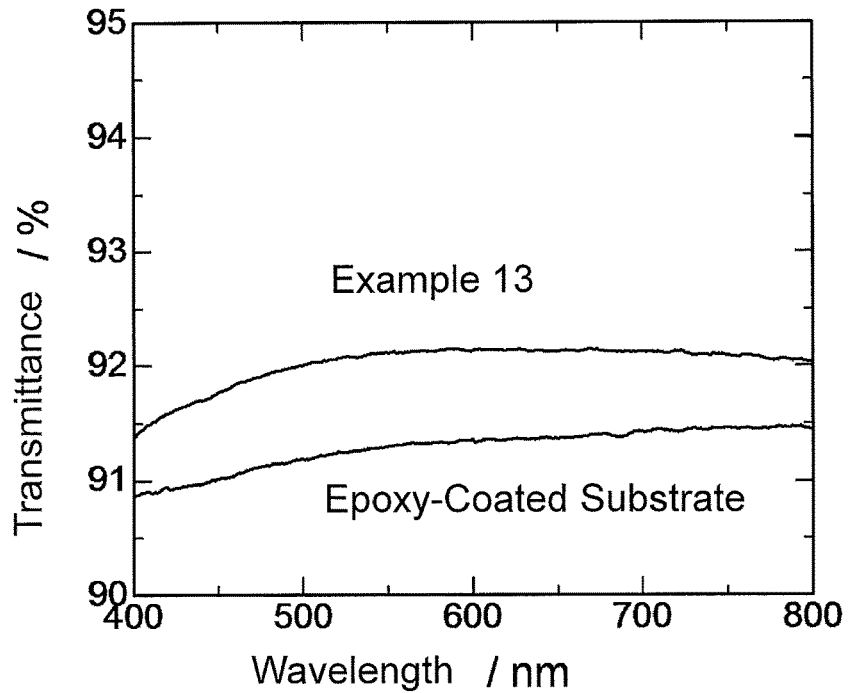

FIG. 45 is a graph showing wavelength dependence of light transmittance of the antireflection member obtained in Example 13.

Figure 46:
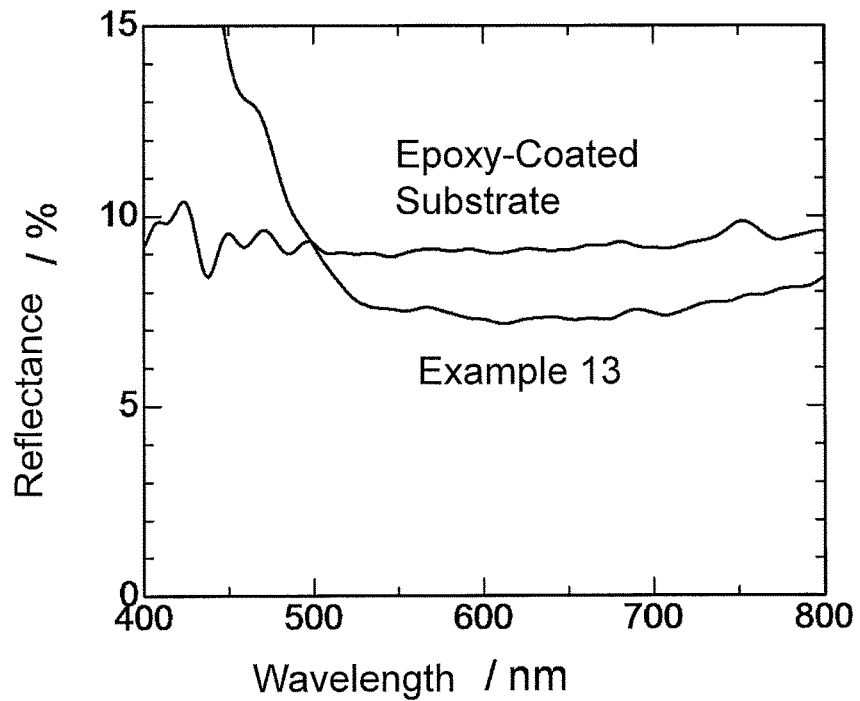

FIG. 46 is a graph showing wavelength dependence of light reflectance of the antireflection member obtained in Example 13.

Figure 47:
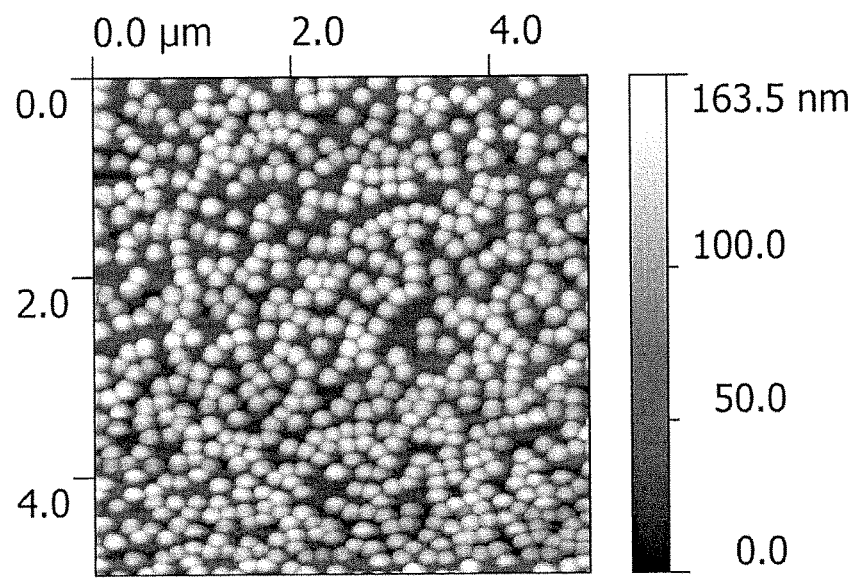

FIG. 47 is an atomic force microscopy observation image (AFM image) of an antireflection member obtained in Example 14.

Figure 48:
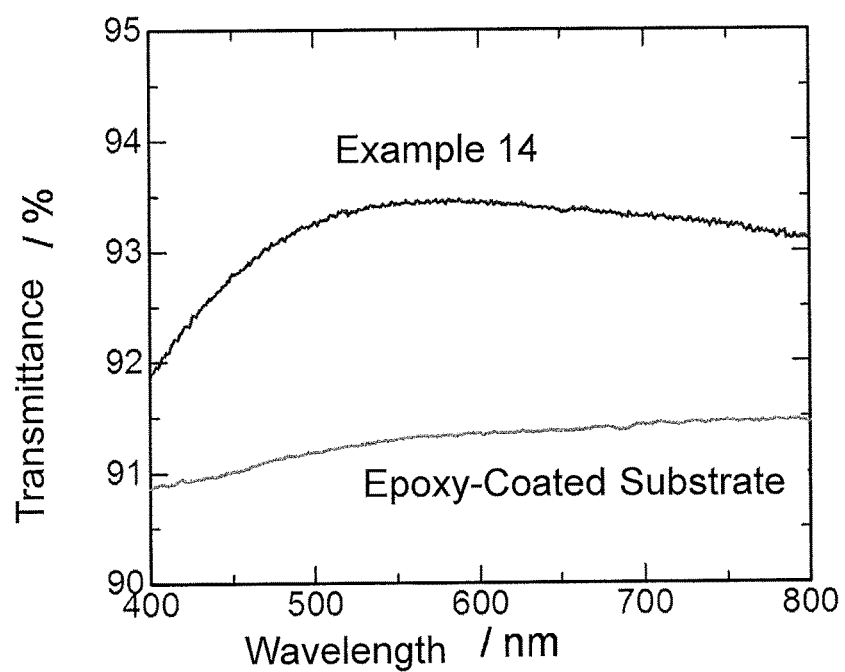

FIG. 48 is a graph showing wavelength dependence of light transmittance of the antireflection member obtained in Example 14.

Figure 49:
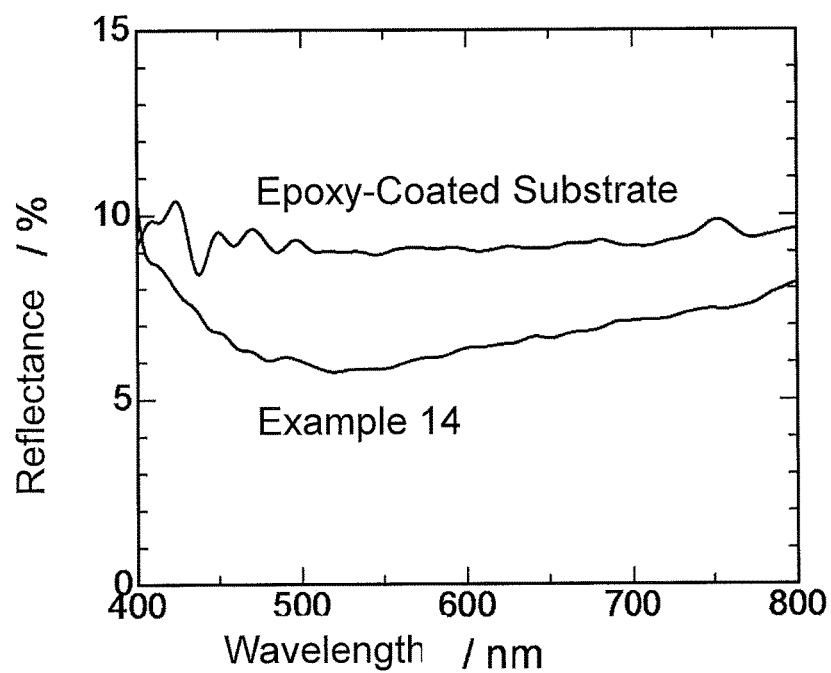

FIG. 49 is a graph showing wavelength dependence of light reflectance of the antireflection member obtained in Example 14.

Figure 50:
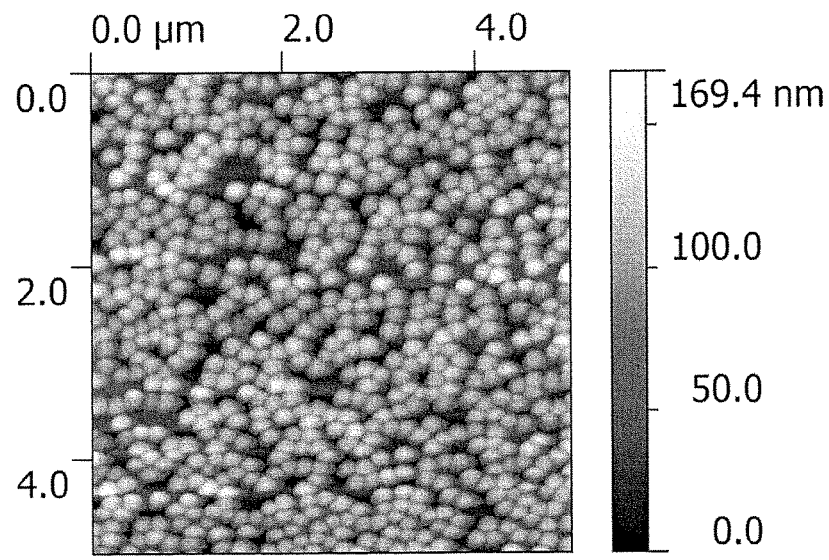

FIG. 50 is an atomic force microscopy observation image (AFM image) of an antireflection member obtained in Example 15.

Figure 51:
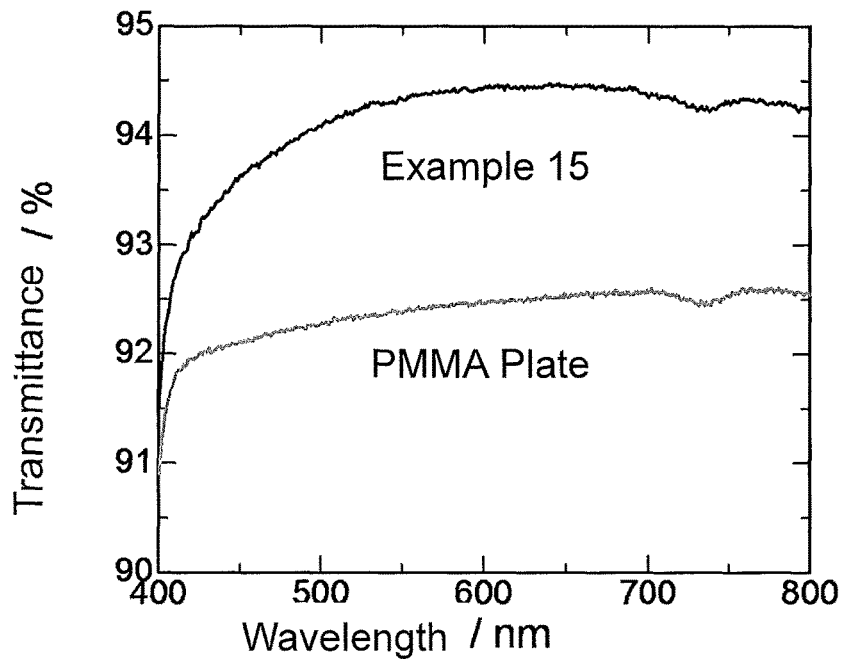

FIG. 51 is a graph showing wavelength dependence of light transmittance of the antireflection member obtained in Example 15.

Figure 52:
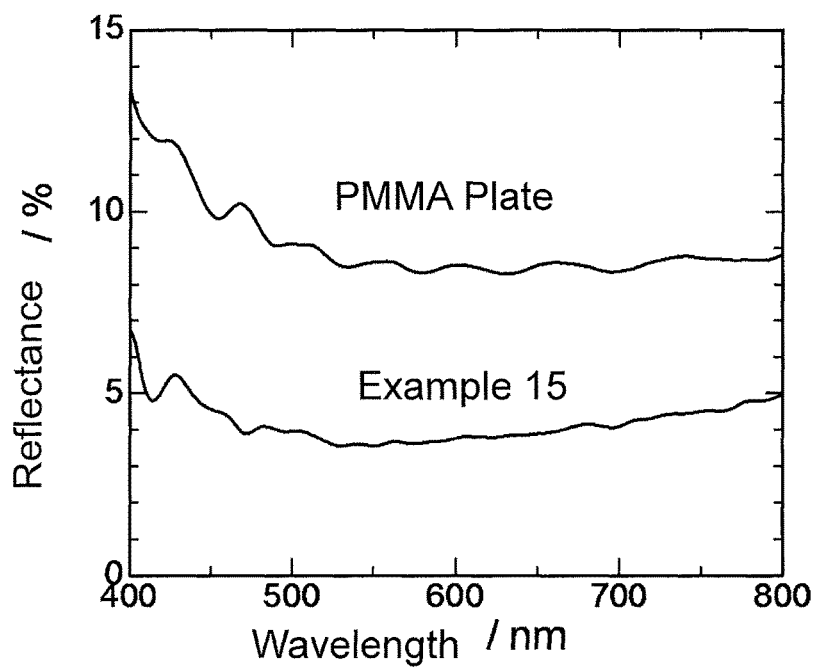

FIG. 52 is a graph showing wavelength dependence of light reflectance of the antireflection member obtained in Example 15.

DETAILED DESCRIPTION OF THE PREFERRED EMBODIMENTS

Hereinafter, the present invention will be described in detail based on preferred embodiments thereof.

[Antireflection Member]

First, an antireflection member of the present invention is described. The antireflection member of the present invention comprises: a resin base member; and a particle layer comprising mesoporous-silica nanoparticles directly fixed to a surface of the resin base member, wherein the nanoparticles are at least partially embedded in the surface of the resin base member, and the nanoparticles are arranged in a mono-particle layer to form the particle layer.

(Resin Base Member)

The resin base member according to the present invention is a resin serving as a base member of the antireflection member, and is not particularly limited, as long as the resin member is a resin base member usable for an antireflection member. A known resin can be used, as appropriate, as the resin. Specific examples of such a resin include thermoplastic resins such as polymethyl methacrylate (PMMA), polymethyl acrylate (PMA), polycarbonates (PC), polyethylene terephthalate (PET), polystyrene (PS), polyvinyl chloride (PVC), polyethylene, polyethylene tetrafluoride (PTFE), polypropylene (PP), polyamides (PA), and polycycloolefins; thermosetting resins such as phenolic resins, melamine resins, urea resins, epoxy resins, unsaturated polyester resins, alkyd resins, silicon resins, diallyl phthalate resin, and polyimide resins; and light-curable resins such as acrylic resins, silicone resins, ester resins, cinnamic acid-containing resins, and diene-containing resins.

Note that, to impart a high viewability to the antireflection member of the present invention, it is preferable to use a transparent resin for the resin base member. The transparent resin is not particularly limited, and any known resin having transparency and being usable for an antireflection member can be used, as appropriate, as the transparent resin. Examples of such transparent resins include acrylic resins (polymethyl methacrylate, polymethyl acrylate, and the like), polycarbonates, polyesters, poly[di(ethylene glycol) bis(allyl carbonate)], polycycloolefins, and epoxy resins. Note that an acrylic resin or a polyester is preferable, from the viewpoint of narrowing the difference in refractive index between the resin base member and the mesoporous-silica nanoparticles described later.

Note that the resin base member is preferably at least one selected from the group consisting of polymethyl methacrylate (PMMA), polycarbonates (PCs), polyethylene terephthalate (PET), polystyrene (PS), and polycycloolefins, from the viewpoint of good shape-processability. Of these materials, the resin base member is more preferably at least one selected from the group consisting of polymethyl methacrylate (PMMA) and polycycloolefins.

In addition, the shape of the resin base member according to the present invention is not particularly limited, as long as the shape is employable for an antireflection member. The resin base member can be used, for example, in the shape of a sheet, a film, a plate, a dome, a sphere, a cube, or the like. Note that a thickness and a size of the resin base member according to the present invention are not particularly limited, and can be selected, as appropriate, according to an application (an intended product or part or the like) of the antireflection member.

(Particle Layer)

The particle layer according to the present invention is a particle layer comprising mesoporous-silica nanoparticles directly fixed to the surface of the resin base member. Here, the nanoparticles are at least partially embedded in the surface of the resin base member, and the nanoparticles are arranged in a mono-particle layer to form the particle layer.

Here, in the particle layer of the present invention, mesoporous-silica nanoparticles "directly fixed" to a surface of a resin base member means that the nanoparticles are directly fixed to the resin base member without any other substance present therebetween. In other words, this means that the resin base member and the nanoparticles are directly bonded to each other. Moreover, since the mesoporous-silica nanoparticles are "directly fixed" to the surface of the resin base member, a strong adhesive force is provided between the mesoporous-silica nanoparticles and the resin base member. Accordingly, the nanoparticles are not detached by ultrasonic cleaning, and further the nanoparticles are not detached in a tape peel test using a pressure-sensitive adhesive tape described later.

Meanwhile, in the particle layer of the present invention, the phrase that "nanoparticles are at least partially embedded in a surface of a resin base member" means that the nanoparticles are partially or entirely embedded in or mixed in the surface of the resin base member.

Moreover, in the particle layer of the present invention, the phrase that "nanoparticles are arranged in a mono-particle layer to form the particle layer" means that the nanoparticles directly fixed to the surface of the resin base member form a mono-particle layer as the particle layer, without overlapping one another.

The mesoporous-silica nanoparticles (hereinafter, also simply referred to as "nanoparticles" are not particularly limited, as long as the nanoparticles have many mesopores. For example, nanoparticles having many mesopores with diameters of 2 to 50 nm are used. Since such nanoparticles have a structure (mesoporous structure) having many mesopores, it is possible to reduce the refractive index, while providing a sufficient porosity to the nanoparticles, so that an antireflection member excellent in antireflection performance can be obtained. In addition, the nanoparticles are at least partially embedded in the surface of the resin base member, and directly fixed to the surface of the resin base member. For this reason, the resin and the nanoparticles are firmly fixed to each other, so that an antireflection member excellent in wear resistance can be obtained. In addition, a sufficient mechanical strength is provided to the antireflection member. In addition, since the mesoporous-silica nanoparticles have a framework of silica (light absorption coefficient: lower than 0.1 $cm^{-1}$, refractive index: 1.45), the mesoporous-silica nanoparticles have a low refractive index, and hence an excellent antireflection performance can be obtained.

The nanoparticles preferably have an average particle diameter of 50 to 300 nm. If the average particle diameter of the nanoparticles is smaller than the lower limit, a surface low-refractive index layer comprising the particle layer tends to be so thin that a sufficient antireflection effect is not exhibited. If the average particle diameter of the nanoparticles exceeds the upper limit, light scattering or optical interference tends to occur because of interaction with visible light, so that the transparency of the film decreases. In addition, the average particle diameter of the mesoporous nanoparticles is more preferably 100 to 250 nm, and particularly preferably 120 to 220 nm, from the viewpoint that the antireflection performance and the transparency are further improved. Note that the average particle diameter of the nanoparticles can be determined by scanning electron microscope (SEM) observation, transmission electron microscope (TEM) observation, or electron probe microanalyzer (EPMA) observation. It is also possible to determine the average particle diameter by dynamic light scattering. For example, when the average particle diameter is determined by scanning electron microscope (SEM) observation, the average particle diameter of the nanoparticles is defined as a value obtained by measuring the diameters of 50 or more nanoparticles randomly extracted under the SEM observation.

In addition, the nanoparticles are preferably such that an average value of depths of portions (nanoparticle-embedded portions) of the nanoparticles embedded in the surface of the resin base member is 5 to 70% of the average particle diameter. If the average value of the depths of the nanoparticle-embedded portions is less than the lower limit, the adhesion to the resin base member tends to be poor. Meanwhile, if the average value exceeds the upper limit, the antireflection performance tends to be lowered, because the ratio of a surface air layer decreases. In addition, the average value of the depths of the nanoparticle-embedded portions is more preferably 10 to 60%, further preferably 20 to 55%, and particularly preferably 30 to 50% of the average particle diameter, from the viewpoint that the antireflection performance, the wear resistance, and the durability against deformation of the base member are further improved. Note that the average value of the depths of the nanoparticle-embedded portions can be determined by atomic force microscope (AFM) observation or the like. For example, the average value of the depths of the nanoparticle-embedded portions is determined by observing a surface shape of the substrate to which the nanoparticles are fixed with an atomic force microscope (AFM), and measuring height profiles in the AMF image. Note that the average value of the depths of the nanoparticle-embedded portions is defined as a value obtained as follows. Specifically, five or more height profiles in regions with a length of 1 μm or more are extracted from the AMF image, and the maximum depth of the embedded portion of each of the nanoparticles in the extracted height profiles from the surface of the resin substrate is determined. Then, an average value is obtained by dividing the sum of the maximum depths of the nanoparticles by the number of the nanoparticles.

Moreover, in the antireflection member of the present invention, the nanoparticles preferably have an average particle diameter of 50 to 300 nm, and the average value of the depths of the portions of the nanoparticles embedded in the surface of the resin base member is preferably 5 to 70% of the average particle diameter. Such an antireflection member makes it possible to further improve the antireflection performance, the wear resistance, and the durability against deformation of the base member.

In addition, the nanoparticles preferably have a porosity of 20 to 80%, and more preferably 30 to 70%.
In view of the balance between optical characteristics and mechanical characteristics, the porosity is particularly preferably 40 to 60%. If the porosity of the nanoparticles is less than the lower limit, the reduction in refractive index of the nanoparticles themselves tends to be insufficient, so that the antireflection performance is lowered. Meanwhile, if the porosity exceeds the upper limit, the nanoparticles themselves tend to be brittle, so that the wear resistance tends to decrease. Note that the porosity of the nanoparticles can be determined from a nitrogen adsorption isotherm.

Moreover, the shape of the mesopores of the nanoparticles is not particularly limited, and radial pores are preferable. Such a shape makes it possible to more firmly fix the resin and the nanoparticles to each other.

(Antireflection Member)
The antireflection member of the present invention comprises:
the resin base member; and
the particle layer comprising the mesoporous-silica nanoparticles directly fixed to the surface of the resin base member.

In the antireflection member, the ratio of an area occupied by the nanoparticles to the entire area of the surface of the antireflection member on which the particle layer is formed is preferably in a range from 40 to 91% and more preferably in a range from 50 to 91%. If the ratio of the surface occupied by the nanoparticles is lower than the lower limit, a rugged structure is less likely to be formed on the surface of the anti-reflection film, so that the obtained antireflection performance tends to be insufficient.

With the above-described configuration, the antireflection member of the present invention can be an antireflection member having a sufficiently good antireflection performance and a sufficiently high wear resistance and being excellent in durability against deformation of a base member. In other words, since the nanoparticles have large surface areas, the nanoparticles can be directly fixed to the surface of the resin base member, so that the obtained antireflection member has a low-refractive index layer on its surface and has a sufficiently good antireflection performance. Moreover, such an antireflection member can exhibit an excellent wear resistance. Accordingly, this antireflection member can be easily applied also to a resin base member having a curved surface or a complicated shape, and can be applied to a wider range of objects.

In addition, in the antireflection member of the present invention, the individual and independent nanoparticles are fixed to the surface of the resin base member, and these nanoparticles are arranged in a single-particle layer (mono-particle layer) to form the particle layer. Hence, the antireflection member is less likely to be degraded or broken even when deformation (thermal expansion, mechanical deformation, or the like) of the resin base member occurs, and hence the antireflection member has an excellent durability. Accordingly, the antireflection member of the present invention can be applied to a resin part having a curved surface or a complicated shape, a flexible substrate, and the like. Moreover, it is possible to impart an excellent durability against bending to the antireflection member of the present invention by optimizing the material of the resin base member, the shape of the nanoparticles, the embedded structure, and the like.

[Method for Producing Antireflection Member]

Next, a method for producing an antireflection member of the present invention is described. The method for producing an antireflection member of the present invention comprises the steps of:

embedding mesoporous-silica nanoparticles arranged on a surface of a resin base member at least partially in the surface of the resin base member placed in a flowable polymer state (particle-embedding step); and fixing the nanoparticles directly to the surface of the resin base member by hardening the surface of the resin base member in the flowable polymer state to thereby obtain the above-described antireflection member of the present invention (fixation step (antireflection member fabrication step)).

(Particle-Embedding Step)

In the method for producing an antireflection member of the present invention, first, mesoporous-silica nanoparticles arranged on a surface of a resin base member are at least partially embedded in the surface of the resin base member placed in a flowable polymer state (particle-embedding step).

In the particle-embedding step, the resin base member is a resin serving as a base member of an antireflection member, and is not particularly limited, as long as the flowable polymer state can be created on the surface of the resin base member. Specifically, resin base members described for the antireflection member of the present invention can be used.

In the particle-embedding step, the mesoporous-silica nanoparticles are not particularly limited, and those described for the antireflection member of the present invention can be used.

Note that a method for producing the mesoporous-silica nanoparticles is not particularly limited, and the mesoporous-silica nanoparticles can be produced by a known method. For example, the mesoporous nanoparticles are prepared by hydrolysis and condensation of a metal alkoxide containing silicon as a metal atom, such as a tetraalkoxysilane, a trialkoxysilane, or a dialkoxysilane, in the presence of a surfactant. In addition, the mesoporous-silica nanoparticles can be prepared by hydrolysis and condensation of the metal alkoxide in the presence of a surfactant. Moreover, it is also possible to use commercially available mesoporous-silica nanoparticles as the mesoporous-silica nanoparticles.

Specific examples of the metal alkoxide include tetraalkoxysilanes such as tetramethoxysilane, tetraethoxysilane, tetraisopropoxysilane, tetrabutoxysilane, and dimethoxydiethoxysilane; trialkoxysilanes such as trimethoxysilanol, triethoxysilanol, trimethoxymethylsilane, trimethoxyvinylsilane, triethoxyvinylsilane, 3-glycidoxypropyltriethoxysilane, 3-mercaptopropyltrimethoxysilane, 3-chloropropyltrimethoxysilane, 3-(2-aminoethyl)aminopropyltrimethoxysilane, phenyltrimethoxysilane, phenyltriethoxysilane, γ-(methacryloxypropyl)trimethoxysilane, and β-(3,4-epoxycyclohexyl)ethyltrimethoxysilane; dialkoxysilanes such as dimethoxydimethylsilane, diethoxydimethylsilane, diethoxy-3-glycidoxypropylmethylsilane, dimethoxydiphenylsilane, and dimethoxymethylphenylsilane; and the like. Of these metal alkoxides, tetraalkoxysilanes, trialkoxysilanes, and dialkoxysilanes are preferable, and tetraalkoxysilanes and trialkoxysilanes are more preferable. One of these metal alkoxides may be used alone, or two or more thereof may be used in combination.

The surfactant may be an alkylammonium halide having a long-chain alkyl group having 8 to 26 carbon atoms. Especially, the surfactant is preferably an alkyltrimethylammonium halide having a long-chain alkyl group having 9 to 26 carbon atoms such as a tetradecyltrimethylammonium halide, a hexadecyltrimethylammonium halide, or an octadecyltrimethylammonium halide, more preferably a tetradecyltrimethylammonium halide or a hexadecyltrimethylammonium halide, and particularly preferably tetradecyltrimethylammonium chloride or hexadecyltrimethylammonium chloride.

Note that, "a surface of a resin base member placed in a flowable polymer state" in the particle-embedding step of the present invention means that at least the surface of the resin base member is in a state, such as a plasticized state, a molten state, or a dissolved state, in which the polymer is flowable enough to allow the nanoparticles to be embedded in or mixed in the surface. Note that the flowable polymer state also includes a state where a polymer, such as a thermosetting resin or a light-curable resin, is in an unhardened state and is a flowable enough to allow the nanoparticles to be embedded in or mixed in the polymer.

In addition, the viscosity of the resin base member in the flowable polymer state is preferably 0.3 to 800 Pa·s, more preferably 0.5 to 500 Pa·s, and particularly preferably 1 to 200 Pa·s. If the viscosity of the resin base member is lower than the lower limit, the nanoparticles on the surface tend to be buried inside the resin substrate. Meanwhile, if the viscosity of the resin base member exceeds the upper limit, the nanoparticles tend not to be fixed to the surface, but to be easily detached.

Moreover, in the particle-embedding step of the method for producing an antireflection member of the present invention, a method for arranging the mesoporous-silica nanoparticles on the surface of the resin base member is not particularly limited. For example, it is possible to employ a method (particle layer raw material application method) in which a particle layer raw material containing the mesoporous-silica nanoparticles is applied onto the surface of the resin base member, or a method (transfer method) in which the mesoporous-silica nanoparticles are arranged on the surface of the resin base member by transfer using a transfer member of the present invention described later.

In the particle layer raw material application method, first, the mesoporous-silica nanoparticles are mixed with a dispersion medium to prepare a particle layer raw material dispersion. The dispersion medium may be an alcohol such as methanol, ethanol, n-propanol, or isopropanol or a water-soluble organic solvent such as acetone, tetrahydrofuran, or N,N-dimethylformamide. The concentration of the nanoparticles in the particle layer raw material dispersion is preferably 0.1 to 10% by mass, from the viewpoint that a particle layer raw material dispersion in which the nanoparticles are uniformly dispersed can be obtained.

Next, the particle layer raw material dispersion containing the nanoparticles is applied onto the surface of the resin base member. A method for applying the particle layer raw material dispersion is not particularly limited, and a known method can be employed such as direct application using a brush, dip-coating, spin coating, or spray application. Note that, for application to a resin base member having a curved surface, it is preferable to apply the particle layer raw material dispersion by using a brush or a spray, from the viewpoint of uniformly applying the nanoparticles.

Specifically, a method for forming the resin base member in a flowable polymer state in the particle-embedding step is as follows. When the resin base member comprises a thermoplastic resin or any other resin having thermoplasticity, it is preferable to employ a method in which the surface of the resin base member is plasticized into the flowable polymer state by subjecting the surface of the resin base member to at least one plasticizing treatment selected from the group consisting of a solvent vapor treatment, a heat treatment, and a gas treatment. Such a method makes it possible to easily create the flowable polymer state of the resin in at least the surface of the resin base member.

The solvent vapor treatment is not particularly limited, as long as the solvent vapor treatment is based on a method by which the surface of the resin base member can be plasticized into the flowable polymer state by a vapor treatment using a solvent. Specifically, it is possible to employ a method in which the resin base member is plasticized (softened) into the flowable polymer state by using vapor of an organic solvent such as chloroform, dichloromethane, tetrahydrofuran, or ethyl acetate; or a solvent such as a low-molecular weight siloxane, a fluorinated alkane, or an alcohol. Note that the solvent used in the solvent vapor treatment is preferably an organic solvent which is a low molecular weight compound having a high affinity for the polymer, such as chloroform, dichloromethane, tetrahydrofuran, or ethyl acetate from the viewpoint of reducing the amount of the solvent used. Note that the solvent vapor treatment may be conducted in combination with a heat treatment described later. For example, a method may be employed in which the resin base member is plasticized by using high-temperature solvent vapor, for example, by using vapor of chloroform at 50° C.

The heat treatment is not particularly limited, as long as the heat treatment is based on a method by which the surface of the resin base member can be plasticized into the flowable polymer state by a treatment using heat. Specifically, it is possible to employ a method in which the surface of the resin substrate is plasticized into the flowable polymer state by introducing hot air (for example, approximately 150 to 200° C.) to the surface of the resin substrate; a method in which the surface of the resin substrate is plasticized into the flowable polymer state by bringing high-temperature vapor (for example, approximately 100° C. or above) into contact with the surface of the resin substrate, or the like. Conditions in the heat treatment are not particularly limited. A treatment temperature is preferably in a range from 100 to 300° C. From the viewpoint of reducing the thermal decomposition of the resin, the treatment temperature is more preferably in a range from 100 to 250° C. A treatment time is not particularly limited, and is preferably 1 to 30 minutes. From the viewpoint of reducing the thermal deformation of the resin, the treatment time is more preferably 1 to 10 minutes.

The gas treatment is not particularly limited, as long as the gas treatment is based on a method by which the surface of the resin base member can be plasticized into the flowable polymer state by a treatment using gas. Specifically, it is possible to employ a method in which the surface of the resin substrate is plasticized into the flowable polymer state by dissolving at least the surface of the resin base member in a plasticizer gas (for example, $CO_2$ or $N_2$) under high pressure, or the like. Conditions in the gas treatment are not particularly limited. A pressure is preferably in a range from 1 to 40 MPa. From the viewpoint of preventing the gas from excessively entering the inside of the resin base member, the pressure is more preferably in a range from 1 to 20 MPa. A treatment temperature is not particularly limited, and is preferably in a range from 25 to 150° C. From the viewpoint of preventing the deformation of the resin, the treatment temperature is more preferably in a range from 25 to 100° C. A treatment time is not particularly limited, and is preferably 5 to 300 minutes. From the viewpoint of selectively making the surface of the resin base member highly flowable, the treatment time is more preferably 10 to 120 minutes.

In addition, when the resin base member comprises a thermosetting resin or a light-curable resin, it is preferable in the particle-embedding step that the nanoparticles be arranged on the surface of the resin base member in an unhardened and flowable polymer state, and then the nanoparticles be at least partially embedded in the surface of the resin base member. Such a method makes it possible to arrange the nanoparticles on the surface of the resin base member in an unhardened and flowable polymer state and easily embed the nanoparticles at least partially.

The thermosetting resin or light-curable resin in the unhardened and flowable polymer state is not particularly limited, and specifically may be a thermosetting resin or light-curable resin in which at least a surface is in an unhardened and plasticized state, a thermosetting resin in which the flowable polymer state of a surface of a resin base member is obtained by heating at least the surface of the thermosetting resin to a plasticizing melting temperature lower than a curing initiation temperature of the thermosetting resin to lower the viscosity, a light-curable resin in which the flowable polymer state of a surface of a resin base member is obtained by heating at least the surface of the light-curable resin having thermoplasticity to a plasticizing melting temperature to lower the viscosity, or the like.

Note that, as the mesoporous-silica nanoparticles used in the particle-embedding step of the method for producing an antireflection member of the present invention, it is preferable to use mesoporous-silica nanoparticles having hydrophobized surfaces (having surfaces to which hydrophobic groups are introduced) (hereinafter, such mesoporous-silica nanoparticles are also referred to as "surface-hydrophobized nanoparticles"). The use of such surface-hydrophobized nanoparticles increases the affinity between the resin base member and the surface-hydrophobized nanoparticles to make the adhesion firm, so that the wear resistance and the antireflection performance of the obtained antireflection member tend to be improved. In addition, since aggregation of the nanoparticles in the solvent is inhibited, the dispersion can be stored for a long period.

Specifically, it is possible to employ, for the hydrophobization treatment, a method in which hydrocarbon groups or the like are introduced to the surfaces of the nanoparticles by adding an organometallic compound, such as a chlorotrialkylsilane (for example, chlorotrimethylsilane or chlorotriethylsilane) or an ethoxytrialkylsilane, having hydrocarbon groups (hydrophobic groups) such as alkyl groups. For the hydrophobization treatment, it is also possible to employ a method in which the hydrocarbon groups or the like are introduced to the surfaces of the nanoparticles by adding an organometallic compound having hydrocarbon groups (hydrophobic groups) such as alkyl groups and an acid. The organometallic compound may be an organosilicon compound such as a hexaalkyldisiloxane (for example, hexamethyldisiloxane or hexaethyldisiloxane), a hexaalkyldisilazane (for example, hexamethyldisilazane), or a trialkylmonoalkoxysilane (for example, trimethylmethoxysilane or trimethylethoxysilane); an organotitanium compound such as tetrakis(trimethylsiloxy)titanium; or an organoaluminum compound such as an aluminum alkylacetoacetate diisopropoxide. Of these organometallic compounds, it is preferable to use an organometallic compound containing the same metal atom species as that in the metal alkoxide used. Moreover, the acid may be hydrochloric acid, acetic acid, nitric acid, trifluoroacetic acid, para-toluenesulfonic acid, sulfuric acid, or the like.

Moreover, for the hydrophobization treatment, a method may be employed in which hydrophobic groups originated from a coupling agent having the hydrophobic groups are introduced to the surfaces of the nanoparticles by bringing the coupling agent into contact with the nanoparticles. For example, while the nanoparticles are being immersed in a solution containing the coupling agent having hydrophobic groups, or while a solution containing the nanoparticles is being mixed with a solution containing the coupling agent having hydrophobic groups, a heat treatment is performed. Thus, the hydrophobic groups originated from the coupling agent (for example, hydrocarbon groups such as alkyl groups) are introduced to the surfaces of the nanoparticles. The coupling agent is not particularly limited, as long as hydrophobic groups can be introduced by using the coupling agent. Examples of the coupling agent include silane coupling agents such as trialkylchlorosilanes (for example, trimethylchlorosilane, triethylchlorosilane, and tripropylchlorosilane), trifluoroalkyldialkylchlorosilanes (for example, trifluoropropyldimethylchlorosilane), and (heptadecafluoro-1,1,2,2-tetrahydrodecyl)dimethylchlorosilane.

(Fixation Step (Antireflection Member Fabrication Step))

Next, in the method for producing an antireflection member of the present invention, the nanoparticles are directly fixed to the surface of the resin base member by hardening the surface of the resin base member placed in the flowable polymer state to thereby obtain the above-described antireflection member of the present invention (Fixation step).

A method (surface hardening method) for hardening the surface of the resin base member in the flowable polymer state in the fixation step is selected according to the method for creating the flowable polymer state in the particle-embedding step described above. For example, when a solvent vapor treatment is conducted in the above-described particle-embedding step, the surface of the resin base member is hardened by removing the solvent. Meanwhile, when a heat treatment is conducted in the above-described particle-embedding step, the surface of the resin base member is hardened by cooling. Moreover, when a gas treatment is conducted in the above-described particle-embedding step, the surface of the resin base member is hardened by reducing the pressure. Meanwhile, when the resin base member comprises a thermosetting resin, the surface of the thermosetting resin base member in the flowable polymer state is hardened by, for example, heating the surface of the thermosetting resin base member under a temperature condition not lower than a curing initiation temperature of the thermosetting resin. Moreover, when the resin base member comprises a light-curable resin, the surface of the resin base member is hardened by irradiating the surface of the light-curable resin base member in the flowable polymer state with light (ultraviolet rays, electromagnetic waves, or the like). Thus, by performing any of the surface hardening methods, the nanoparticles can be directly fixed to the surface of the resin base member, and the above-described antireflection member of the present invention can be obtained.

Such a method makes it possible to easily produce an antireflection member having a sufficiently good antireflection performance and a sufficiently high wear resistance and being excellent in durability against deformation of a base member. Specifically, since the nanoparticles have large surface areas, the resin and the nanoparticles are firmly bonded to each other with the expression of the flowable polymer state of the surface of the resin base member. Moreover, the nanoparticles can be directly fixed to the surface of the resin base member by hardening the surface of the resin base member. In this manner, an antireflection member having a low-refractive index layer on its surface can be obtained. Note that the production as described above enables the obtained antireflection member to exhibit an excellent wear resistance.

In addition, in the method for producing an antireflection member of the present invention, only a mono-particle layer of the nanoparticles in contact with the surface of the resin base member is selectively fixed. This eliminate the need for the control of the thickness of the layer obtained by application of the particle layer raw material and the like in arranging the nanoparticles on the surface of the resin base member, making it possible to produce the antireflection member in a simple manner. Note that such a method can also be easily applied to a resin base member having a curved surface or a complicated shape, and can be applied to a wider range of objects.

Moreover, in the antireflection member obtained by the production method of the present invention, the individual and independent nanoparticles are fixed to the surface of the resin base member to form an antireflection layer. Hence, the antireflection member is strong even when thermal expansion, deformation, or the like of the resin base member occurs, and the antireflection member is excellent in durability. Note that it is also possible to obtain an antireflection member having excellent durability against bending by optimizing the material of the resin base member, the shape of the nanoparticles, the methods for forming the embedded structure of the nanoparticles and the like.

(Removal Step)

The method for producing an antireflection member of the present invention preferably further comprises the step of removing mesoporous-silica nanoparticles which have not been fixed to the surface of the resin base member. A method for removing mesoporous-silica nanoparticles which have not been fixed to the surface of the resin base member is not particularly limited, and, for example, may be ultrasonic cleaning in a solvent such as ethanol or water. Specifically, the antireflection member subjected to the above-described surface hardening method is immersed in a solvent contained in an ultrasonic cleaner, and is cleaned by applying ultrasonic waves to the antireflection member in that state. As the organic solvent, it is possible to use an alcohol such as ethanol, methanol, or isopropanol, acetone, trichloroethylene, or the like. The ultrasonic cleaning makes it possible to effectively remove excessive nanoparticles such as nanoparticles which have not been fixed to the surface of the resin base member, i.e., excessive nanoparticles attached as a second- or later-particle layer (nanoparticles not directly fixed to the surface of the resin base member), and the like.

Preferred embodiments of the antireflection member of the present invention and the method for producing the antireflection member are described above; however, the present invention is not limited to the above-described embodiments. For example, it is also possible to produce the antireflection member of the present invention by employing a method (transfer method) in which mesoporous-silica nanoparticles are arranged on a surface of a resin base member by transfer using a transfer member of the present invention described below.

[Transfer Member and Method for Producing Antireflection Member Using Transfer Member]

First, the transfer member of the present invention is described. The transfer member of the present invention comprises: a release base member; and mesoporous-silica nanoparticles provisionally fixed to a surface of the release base member in a detachable state, while forming a monoparticle layer.

(Release Base Member)

The release base member according to the present invention serves as a base member of the transfer member, and is not particularly limited, as long as the release base member has a surface to which mesoporous-silica nanoparticles can be provisionally fixed in a detachable state. The same base member as the resin base member used for the above-described antireflection member of the present invention can be used, as appropriate. The resin is preferably a thermoplastic resin from the viewpoint that the surface can be moderately plasticized (softened) by a heat treatment or the like. Especially, from the viewpoint that the surface can be moderately plasticized (softened) also by a solvent vapor treatment, the resin is more preferably a polycarbonate, polystyrene, or an acrylic resin (polymethyl methacrylate, polymethyl acrylate, or the like).

The shape of the release base member according to the present invention is not particularly limited, and is preferably a flexible shape such as a film shape or a sheet shape, from the viewpoint that the mesoporous-silica nanoparticles can be efficiently arranged even on a resin base member having a curved surface or a spherical surface.

(Transfer Member)

In the transfer member of the present invention, the mesoporous-silica nanoparticles are provisionally fixed to the surface of the release base member in a detachable state, while forming a mono-particle layer. As the mesoporous-silica nanoparticles, the same mesoporous-silica nanoparticles as those used for the above-described antireflection member of the present invention are used.

Here, the phrase that the mesoporous-silica nanoparticles are "provisionally fixed" to the surface of the release base member "in a detachable state" means that moderate adhesive force is provided between the mesoporous-silica nanoparticles and the release base member, and hence the nanoparticles is in a state where the nanoparticles can be detached from the surface of the release base member and transferred to a surface of a resin base member in a transfer step described later, in which the transfer member is brought into contact with the resin base member. The "provisional fixation" is preferably such a state that the nanoparticles are not detached by the ultrasonic cleaning, but detached in a tape peel test using a pressure-sensitive adhesive tape described later.

In addition, the "provisional fixation" is preferably achieved by at least partially embedding mesoporous-silica nanoparticles to smaller depths than the depths in the "direct fixation" of the above-described antireflection member of the present invention. In the "provisional fixation," an average value of depths of portions (nanoparticle-embedded portions) of the nanoparticles embedded in the surface of the release base member is preferably 2 to 20%, and more preferably 3 to 15% of the average particle diameter of the nanoparticles used. If the average value of the depths of the nanoparticle-embedded portions is less than the lower limit, the adhesion to the release base member tends to be so weak that the nanoparticles are easily detached by the ultrasonic cleaning. Meanwhile, if the average value exceeds the upper limit, the adhesion to the release base member tends to be so strong that the nanoparticles are difficult to detach from the surface of the release base member in a transfer step described later.

In addition, the average value of depths of the nanoparticle-embedded portions in the "provisional fixation" is preferably 5 to 30 nm, and more preferably 10 to 20 nm. Moreover, in the "provisional fixation," the average value of depths of the nanoparticle-embedded portions is preferably about $1/10$ to $1/2$ of an average value of depths of nanoparticle-embedded portions in an antireflection member to be obtained after the transfer. If the average value of depths of the nanoparticle-embedded portions in the "provisional fixation" is less than the lower limit, the adhesion to the release base member tends to be so weak that the nanoparticles are easily detached by the ultrasonic cleaning. Meanwhile, if the average value exceeds the upper limit, the adhesion to the release base member tends to be so strong that the nanoparticles are difficult to detach from the surface of the release base member in a transfer step described later.

Moreover, as in the case of the "mono-particle layer" in the above-described antireflection member of the present invention, the "mono-particle layer" of the mesoporous-silica nanoparticles in the transfer member of the present invention means that the nanoparticles arranged on the surface of the release base member form a single-particle layer as the particle layer, without overlapping one another. To set the ratio of an area occupied by the nanoparticles to the entire area of the surface of the antireflection member to be obtained after the transfer within the above-described range, the ratio of an area occupied by the nanoparticles to the entire area of the surface of the transfer member is preferably in a range from 40 to 91%, and more preferably in a range from 50 to 91%.

A method for obtaining such a transfer member of the present invention is not particularly limited. For example, the transfer member can be obtained by a method which is the same as the above-described method for producing an antireflection member, except that the release base member is used instead of the resin base member in the above-described antireflection member and further that the "provisionally fixed" state is achieved by moderately reducing the adhesive force by the mesoporous-silica nanoparticles and the release base member. Specifically, the transfer member of the present invention can be obtained preferably by a method comprising steps shown below.

A method for producing a transfer member, comprising the steps of:

embedding mesoporous-silica nanoparticles arranged on a surface of a release base member at least partially in the surface of the release base member placed in a semi-flowable polymer state where a flowability is smaller than that in the above-described flowable polymer state for obtaining the antireflection member (particle-embedding step); and provisionally fixing the nanoparticles to the surface of the release base member in a mono-particle layer and in a detachable state by hardening the surface of the release base member in the semi-flowable polymer state to obtain the above-described transfer member (provisional fixation step).

A method for arranging the mesoporous-silica nanoparticles on the surface of the release base member in the particle-embedding step is not particularly limited. For example, it is possible to employ a method which is the same as the particle layer raw material application method in the above-described method for producing an antireflection member. Meanwhile, a method for obtaining the semi-flowable polymer state in the particle-embedding step is preferably at least one plasticizing treatment selected from the group consisting of a solvent vapor treatment, a heat treatment, and a gas treatment, as in the case of the above-described method for producing an antireflection member. The semi-flowable polymer state can be obtained by adjusting the degree of the plasticization (softening) of the surface of the release base member. Moreover, as a method for hardening the surface of the release base member in the provisional fixation step, the same method as in the fixation step in the above-described method for producing an antireflection member can be employed.

In addition, this method preferably further comprises a step (removal step) of removing mesoporous-silica nanoparticles which have not been fixed to the surface of the release base member, after the provisional fixation step. As a method for the removal, the same method as in the removal step in the above-described method for producing an antireflection member can be employed.

(Method for Producing Antireflection Member Using Transfer Member)

When the above-described transfer member of the present invention is used, the mesoporous-silica nanoparticles can be arranged on a surface of a resin base member by transfer by bringing the transfer member into contact with the resin base member (transfer step).

The transfer of the nanoparticles can preferably be achieved as follows. Specifically, a surface of a resin base member to which the nanoparticles are to be transferred is placed in a flowable polymer state or an adhesive state. Then, the nanoparticles on the transfer member from which the nanoparticles are transferred are brought into contact with the surface of the resin base member. After, if necessary, being pressed, the release base member is peeled off. Thus, the transfer of the nanoparticles can preferably be achieved. As a method for placing the surface of the resin base member in the flowable polymer state, it is possible to employ the same method as the method for placing the surface of the resin base member in the flowable polymer state in the particle-embedding step in the above-described method for producing an antireflection member. Accordingly, the transfer step and the particle-embedding step in the above-described method for producing an antireflection member can be carried out in a substantially single step. In addition, as a method for hardening the surface of the resin base member after the particle-embedding step, it is possible to employ the same method as in the fixation step in the above-described method for producing an antireflection member.

EXAMPLES

Hereinafter, the present invention will be described more specifically on the basis of Examples and Comparative Examples. However, the present invention is not limited to Examples below. Note that the following methods were employed for performing shape observation, mesopore structure evaluation, optical characteristic evaluation, peel and abrasion tests, and a thermal cycle test of antireflection members.

<Shape Observation>

Scanning electron microscope (SEM) observation of mesoporous-silica nanoparticles was conducted by using a scanning electron microscope "SU3500" manufactured by Hitachi High-Technologies Corporation. In addition, atomic force microscope (AFM) observation of a surface shape of each substrate to which mesoporous-silica nanoparticles were fixed was conducted by using a scanning probe microscope "NanoNavi E-sweep" manufactured by SII Nano-Technology Inc. (currently Hitachi High-Tech Science Corporation).

<Mesopore Structure Evaluation>

A nitrogen adsorption isotherm of mesoporous-silica nanoparticles was measured by using a gas adsorption amount analyzer "Autosorb-1" manufactured by Quantachrome Instruments. The specific surface area was calculated by the Brunauer-Emmett-Teller (BET) method, the pore diameter was calculated by the density functional method, and the pore volume was calculated by the t-plot method.

<Optical Characteristic Evaluation>

The light transmittance was measured by using a spectrophotometer "V-670" manufactured by JASCO Corporation. Meanwhile, the light reflectance was measured by using a multichannel spectrometer "S-2650" manufactured by SOMA OPTICS, LTD. Moreover, the transparency was evaluated as follows. Specifically, under visual observation, an antireflection member substantially completely transparent was rated as "○(Good)", an antireflection member in which white turbidity due to light scattering was slightly observed was rated as "Δ(Fair)", and an antireflection member in which apparent white turbidity was noticed was rated as "x(Poor)".

<Peel and Abrasion Tests>

A tape peel test was conducted as follows. Specifically, a pressure-sensitive adhesive tape (Scotch (registered trademark) "Mending Tape" (Catalog No. 810-1-18)) manufactured by Sumitomo 3M Limited was attached to a surface of a substrate to which mesoporous-silica nanoparticles were fixed and then peeled off. Then, sticky components remaining on the substrate surface were rinsed with ethanol, and the ratio of peeling was visually observed. In addition, a cotton abrasion test was conducted as follows. Specifically, while cotton wool was pressed to a substrate surface under a pressure of 1 kg/cm$^2$, the cotton wool was moved back and forth 20 times. After that, the surface state was visually observed. Note that, to reduce the influence of the solvent permeating into the substrate, these tests were conducted on samples having been allowed to stand at room temperature for one week. In each test, an antireflection member in which almost no change was observed after the test was rated as "○(Good)", an antireflection member in which some change was observed was rated as "Δ(Fair)", and an antireflection member in which apparent peeling or whitening was observed was rated as "x(Poor)".

<Thermal Cycle Test>

To investigate the durability of the antireflection layer to thermal expansion of the substrate, a cycle consisting of heating (approximately 80° C.) with hot air and rapid cooling (25° C.) by immersion in water was repeated 10 times, and the visible light transmittance was measured before and after the test.

Preparation Example 1

To a recovery flask with a capacity of 100 mL, a 10% by mass aqueous hexadecyltrimethylammonium chloride solution (60 mL) and triethanolamine (0.18 g) were added, followed by stirring at 60° C. for 1 hour. Next, to the obtained mixture solution, a separately prepared mixture of tetraethoxysilane (4 mL) and cyclohexane (16 mL) was slowly added to form a two-layer separation state constituted of an organic layer and an aqueous layer. Then, with slow stirring at 150 to 200 rpm, the resultant mixture was heated at 60° C. for 10 hours to form nanoparticles. Subsequently, the aqueous layer containing the formed nanoparticles were separated, and transferred to a round-bottom flask with a capacity of 300 mL. To this aqueous layer, a separately prepared mixture of hexamethyldisiloxane (30 g), ethanol (30 g), and 5 M hydrochloric acid (60 g) was added, and the resultant mixture was heated at 72° C. for 2 hours with vigorous stirring to perform a surface hydrophobization treatment. Next, the mixture was cooled at room temperature, and then centrifuged (4000 rpm, 1 hour) to collect mesoporous-silica nanoparticles. Subsequently, the solvent was removed by washing by centrifugation (4000 rpm, 1 hour×3) using ethanol solvent to obtain the mesoporous-silica nanoparticles (surface-hydrophobized mesoporous-silica nanoparticles).

Figure 1:
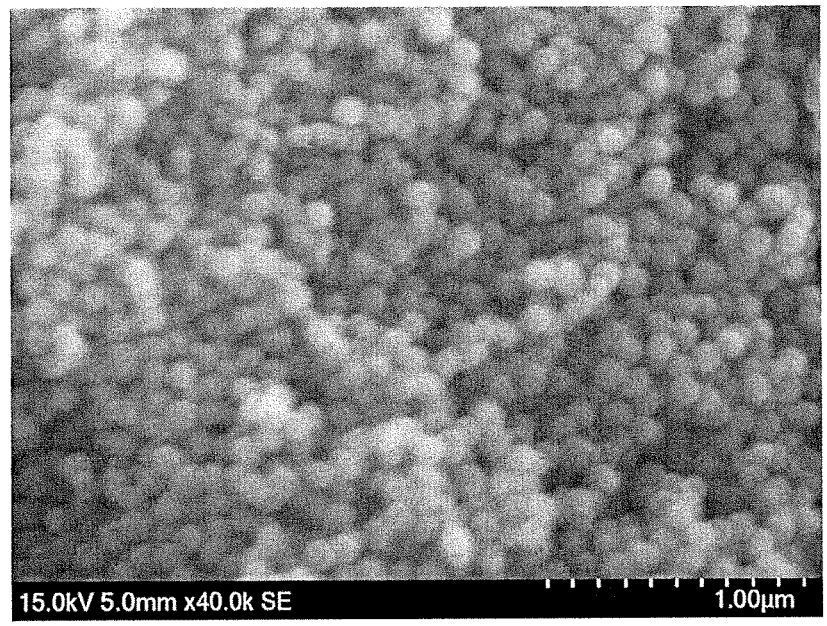
FIG. 1 is a scanning electron micrograph of mesoporous-silica nanoparticles obtained in Preparation Example 1.
Figure 2:
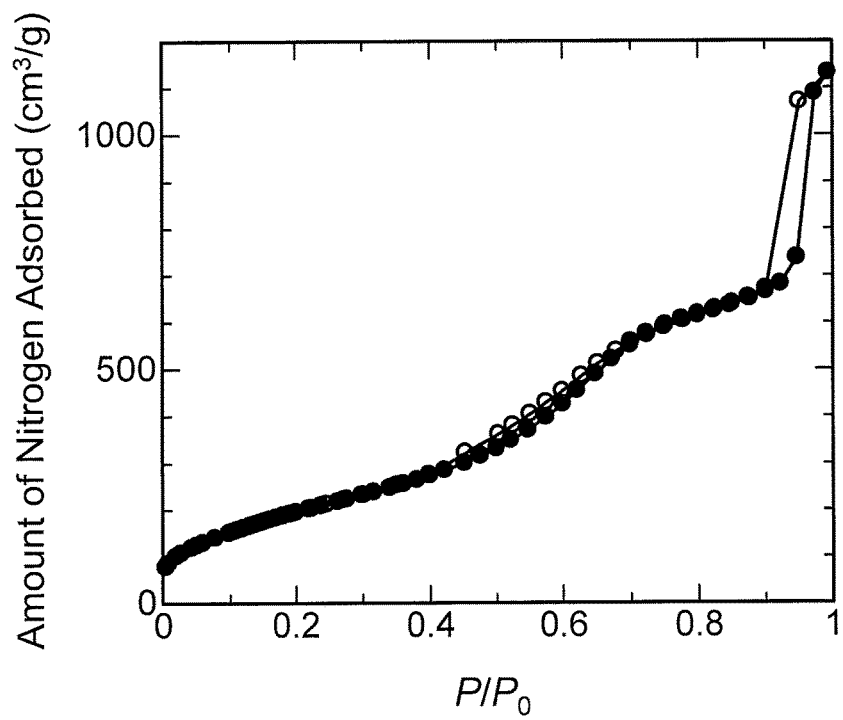
FIG. 2 is a graph showing a nitrogen adsorption isotherm of the mesoporous-silica nanoparticles obtained in Preparation Example 1.

The obtained mesoporous-silica nanoparticles were observed with a scanning electron microscope (SEM). In this SEM observation, 50 nanoparticles were randomly extracted, and the diameters of the nanoparticles were measured. The average particle diameter of the nanoparticles was found to be approximately 100 nm. FIG. 1 shows a scanning electron micrograph of the mesoporous-silica nanoparticles obtained in Preparation Example 1. In addition, a nitrogen adsorption isotherm was measured. FIG. 2 shows a graph showing the nitrogen adsorption isotherm of the mesoporous-silica nanoparticles obtained in Preparation Example 1. From the measurement results of the nitrogen adsorption isotherm, the BET specific surface area was determined to be 748 $m^2/g$, the mesopore diameter was determined to be 5 to 8 nm, and the pore volume attributable to mesopores was determined to be 0.60 $cm^3/g$. Assuming that the density of the silica framework was approximately 2 $g/cm^3$, the porosity was calculated to be 54%.

Preparation Example 2

To a recovery flask with a capacity of 100 mL, a 10% by mass aqueous hexadecyltrimethylammonium chloride solution (60 mL) and triethanolamine (0.18 g) were added, followed by stirring at 80° C. for 1 hour. Next, to the obtained mixture solution, a separately prepared mixture of tetraethoxysilane (4 mL) and methylcyclohexane (16 mL) was slowly added to form a two-layer separation state constituted of an organic layer and an aqueous layer. Then, the resultant mixture was heated at 80° C. for 10 hours with slow stirring at 150 to 200 rpm to form nanoparticles. Subsequently, the aqueous layer containing the formed nanoparticles were separated, and transferred to a round-bottom flask with a capacity of 300 mL. To this aqueous layer, a separately prepared mixture of hexamethyldisiloxane (30 g), ethanol (30 g), and 5 M hydrochloric acid (60 g) was added, and the resultant mixture was heated at 72° C. for 2 hours with vigorous stirring to perform a surface hydrophobization treatment. Next, the mixture was cooled at room temperature, and then centrifuged (4000 rpm, 1 hour) to collect mesoporous-silica nanoparticles. Subsequently, the solvent was removed by washing by centrifugation (4000 rpm, 1 hour×3) using ethanol solvent to obtain the mesoporous-silica nanoparticles (surface-hydrophobized mesoporous-silica nanoparticles).

Figure 3:
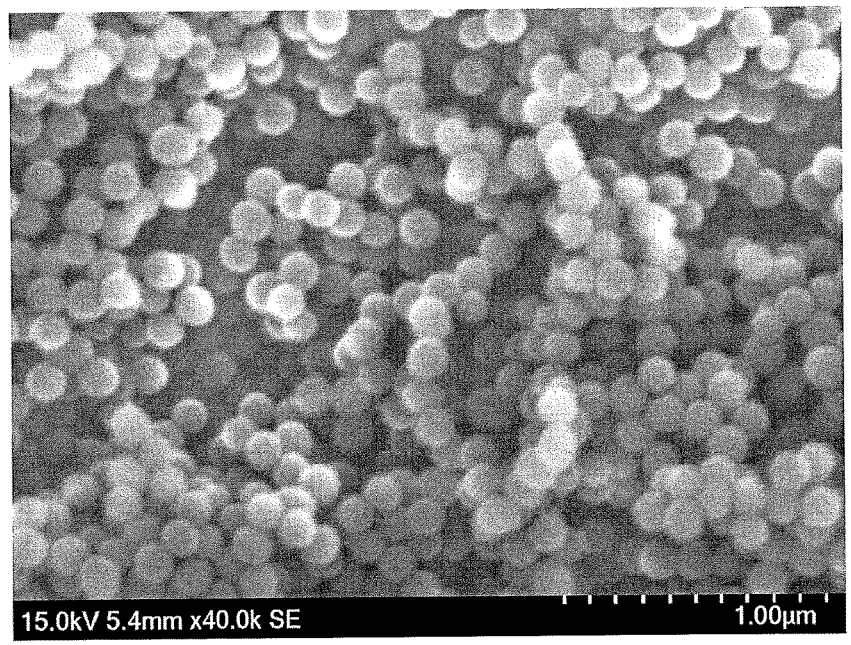
FIG. 3 is a scanning electron micrograph of mesoporous-silica nanoparticles obtained in Preparation Example 2.
Figure 4:
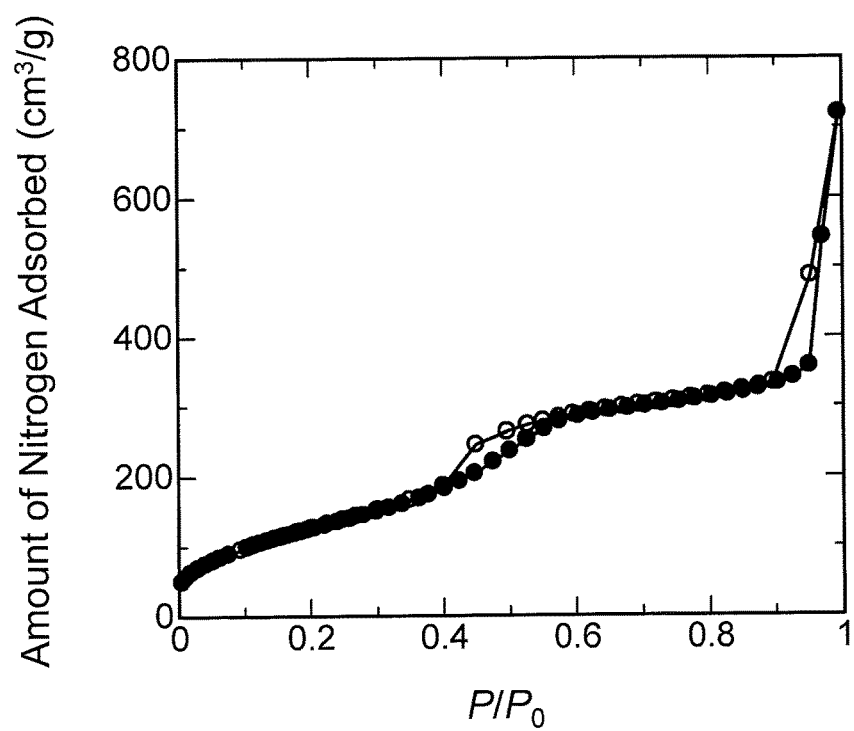
FIG. 4 is a graph showing a nitrogen adsorption isotherm of the mesoporous-silica nanoparticles obtained in Preparation Example 2.

The obtained mesoporous-silica nanoparticles were observed with a scanning electron microscope (SEM) in the same manner as in Preparation Example 1, and the average particle diameter of the nanoparticles was found to be approximately 150 nm FIG. 3 shows a scanning electron micrograph of the mesoporous-silica nanoparticles obtained in Preparation Example 2. In addition, a nitrogen adsorption isotherm was measured. FIG. 4 shows a graph showing the nitrogen adsorption isotherm of the mesoporous-silica nanoparticles obtained in Preparation Example 2. From the measurement results of the nitrogen adsorption isotherm, the BET specific surface area was determined to be 484 $m^2/g$, the mesopore diameter was determined to be 4.7 nm, and the pore volume attributable to mesopores was determined to be 0.37 $cm^3/g$. Assuming that the density of the silica framework was approximately 2 $g/cm^3$, the porosity was calculated to be 42%.

Preparation Example 3

To a recovery flask with a capacity of 100 mL, a 25% by mass aqueous hexadecyltrimethylammonium chloride solution (24 mL) and triethanolamine (0.18 g) were added, followed by stirring at 80° C. for 1 hour. Next, to the obtained mixture solution, a separately prepared mixture of tetraethoxysilane (4 mL) and methylcyclohexane (16 mL) was slowly added to form a two-layer separation state constituted of an organic layer and an aqueous layer. Then, the resultant mixture was heated at 80° C. for 10 hours with slow stirring at 150 to 200 rpm to form nanoparticles. Subsequently, the aqueous layer containing the formed nanoparticles was separated, and transferred to a recovery flask with a capacity of 100 mL. To this aqueous layer, triethanolamine (0.18 g) was added, followed by stirring at 60° C. for 1 hour. Next, to the obtained mixture solution, a separately prepared mixture of tetraethoxysilane (4 mL) and cyclohexane (16 mL) was slowly added to form a two-layer separation state constituted of an organic layer and an aqueous layer. Then, with slow stirring at 150 to 200 rpm, the resultant mixture was heated at 60° C. for 10 hours to form nanoparticles. Subsequently, the aqueous layer containing the formed nanoparticles was separated, and transferred to a round-bottom flask with a capacity of 300 mL. To this aqueous layer, a separately prepared mixture of hexamethyldisiloxane (10 g), ethanol (30 g), and 34% hydrochloric acid (30 g) was added, and the resultant mixture was heated at 72° C. for 2 hours with vigorous stirring to perform a surface hydrophobization treatment. Next, the mixture was cooled at room temperature, and then centrifuged (4000 rpm, 1 hour) to collect mesoporous-silica nanoparticles. Subsequently, the solvent was removed by washing by centrifugation (4000 rpm, 1 hour×3) using ethanol solvent to obtain the mesoporous-silica nanoparticles (surface-hydrophobized mesoporous-silica nanoparticles).

Figure 5:
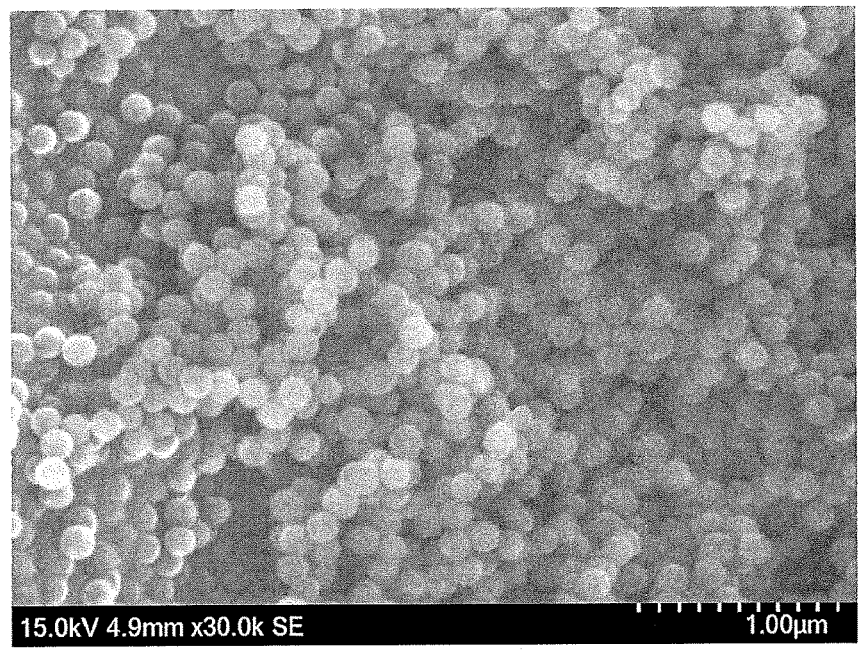
FIG. 5 is a scanning electron micrograph of mesoporous-silica nanoparticles obtained in Preparation Example 3.
Figure 6:
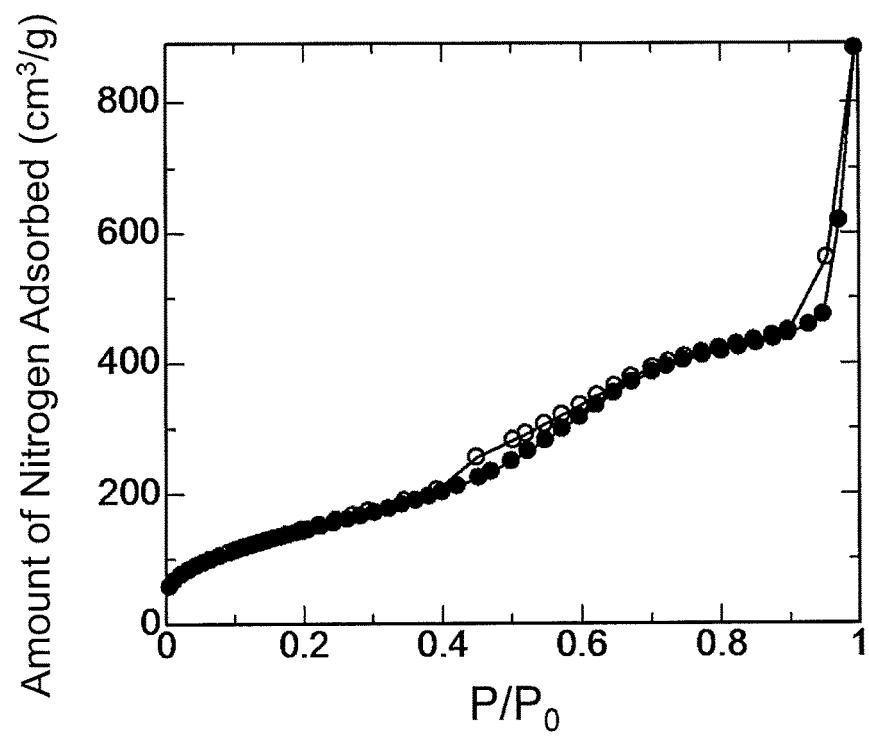
FIG. 6 is a graph showing a nitrogen adsorption isotherm of the mesoporous-silica nanoparticles obtained in Preparation Example 3.

The obtained mesoporous-silica nanoparticles were observed with a scanning electron microscope (SEM) in the same manner as in Preparation Example 1. The average particle diameter of the nanoparticles was found to be approximately 170 nm FIG. 5 shows a scanning electron micrograph of the mesoporous-silica nanoparticles obtained in Preparation Example 3. In addition, a nitrogen adsorption isotherm was measured. FIG. 6 shows a graph showing the nitrogen adsorption isotherm of the mesoporous-silica nanoparticles obtained in Preparation Example 3. From the measurement results of the nitrogen adsorption isotherm, the mesopore diameter was determined to be 4.8 nm, and the pore volume attributable to mesopores was determined to be 0.47 cm$^3$/g. Assuming that the density of the silica frame work was approximately 2 g/cm$^3$, the porosity was calculated to be 48%.

Example 1

First, ethanol was added to the mesoporous-silica nanoparticles obtained in Preparation Example 1 to prepare a particle layer raw material which was an ethanol dispersion (25 g) with a nanoparticle concentration of 3.0% by mass. In addition, a polymethyl methacrylate (PMMA) resin substrate (thickness: 2 mm) was prepared as a resin base member.

Next, the PMMA resin substrate was dip-coated with the ethanol dispersion at a rate of 50 mm/minute, and dried at room temperature for 2 hours to cause the nanoparticles to be adsorbed onto the surface of the PMMA resin substrate.

Subsequently, the PMMA resin substrate having the surface on which the nanoparticles were adsorbed was exposed to chloroform vapor at room temperature for 48 hours to plasticize the surface of the resin substrate into a flowable polymer state and embed the nanoparticles in the surface of the resin substrate. After that, the surface of the resin substrate in the flowable polymer state was hardened by exposure to air for 2 hours. After that, particles other than the nanoparticles directly fixed to the surface of the resin substrate were removed by ultrasonic cleaning (frequency: 42 kHz, output 100 W) in ethanol for 2 minutes. Thus, a PMMA resin substrate (antireflection member) having a particle layer of the nanoparticles directly fixed to the surface of the resin substrate was obtained.

The obtained antireflection member was observed with an atomic force microscope, and the height profile was measured. FIG. 7 shows the results. Part (A) of FIG. 7 is an atomic force microscope observation image (AFM image) of the antireflection member obtained in Example 1 of the present invention, part (B) of FIG. 7 is an enlarged AFM image of a portion of part (A), and part (C) of FIG. 7 is a graph showing a height profile of the white line segment in part (B). Note that each dashed circle shown in part (C) of FIG. 7 is a contour of a nanoparticle, where the nanoparticle was assumed to be a perfect sphere. From the AFM image shown in part (A) of FIG. 7, it was found that the mesoporous-silica nanoparticles were arranged in a mono-particle layer (single-particle layer) on the surface of the resin substrate. In addition, an analysis of the graph showing the height profile shown in part (C) of FIG. 7 revealed that the nanoparticles were embedded in the PMMA resin substrate by about 30 to 50 nm, the average value of depths of portions (nanoparticle-embedded portions) of the nanoparticles embedded in the surface of the resin base member was 45 nm, and the average value of the depths was 45% of the average particle diameter. Table 1 shows the obtained results.

Next, the obtained antireflection member (Example 1) and the above-described PMMA resin substrate (Reference Example 1) untreated for comparison were measured for the light transmittance and the light reflectance. FIG. 8 shows a graph showing wavelength dependence of light transmittance of the antireflection member obtained in Example 1 and the PMMA resin substrate of Reference Example 1. FIG. 9 shows a graph showing wavelength dependence of light reflectance of the antireflection member obtained in Example 1 and the PMMA resin substrate of Reference Example 1. As is apparent from a comparison between the results of Example 1 and the results of Reference Example 1 shown in FIGS. 8 and 9, the results of the measurement of the optical characteristics in the visible light wavelength region showed that the antireflection member obtained in Example 1 was improved in transmittance and reduced in reflectance in comparison with the untreated PMMA resin substrate (Reference Example 1). Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

TABLE 1

| | | Particles added | | | | Particle layer | |
|---|---|---|---|---|---|---|---|
| | Resin substrate | Particles | Average particle diameter [nm] | Particle arrangement method | Method for obtaining flowable polymer state | Average value (A) of depths nanoparticle-embedded portions [nm] | Ratio of (A) to average particle diameter [%] |
| Ex. 1 | PMMA resin | Mesoporous silica nanoparticles | 100 | Dip coating | Solvent vapor treatment (Chloroform vapor) | 45 | 45 |
| Ex. 2 | PMMA resin | Mesoporous silica nanoparticles | 100 | Dip coating | Heat treatment (hot air) | 40 | 40 |
| Ex. 3 | PC resin | Mesoporous silica nanoparticles | 100 | Dip coating | Solvent vapor treatment (Chloroform vapor) | 40 | 40 |
| Ex. 4 | PMMA resin | Mesoporous silica nanoparticles | 150 | Simple application (application with brush) | Solvent vapor treatment (Chloroform vapor) | 50 | 33 |
| Ex. 5 | PMMA resin | Mesoporous silica nanoparticles | 150 | Simple application (application with | Solvent vapor treatment (Chloroform vapor) | 50 | 33 |

TABLE 1-continued

| | | Particles added | | | | Particle layer | |
|---|---|---|---|---|---|---|---|
| | Resin substrate | Particles | Average particle diameter [nm] | Particle arrangement method | Method for obtaining flowable polymer state | Average value (A) of depths nanoparticle-embedded portions [nm] | Ratio of (A) to average particle diameter [%] |
| Ex. 6 | PMMA resin | Mesoporous silica nanoparticles | 150 | Spray coating | Solvent vapor treatment (Chloroform vapor) | 50 | 33 |
| Ex. 7 | PMMA resin | Mesoporous silica nanoparticles | 150 | Simple application (application with brush) | Solvent vapor treatment + heat treatment (Chloroform vapor) | 45 | 30 |
| Ex. 8 | PC resin | Mesoporous silica nanoparticles | 150 | Simple application (application with brush) | Heat treatment (hot air) | 45 | 30 |
| Ex. 9 | PC resin | Mesoporous silica nanoparticles | 150 | Spray coating | Solvent vapor treatment (Chloroform vapor) | 45 | 30 |
| Ex. 12 | Epoxy resin | Mesoporous silica nanoparticles | 150 | Transfer method | Semi-curing of thermosetting resin | 45 | 30 |
| Ex. 13 | Epoxy resin | Mesoporous silica nanoparticles | 150 | Transfer method | Semi-curing of thermosetting resin | 75 | 50 |
| Ex. 14 | Epoxy resin | Mesoporous silica nanoparticles | 170 | Transfer method | Semi-curing of thermosetting resin | 60 | 35.3 |
| Ex. 15 | PMMA resin | Mesoporous silica nanoparticles | 170 | Transfer method | Heat treatment (hot air) | 60 | 35.3 |
| Comp. Ex. 1 | PMMA resin | Spherical silica | 100 | Dip coating | Solvent vapor treatment (Chloroform vapor) | 45 | 45 |
| Comp. Ex. 2 | PC resin | Spherical silica | 100 | Dip coating | Solvent vapor treatment (Chloroform vapor) | 40 | 40 |
| Comp. Ex. 3 | PMMA resin | Spherical silica | 150 | Dip coating | Solvent vapor treatment (Chloroform vapor) | — | — |
| Comp. Ex. 4 | PC resin | Spherical silica | 150 | Dip coating | Solvent vapor treatment (Chloroform vapor) | 45 | 30 |
| Comp. Ex. 5 | PMMA resin | (Mesoporous silica nanoparticles) | (150) | (Dip coating) | — | — | — |

TABLE 2

| | | Maximum transmittance | | Minimum reflectance | | | Mechanical characteristic | |
|---|---|---|---|---|---|---|---|---|
| | Substrate | Maximum transmittance [%] | Wavelength [nm] | Minimum reflectance [%] | Wavelength [nm] | Transparency | Tape peel test | Cotton abrasion test |
| Ex. 1 | PMMA | 95.9 | 414 | 4.8 | 490 | ○ | ○ | ○ |
| Ex. 2 | PMMA | 96.2 | 509 | 3.9 | 620 | ○ | ○ | ○ |
| Ex. 3 | PC | 95.3 | 783 | 1.8 | 610 | Δ | ○ | ○ |
| Ex. 4 | PMMA | 96.9 | 478 | 2.8 | 451 | ○ | ○ | ○ |
| Ex. 5 | PMMA | 96.9 | 478 | 2.8 | 451 | ○ | ○ | ○ |
| Ex. 6 | PMMA | 97.6 | 490 | 2.3 | 500 | ○ | ○ | ○ |
| Ex. 7 | PMMA | 96.8 | 518 | 2.6 | 531 | ○ | ○ | Δ |
| Ex. 8 | PC | 93.9 | 696 | 4.4 | 540 | ○ | ○ | ○ |
| Ex. 9 | PC | 94.8 | 681 | 4.0 | 540 | ○ | ○ | ○ |
| Ex. 12 | Epoxy resin | 93.8 | 569 | 5.8 | 581 | ○ | ○ | ○ |
| Ex. 13 | Epoxy resin | 92.1 | 590 | 7.0 | 610 | ○ | ○ | ○ |
| Ex. 14 | Epoxy resin | 93.5 | 582 | 5.7 | 520 | ○ | ○ | ○ |
| Ex. 15 | PMMA | 94.5 | 645 | 3.6 | 531 | ○ | ○ | ○ |
| Comp. Ex. 1 | PMMA | 93.7 | 771 | 4.3 | 540 | Δ | x | x |
| Comp. Ex. 2 | PC | 88.8 | 800 | 8.3 | 611 | Δ | ○ | ○ |
| Comp. Ex. 3 | PMMA | — | — | — | — | — | — | — |
| Comp. Ex. 4 | PC | 92.7 | 800 | 3.1 | 554 | x | x | Δ |
| Comp. Ex. 5 | PMMA | 93.2 | 684 | 5.9 | 560 | Δ | ○ | ○ |
| Ref. Ex. 1 | PMMA | 92.6 | 776 | 8.3 | 630 | — | — | — |
| Ref. Ex. 2 | PC | 90.3 | 800 | 11.6 | 606 | — | — | — |
| Ref. Ex. 4 | Epoxy resin | 91.5 | 793 | 8.9 | 545 | — | — | — |

Example 2

First, ethanol was added to the mesoporous-silica nanoparticles obtained in Preparation Example 1 to prepare a particle layer raw material which was an ethanol dispersion (25 g) with a nanoparticle concentration of 3.0% by mass. In addition, a polymethyl methacrylate (PMMA) resin substrate (thickness: 2 mm) was prepared as a resin base member.

Next, the PMMA resin substrate was dip-coated with the ethanol dispersion at a rate of 50 mm/minute, and dried at room temperature for 2 hours to cause the nanoparticles to be adsorbed onto the surface of the PMMA resin substrate.

Subsequently, hot air (approximately 150 to 200° C.) was applied to the PMMA resin substrate having the surface on which the nanoparticles were adsorbed by using a heat gun for 2 minutes to plasticize the surface of the resin substrate into a flowable polymer state and to embed the nanoparticles in the surface of the resin substrate. After that, the surface of the resin substrate in the flowable polymer state was hardened by cooling to room temperature in approximately 2 minutes. After that, particles other than the nanoparticles directly fixed to the surface of the resin substrate were removed by ultrasonic cleaning (frequency: 42 kHz, output: 100 W) in ethanol for 2 minutes. Thus, a PMMA resin substrate (antireflection member) having a particle layer of the nanoparticles directly fixed to the surface of the resin substrate was obtained.

The obtained antireflection member was observed with an atomic force microscope, and the height profile was measured. The result showed that the mesoporous-silica nanoparticles were arranged in a mono-particle layer (single-particle layer) on the surface of the resin substrate. In addition, it was found that the nanoparticles were embedded in the PMMA resin substrate by about 30 to 50 nm, the average value of depths of portions (nanoparticle-embedded portions) of the nanoparticles embedded in the surface of the resin base member was 40 nm, and the average value of the depths was 40% of the average particle diameter. Table 1 shows the obtained results.

Next, the obtained antireflection member (Example 2) and the above-described PMMA resin substrate (Reference Example 1) untreated for comparison were measured for the light transmittance and the light reflectance. FIG. 10 shows a graph showing wavelength dependence of light transmittance of the antireflection member obtained in Example 2 and the PMMA resin substrate of Reference Example 1. FIG. 11 shows a graph showing wavelength dependence of light reflectance of the antireflection member obtained in Example 2 and the PMMA resin substrate of Reference Example 1. As is apparent from a comparison between the results of Example 2 and the results of Reference Example 1 shown in FIGS. 10 and 11, the results of the measurement of the optical characteristics in the visible light wavelength region showed that the antireflection member obtained in Example 2 was improved in transmittance and reduced in reflectance in comparison with the untreated PMMA resin substrate (Reference Example 1). Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

Example 3

A polycarbonate (PC) resin substrate (antireflection member) having a particle layer of mesoporous-silica nanoparticles directly fixed to a surface of the resin substrate was obtained in the same manner as in Example 1, except that a polycarbonate (PC) resin substrate ("PolicaAce ECK-100UU" manufactured by Sumitomo Bakelite Co., Ltd., thickness: 2 mm) was used as the resin base member instead of the PMMA resin substrate.

The obtained antireflection member was observed with an atomic force microscope, and the height profile was measured. The result showed that the mesoporous-silica nanoparticles were arranged in a mono-particle layer (single-particle layer) on the surface of the resin substrate. In addition, it was found that the nanoparticles were embedded in the PC resin substrate by about 30 to 50 nm, the average value of depths of portions (nanoparticle-embedded portions) of the nanoparticles embedded in the surface of the resin base member was 40 nm, and the average value of the depths was 40% of the average particle diameter. Table 1 shows the obtained results.

Next, the obtained antireflection member (Example 3) and the above-described PC resin substrate (Reference Example 2) untreated for comparison were measured for the light transmittance and the light reflectance. FIG. 12 shows a graph showing wavelength dependence of light transmittance of the antireflection member obtained in Example 3 and the PC resin substrate of Reference Example 2. FIG. 13 shows a graph showing wavelength dependence of light reflectance of the antireflection member obtained in Example 3 and the PC resin substrate of Reference Example 2. As is apparent from a comparison between the results of Example 3 and the results of Reference Example 2 shown in FIGS. 12 and 13, the results of the measurement of the optical characteristics in the visible light wavelength region showed that the antireflection member obtained in Example 3 was improved in transmittance and reduced in reflectance in comparison with the untreated PC resin substrate (Reference Example 2). Note that Table 2 shows the highest transmittance and the lowest reflectance of the obtained antireflection member. Further, a transparency evaluation test was conducted based on visual observation, and the result was that white turbidity due to light scattering was slightly observed. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

Example 4

First, ethanol was added to the mesoporous-silica nanoparticles obtained in Preparation Example 2 to prepare a particle layer raw material which was an ethanol dispersion (25 g) with a nanoparticle concentration of 3.0% by mass. In addition, a polymethyl methacrylate (PMMA) resin substrate (thickness: 2 mm) was prepared as a resin base member.

Next, the ethanol dispersion was applied onto both surfaces of the PMMA resin substrate by using a flat brush (material: goat hair, head length: 12 mm, head width: 8 mm, and head thickness: 2 mm), followed by drying at room temperature for 2 hours to cause the nanoparticles to be adsorbed onto the surface of the PMMA resin substrate.

Subsequently, the PMMA resin substrate having the surface on which the nanoparticles were adsorbed was exposed to chloroform vapor at room temperature for 48 hours to plasticize the surface of the resin substrate into a flowable polymer state and embed the nanoparticles in the surface of the resin substrate. After that, the surface of the resin substrate in the flowable polymer state was hardened by exposure to air for 2 hours. After that, particles other than nanoparticles directly fixed to the surface of the resin substrate were removed by ultrasonic cleaning (frequency: 42 kHz, output: 100 W) in ethanol for 2 minutes. Thus, a PMMA resin substrate (antireflection member) having particle layers of the nanoparticles directly fixed to the both surfaces of the resin substrate was obtained.

The obtained antireflection member was observed with an atomic force microscope, and the height profile was measured. FIG. 14 shows the results. Part (A) of FIG. 14 is an atomic force microscope observation image (AFM image) of the antireflection member obtained in Example 4 of the present invention, part (B) of FIG. 14 is an enlarged AFM image of a portion of part (A), and part (C) of FIG. 14 is a graph showing a height profile of the white line segment in part (B). From the AFM image shown in part (A) of FIG. 14, it was found that the mesoporous-silica nanoparticles were arranged in a mono-particle layer (single-particle layer) on a surface of the resin substrate. Note that it was found that, also on the other surface of the resin substrate, the nanoparticles were similarly arranged in a mono-particle layer (single-particle layer). Moreover, an analysis of the graph showing the height profile shown in part (C) of FIG. 14 revealed that the nanoparticles were embedded in the PMMA resin substrate by about 30 to 60 nm, the average value of depths of portions (nanoparticle-embedded portions) of the nanoparticles embedded in a surface of the resin base member was 50 nm, and the average value of the depths was 33% of the average particle diameter. Note that it was found that, also on the other surface of the surfaces of the resin substrate, the nanoparticles were similarly embedded in the PMMA resin substrate. Table 1 shows the obtained results.

Next, the obtained antireflection member (Example 4) and the above-described PMMA resin substrate (Reference Example 1) untreated for comparison were measured for the light transmittance and the light reflectance. FIG. 15 shows a graph showing wavelength dependence of light transmittance of the antireflection member obtained in Example 4 and the PMMA resin substrate of Reference Example 1. FIG. 16 shows a graph showing wavelength dependence of light reflectance of the antireflection member obtained in Example 4 and the PMMA resin substrate of Reference Example 1. As is apparent from a comparison between the results of Example 4 and the results of Reference Example 1 shown in FIGS. 15 and 16, the results of the measurement of the optical characteristics in the visible light wavelength region showed that the antireflection member obtained in Example 4 was improved in transmittance and reduced in reflectance in comparison with the untreated PMMA resin substrate (Reference Example 1). Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

Next, the obtained antireflection member was subjected to the thermal cycle test. The results showed that the transmittance before the test did not change after the test, indicating that the antireflection member had sufficient durability against thermal deformation of the substrate. FIG. 17 shows a graph showing the results of the thermal cycle test of the antireflection member obtained in Example 4. In addition, FIG. 18 shows a photograph of the appearance of the antireflection member obtained in Example 4 and the PMMA resin substrate (Reference Example 1) for comparison on each of which light scattered by paper on which letters were written was cast. As is apparent from a comparison between the results of Example 4 and the results of Reference Example 1 shown in FIG. 18, it was found that the antireflection member of this example was capable of reducing the reflections, while retaining the transparency of the resin base member, and hence had an improved viewability.

Example 5

A PMMA resin curved-surface substrate (antireflection member) having particle layers of mesoporous-silica nanoparticles directly fixed to both surfaces of the resin substrate was obtained in the same manner as in Example 4, except that a PMMA resin substrate having curved surfaces (width: 30 mm, length: 70 mm, thickness: 2 mm, and radius of curvature of curved surface portions: approximately 15 mm) was used as the resin base member.

The obtained antireflection member was observed with an atomic force microscope, and the height profile was measured. The results showed that the mesoporous-silica nanoparticles were arranged in a mono-particle layer (single-particle layer) on each of the surfaces of the resin substrate. In addition, it was also found that the nanoparticles were embedded in each surface of the PMMA resin substrate by about 30 to 60 nm, and the average value of depths of portions (nanoparticle-embedded portions) of the nanoparticles embedded in each surface of the resin base member was 50 nm, and the average value of the depths was 33% of the average particle diameter. Table 1 shows the obtained results.

Next, the obtained antireflection member (Example 5) and the above-described PMMA resin substrate having curved surfaces untreated for comparison (Reference Example 3) were measured for the light transmittance and the light reflectance. The results of measurement of the optical characteristics in the visible light wavelength region showed that the antireflection member obtained in Example 5 was improved in transmittance and reduced in reflectance in comparison with the untreated PMMA resin substrate having curved surfaces (Reference Example 3). Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Subsequently, the obtained antireflection member was subjected to the tape peel test and the cotton abrasion test, and the results were that no detachment of the nanoparticles from the surfaces of the antireflection member was observed. Table 2 shows the obtained results. In addition, FIG. 19 shows a photograph of the appearance of the antireflection member having curved surfaces obtained in Example 5 and the PMMA resin substrate having curved surfaces for comparison (Reference Example 3) on each of which light scattered by paper on which letters were written was cast. As is apparent from a comparison between the results of Example 5 and the results of Reference Example 3 shown in FIG. 19, it was found that the antireflection member of this example was capable of reducing the reflections, while retaining the transparency of the resin base member, and hence had an improved viewability although the resin substrate having curved surfaces was used.

Example 6

First, a particle layer raw material (ethanol dispersion) and a polymethyl methacrylate (PMMA) resin substrate were prepared in the same manner as in Example 4. Next, the ethanol dispersion was applied onto both surfaces of the PMMA resin substrate by using a spray, followed by drying at room temperature for 2 hours to cause the mesoporous-silica nanoparticles to be adsorbed onto the surfaces of the PMMA resin substrate. After that, a PMMA resin substrate (antireflection member) having particle layers of the nanoparticles directly fixed to both of the surfaces of the resin substrate was obtained in the same manner as in Example 4.

The obtained antireflection member was observed with an atomic force microscope, and the height profile was measured. The results showed that the nanoparticles were arranged in a mono-particle layer (single-particle layer) on each of the two surfaces of the resin substrate. In addition, it was found that, on each of the two surfaces of the resin substrate, the nanoparticles were embedded in the PMMA resin substrate by about 30 to 60 nm, the average value of depths of portions (nanoparticle-embedded portions) of the nanoparticles embedded in the surface of the resin base member was 50 nm, and the average value of the depths was 33% of the average particle diameter. Table 1 shows the obtained results.

Next, the obtained antireflection member (Example 6) and the above-described PMMA resin substrate (Reference Example 1) untreated for comparison were measured for the light transmittance and the light reflectance. FIG. 20 shows a graph showing wavelength dependence of light transmittance of the antireflection member obtained in Example 6 and the PMMA resin substrate of Reference Example 1. FIG. 21 shows a graph showing wavelength dependence of light reflectance of the antireflection member obtained in Example 6 and the PMMA resin substrate of Reference Example 1. As is apparent from a comparison between the results of Example 6 and the results of Reference Example 1 shown in FIGS. 20 and 21, the results of the measurement of the optical characteristics in the visible light wavelength region showed that the antireflection member obtained in Example 6 was improved in transmittance and reduced in reflectance in comparison with the untreated PMMA resin substrate (Reference Example 1). Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

Example 7

A PMMA resin substrate (antireflection member) having particle layers of mesoporous-silica nanoparticles directly fixed to both surfaces of the resin substrate was obtained in the same manner as in Example 4, except that the plasticizing treatment conditions were changed to exposure to chloroform vapor at 50° C. for 6 hours.

The obtained antireflection member was observed with an atomic force microscope, and the height profile was measured. The results showed that the nanoparticles were arranged in a mono-particle layer (single-particle layer) on each of the two surfaces of the resin substrate. In addition, on each of the two surfaces of the resin substrate, the nanoparticles were embedded in the PMMA resin substrate by about 30 to 50 nm, the average value of depths of portions (nanoparticle-embedded portions) of the nanoparticles embedded in the surface of the resin base member was 45 nm, and the average value of the depths was 30% of the average particle diameter. Table 1 shows the obtained results.

Next, the obtained antireflection member (Example 7) and the above-described PMMA resin substrate (Reference Example 1) untreated for comparison were measured for the light transmittance and the light reflectance. FIG. 22 shows a graph showing wavelength dependence of light transmittance of the antireflection member obtained in Example 7 and the PMMA resin substrate of Reference Example 1. FIG. 23 shows a graph showing wavelength dependence of light reflectance of the antireflection member obtained in Example 7 and the PMMA resin substrate of Reference Example 1. As is apparent from a comparison between the results of Example 7 and the results of Reference Example 1 shown in FIGS. 22 and 23, the results of the measurement of the optical characteristics in the visible light wavelength region showed that the antireflection member obtained in Example 7 was improved in transmittance and reduced in reflectance in comparison with the untreated PMMA resin substrate (Reference Example 1). Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that slight whitening was observed in the abrasion test, but no detachment of the nanoparticles from the surface of the antireflection member was observed. Table 2 shows the obtained results.

Example 8

First, ethanol was added to the mesoporous-silica nanoparticles obtained in Preparation Example 2 to prepare a particle layer raw material which was an ethanol dispersion (25 g) with a nanoparticle concentration of 3.0% by mass. In addition, a polycarbonate (PC) resin substrate ("PolicaAce ECK-100UU" manufactured by Sumitomo Bakelite Co., Ltd., thickness: 2 mm) was prepared as a resin base member.

Next, the ethanol dispersion was applied onto both surfaces of this PC resin substrate by using a flat brush (material: goat hair, head length: 12 mm, head width: 8 mm, head thickness: 2 mm), followed by drying at room temperature for 2 hours to cause the nanoparticles to be adsorbed onto the surfaces of the PC resin substrate.

Subsequently, hot air (approximately 150 to 250° C.) was applied to the PC resin substrate having the surfaces on which the nanoparticles were adsorbed by using a heat gun for 2 minutes to plasticize the surface of the resin substrate into a flowable polymer state and embed the nanoparticles in the surface of the resin substrate. After that, the surfaces of the resin substrate in the flowable polymer state were hardened by cooling at room temperature for approximately 2 minutes. After that, particles other than nanoparticles directly fixed to the surfaces of the resin substrate were removed by ultrasonic cleaning (frequency: 42 kHz, output: 100 W) in ethanol for 2 minutes. Thus, a PC resin substrate (antireflection member) having particle layers of the nanoparticles directly fixed to both of the surfaces of the resin substrate was obtained.

The obtained antireflection member was observed with an atomic force microscope, and the height profile was measured. The results showed that the nanoparticles were arranged in a mono-particle layer (single-particle layer) on each of the two surfaces of the resin substrate. In addition, it was found that, on each of the two surfaces of the resin substrate, the nanoparticles were embedded in the PMMA resin substrate by about 30 to 50 nm, the average value of depths of portions (nanoparticle-embedded portions) of the nanoparticles embedded in the surface of the resin base member was 45 nm, and the average value of the depths was 30% of the average particle diameter. Table 1 shows the obtained results.

Next, the obtained antireflection member (Example 8) and the above-described PC resin substrate (Reference Example 2) untreated for comparison were measured for the light transmittance and the light reflectance. FIG. 24 shows a graph showing wavelength dependence of light transmittance of the antireflection member obtained in Example 8 and the PC resin substrate of Reference Example 2. FIG. 25 shows a graph showing wavelength dependence of light reflectance of the antireflection member obtained in Example 8 and the PC resin substrate of Reference Example 2. As is apparent from a comparison between the results of Example 8 and the results of Reference Example 2 shown in FIGS. 24 and 25, the results of the measurement of the optical characteristics in the visible light wavelength region showed that the antireflection member obtained in Example 8 was improved in transmittance and reduced in reflectance in comparison with the untreated PC resin substrate (Reference Example 2). Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

Example 9

A PC resin substrate (antireflection member) having particle layers of mesoporous-silica nanoparticles directly fixed to both surfaces of the resin substrate was obtained in the same manner as in Example 6, except that a polycarbonate (PC) resin substrate ("PolicaAce ECK-100UU" manufactured by Sumitomo Bakelite Co., Ltd., thickness: 2 mm) was used as the resin base member instead of the PMMA resin substrate.

The obtained antireflection member was observed with an atomic force microscope, and the height profile was measured. The results showed that the nanoparticles were arranged in a mono-particle layer (single-particle layer) on each of the two surfaces of the resin substrate. In addition, it was found that, on each of the two surfaces of the resin substrate, the nanoparticles were embedded in the PMMA resin substrate by about 30 to 50 nm, the average value of depths of portions (nanoparticle-embedded portions) of the nanoparticles embedded in the surface of the resin base member was 45 nm, and the average value of the depths was 30% of the average particle diameter. Table 1 shows the obtained results.

Next, the obtained antireflection member (Example 9) and the above-described PC resin substrate (Reference Example 2) untreated for comparison were measured for the light transmittance and the light reflectance. FIG. 26 shows a graph showing wavelength dependence of light transmittance of the antireflection member obtained in Example 9 and the PC resin substrate of Reference Example 2. FIG. 27 shows a graph showing, wavelength dependence of light reflectance of the antireflection member obtained in Example 9 and the PC resin substrate of Reference Example 2. As is apparent from a comparison between the results of Example 9 and the results of Reference Example 2 shown in FIGS. 26 and 27, the results of the measurement of the optical characteristics in the visible light wavelength region showed that the antireflection member obtained in Example 9 was improved in transmittance and reduced in reflectance in comparison with the untreated PC resin substrate (Reference Example 2). Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

Comparative Example 1

A material for comparison having a particle layer of spherical silica fixed to a surface of a PMMA resin substrate was obtained in the same manner as in Example 1, except that spherical silica (manufactured by Nippon Shokubai Co., Ltd. under the product name of "KE-P10", average particle diameter: 100 nm) was used as the particle layer raw material instead of the mesoporous-silica nanoparticles.

The obtained material for comparison and the untreated PMMA resin substrate (Reference Example 1) were measured for the light transmittance and the light reflectance. FIG. 28 shows a graph showing wavelength dependence of light transmittance of the material for comparison obtained in Comparative Example 1 and the PMMA resin substrate of Reference Example 1. FIG. 29 shows a graph showing wavelength dependence of light reflectance of the material for comparison obtained in Comparative Example 1 and the PMMA resin substrate of Reference Example 1. As is apparent from a comparison between the results of Comparative Example 1 and the results of Reference Example 1 shown in FIGS. 28 and 29, the results of the measurement of the optical characteristics in the visible light wavelength region showed that the material for comparison obtained in Comparative Example 1 had a lower reflectance than the untreated PMMA resin substrate (Reference Example 1), but no great improvement in transmittance was observed. Note that Table 2 shows the highest transmittance and the lowest reflectance of the obtained material for comparison. Further, a transparency evaluation test was conducted based on visual observation, and the result was that white turbidity due to light scattering was slightly observed. Table 2 shows the obtained results. Next, the obtained material for comparison was subjected to the tape peel test, and the result was that the spherical silica on the surface of the material for comparison was easily detached, indicating that the adhesion between the PMMA resin substrate and the spherical silica was insufficient. In addition, the cotton abrasion test was conducted, and the result was that apparent whitening was observed in the material for comparison. Table 2 shows the obtained results.

Comparative Example 2

A material for comparison having a particle layer of spherical silica fixed to a surface of a PC resin substrate was obtained in the same manner as in Example 3, except that spherical silica (manufactured by Nippon Shokubai Co., Ltd. under the product name of "KE-P10", average particle diameter: 100 nm) was used as the particle layer raw material instead of the mesoporous-silica nanoparticles.

The obtained material for comparison and the untreated PC resin substrate (Reference Example 2) were measured for the light transmittance and the light reflectance. FIG. 30 shows a graph showing wavelength dependence of light transmittance of the material for comparison obtained in Comparative Example 2 and the PC resin substrate of Reference Example 2. FIG. 31 shows a graph showing wavelength dependence of light reflectance of the material for comparison obtained in Comparative Example 2 and the PC resin substrate of Reference Example 2. As is apparent from a comparison between the results of Comparative Example 2 and the results of Reference Example 2 shown in FIGS. 30 and 31, the results of the measurement of the optical characteristics in the visible light wavelength region showed that the material for comparison obtained in Comparative Example 2 had a lower reflectance than the untreated PC resin substrate (Reference Example 2), but has a poor transmittance. Note that Table 2 shows the highest transmittance and the lowest reflectance of the obtained material for comparison. Further, a transparency evaluation test was conducted based on visual observation, and the result was that white turbidity due to light scattering was slightly observed. Table 2 shows the obtained results. Next, the obtained material for comparison was subjected to the tape peel test, and the result was that no detachment of the spherical silica from the surface of the material for comparison was observed. Table 2 shows the obtained results.

Comparative Example 3

Preparation of a material for comparison was attempted in the same manner as in Example 1, except that spherical silica (manufactured by Nippon Shokubai Co., Ltd. under the product name of "KE-P15", average particle diameter: 150 nm) was used as the particle layer raw material instead of the mesoporous-silica nanoparticles. However, nearly all of the spherical silica was detached by the ultrasonic cleaning treatment in ethanol, and it was not possible to obtain a PMMA resin substrate to which the spherical silica was fixed.

Comparative Example 4

A material for comparison having a particle layer of spherical silica fixed to a surface of a PC resin substrate was obtained in the same manner as in Example 1, except that a polycarbonate (PC) resin substrate ("PolicaAce ECK-100UU" manufactured by Sumitomo Bakelite Co., Ltd., thickness: 2 mm) was used as the resin base member instead of the PMMA resin substrate, and that spherical silica (manufactured by Nippon Shokubai Co., Ltd. under the product name of "KE-P15", average particle diameter: 150 nm) was used as the particle layer raw material instead of the mesoporous-silica nanoparticles.

The obtained material for comparison and the untreated PC resin substrate (Reference Example 2) were measured for the light transmittance and the light reflectance. FIG. 32 shows a graph showing wavelength dependence of light transmittance of the material for comparison obtained in Comparative Example 4 and the PC resin substrate of Reference Example 2. FIG. 33 shows a graph showing wavelength dependence of light reflectance of the material for comparison obtained in Comparative Example 4 and the PC resin substrate of Reference Example 2. As is apparent from a comparison between the results of Comparative Example 4 and the results of Reference Example 2 shown in FIGS. 32 and 33, the results of the measurement of the optical characteristics in the visible light wavelength region showed that the material for comparison obtained in Comparative Example 4 had a lower reflectance than the untreated PC resin substrate (Reference Example 2), but no great improvement in transmittance was observed. Note that Table 2 shows the highest transmittance and the lowest reflectance of the obtained material for comparison. Further, a transparency evaluation test was conducted based on visual observation, and the result was that apparent white turbidity was observed. Table 2 shows the obtained results. Next, the obtained material for comparison was subjected to the tape peel test and the cotton abrasion test. The results showed that the spherical silica was easily detached from the surface of the material for comparison, indicating that the adhesion between the PC resin substrate and the spherical silica was insufficient. Table 2 shows the obtained results.

Comparative Example 5

First, 150 mg of the mesoporous-silica nanoparticles obtained in Preparation Example 2 and 250 mg of polydimethoxysiloxane (manufactured by Gelest under the product name of "PSI-026") were dispersed in 5 g of ethanol, and then 2 M hydrochloric acid (100 μL) was added thereto, followed by stirring at 25° C. for 6 hours to obtain a sol dispersion. Next, the obtained sol dispersion was diluted 8-fold with ethanol solvent, and then a PMMA resin substrate was dip-coated with this diluted sol dispersion at a rate of 20 mm/minute, followed by drying at room temperature for 2 hours. In this manner, a PMMA resin substrate (a material for comparison) was prepared which had a coating comprising the nanoparticles and a silica-based matrix on the surface of the PMMA resin substrate.

The obtained material for comparison and the untreated PMMA resin substrate (Reference Example 1) were measured for the light transmittance and the light reflectance. FIG. 34 shows a graph showing wavelength dependence of light transmittance of the material for comparison obtained in Comparative Example 5 and the PMMA resin substrate of Reference Example 1. FIG. 35 shows a graph showing wavelength dependence of light reflectance of the material for comparison obtained in Comparative Example 5 and the PMMA resin substrate of Reference Example 1. As is apparent from a comparison between the results of Comparative Example 5 and the results of Reference Example 1 shown in FIGS. 34 and 35, the results of the measurement of the optical characteristics in the visible light wavelength region showed that the transmittance of the material for comparison obtained in Comparative Example 5 was poorer in the wavelength region from 400 to 500 nm, but slightly better in the wavelength region not lower than 500 nm than the untreated PMMA resin substrate (Reference Example 1), and that the reflectance of the material for comparison obtained in Comparative Example 5 was lowered by 2 to 3% in the entire visible light wavelength region. Note that Table 2 shows the highest transmittance and the lowest reflectance of the obtained material for comparison. Further, a transparency evaluation test was conducted based on visual observation, and the result was that white turbidity due to light scattering was observed only slightly. Table 2 shows the obtained results. Next, the obtained material for comparison was subjected to the tape peel test and the cotton abrasion test, and the results were that neither detachment of the nanoparticles nor the peeling of the coating was observed. Table 2 shows the obtained results.

Next, the obtained material for comparison was subjected to the thermal cycle test. The result was that apparent decrease in transmittance was observed after the test, and the antireflection layer of this comparative example was apparently degraded by the thermal deformation of the substrate, indicating that the material for comparison did not have a sufficient durability against thermal deformation of the substrate. FIG. 36 shows a graph showing the results of the thermal cycle test of the material for comparison obtained in Comparative Example 5.

Example 10

Fabrication of Transfer Member 1

First, ethanol was added to the mesoporous-silica nanoparticles obtained in Preparation Example 2 to prepare a particle layer raw material which was an ethanol dispersion (25 g) with a nanoparticle concentration of 3.0% by mass. In addition, a polycarbonate film (width: 40 mm, length: 60 mm, and thickness: 0.1 mm) was prepared as a release base member.

Next, the ethanol dispersion was applied onto one of the surfaces of the release base member by using a flat brush, followed by drying at room temperature for 2 hours to cause the nanoparticles to be adsorbed onto the release base member surface.

Subsequently, the release base member having the surface on which the nanoparticles were adsorbed was exposed to chloroform vapor at room temperature for 24 hours to slightly plasticize the surface of the release substrate into a semi-flowable polymer state and shallowly embed the nanoparticles in the surface of the release base member. After that, the surface of the release base member in the semi-flowable polymer state was hardened by exposure to air for 2 hours. After that, particles other than the nanoparticles provisionally fixed to the surface of the release base member were removed by ultrasonic cleaning (frequency: 42 kHz, output: 100 W) in ethanol for 2 minutes. Thus, a transfer member having a particle layer of the nanoparticles provisionally fixed to the one surface of the release base member was obtained.

The obtained transfer member was observed with an atomic force microscope, and the height profile was measured. The result showed that the mesoporous-silica nanoparticles were densely arranged in a mono-particle layer (single-particle layer) on the surface of the release base member as shown in FIG. 37. In addition, it was found that the nanoparticles were embedded in the release base member by about 5 to 20 nm, the average value of depths of portions (nanoparticle-embedded portions) of the nanoparticles embedded in the surface of the release base member was 15 nm, and the average value of the depths was 10% of the average particle diameter.

Next, the obtained transfer member was subjected to the tape peel test, and the result showed that the nanoparticles on the surface of the release base member were completely detached as shown in FIG. 38. From this result, it was found that the nanoparticles on the surface of the release base member in the obtained transfer member were in a "provisionally fixed" state, where the nanoparticles were not detached by the ultrasonic cleaning, but detached in the tape peel test.

Example 11

Fabrication of Transfer Member 2

First, ethanol was added to the mesoporous-silica nanoparticles obtained in Preparation Example 3 to prepare a particle layer raw material which was an ethanol dispersion (30 g) with a nanoparticle concentration of 6.8% by mass. In addition, a polycarbonate film (width: 40 mm, length: 60 mm, and thickness: 0.1 mm) was prepared as a release base member.

Next, the ethanol dispersion was applied onto one of the surfaces of the release base member by using a flat brush, followed by drying at room temperature for 2 hours to cause the nanoparticles to be adsorbed onto the release base member surface.

Subsequently, the release base member having the surface on which the nanoparticles were adsorbed was exposed to chloroform vapor at room temperature for 24 hours to slightly plasticize the surface of the release substrate into a semi-flowable polymer state and shallowly embed the nanoparticles in the surface of the release base member. After that, the surface of the release base member in the semi-flowable polymer state was hardened by exposure to air for 2 hours. After that, particles other than the nanoparticles provisionally fixed to the surface of the release base member were removed by ultrasonic cleaning (frequency: 42 kHz, output: 100 W) in ethanol for 2 minutes. Thus, a transfer member having a particle layer of the nanoparticles provisionally fixed to the one surface of the release base member was obtained.

The obtained transfer member was observed with an atomic force microscope, and the height profile was measured. The result showed that the mesoporous-silica nanoparticles were densely arranged in a mono-particle layer (single-particle layer) on the surface of the release base member as shown in FIG. 39. In addition, it was found that the nanoparticles were embedded in the release base member by about 5 to 20 nm, the average value of depths of portions (nanoparticle-embedded portions) of the nanoparticles embedded in the surface of the release base member was 15 nm, and the average value of the depths was 8.9% of the average particle diameter.

Next, the obtained transfer member was subjected to the tape peel test, and the result showed that the nanoparticles on the surface of the release base member were completely detached as shown in FIG. 40. From these results, it was found that the nanoparticles on the surface of the release base member in the obtained transfer member were in a "provisionally fixed" state, where the nanoparticles were not detached by the ultrasonic cleaning, but detached in the tape peel test.

Example 12

Fabrication of Antireflection Member Using Transfer Member 1

A two-part type epoxy resin ("Crystal Resin II SP-C" manufactured by NISSIN RESIN Co., Ltd.) was applied onto one of the surfaces of a glass substrate, and allowed to stand at room temperature for 9 hours to achieve a semi-cured state (flowable polymer state). The surface of the epoxy resin base member on the substrate was brought into contact with the surface of the transfer member fabricated in Example 10 on the side on which the mesoporous-silica nanoparticles were provisionally fixed. Further, after pressing under a pressure of approximately 1.5 kg/cm$^2$ for 10 seconds, the release base member was peeled off. Thus, the nanoparticles were transferred to the surface of the resin base member. Further, by allowing the resin base member to stand at room temperature for 15 hours, the epoxy resin was sufficiently cured. Thus, an antireflection member having a particle layer of the nanoparticles directly fixed to the surface of the resin base member was obtained.

The obtained antireflection member was observed with an atomic force microscope, and the height profile was measured. The result showed that the mesoporous-silica nanoparticles were almost completely transferred from the transfer member to the surface of the resin base member, and densely arranged in a mono-particle layer (single-particle layer) as shown in FIG. 41. In addition, it was found that the nanoparticles were embedded in the resin base member by about 40 to 50 nm, the average value of depths of portions (nanoparticle-embedded portions) of the nanoparticles embedded in the surface of the resin base member was 45 nm, and the average value of the depths was 30% of the average particle diameter. Table 1 shows the obtained results.

Next, the obtained antireflection member (Example 12) and an epoxy-coated substrate for comparison (Reference Example 4) to which the nanoparticles were not transferred were measured for the light transmittance and the light reflectance. FIG. 42 shows a graph showing wavelength dependence of light transmittance of the antireflection member obtained in Example 12 and the epoxy-coated substrate of Reference Example 4. FIG. 43 shows a graph showing wavelength dependence of light reflectance of the antireflection member obtained in Example 12 and the epoxy-coated substrate of Reference Example 4. As is apparent from a comparison between the results of Example 12 and the results of Reference Example 4 shown in FIGS. 42 and 43, the results of the measurement of the optical characteristics in the visible light wavelength region showed that the antireflection member obtained in Example 12 was improved in transmittance by 2.0 to 2.6% and reduced in reflectance by 2.0 to 3.0% in comparison with the epoxy-coated substrate (Reference Example 4) to which the nanoparticles were not transferred. Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

Example 13

Fabrication of Antireflection Member Using Transfer Member 2

A two-part type epoxy resin ("Crystal Resin II SP-C" manufactured by NISSIN RESIN Co., Ltd.) was applied onto one of the surfaces of a glass substrate, and allowed to stand at room temperature for 8 hours to achieve a semi-cured state (flowable polymer state). The surface of the epoxy resin base member on the substrate was brought into contact with the surface of the transfer member fabricated in Example 10 on the side on which the mesoporous-silica nanoparticles were provisionally fixed. Further, after pressing under a pressure of approximately 1.5 kg/cm$^2$ for 10 seconds, the release base member was peeled off. Thus, the nanoparticles were transferred to the surface of the resin base member. Further, by allowing the resin base member to stand at room temperature for 16 hours, the epoxy resin was sufficiently cured. Thus, an antireflection member having a particle layer of the nanoparticles directly fixed to the surface of the resin base member was obtained.

The obtained antireflection member was observed with an atomic force microscope, and the height profile was measured. The result showed that the mesoporous-silica nanoparticles were almost completely transferred from the transfer member to the surface of the resin base member, and densely arranged in a mono-particle layer (single-particle layer) as shown in FIG. 44. In addition, it was found that the nanoparticles were embedded in the resin base member by about 65 to 85 nm, the average value of depths of portions (nanoparticle-embedded portions) of the nanoparticles embedded in the surface of the resin base member was 75 nm, and the average value of the depths was 50% of the average particle diameter. Table 1 shows the obtained results.

Next, the obtained antireflection member (Example 13) and an epoxy-coated substrate for comparison (Reference Example 4) to which the nanoparticles were not transferred were measured for the light transmittance and the light reflectance. FIG. 45 shows a graph showing wavelength dependence of light transmittance of the antireflection member obtained in Example 13 and the epoxy-coated substrate of Reference Example 4. FIG. 46 shows a graph showing wavelength dependence of light reflectance of the antireflection member obtained in Example 13 and the epoxy-coated substrate of Reference Example 4. As is apparent from a comparison between the results of Example 13 and the results of Reference Example 4 shown in FIGS. 45 and 46, the results of the measurement of the optical characteristics in the visible light wavelength region showed that the antireflection member obtained in Example 13 was improved in transmittance by approximately 1.0% and reduced in reflectance by 1.0 to 1.6% in comparison with the epoxy-coated substrate (Reference Example 4) to which the nanoparticles were not transferred. Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

Example 14

Fabrication of Antireflection Member Using Transfer Member 3

A two-part type epoxy resin ("Crystal Resin II SP-C" manufactured by NISSIN RESIN Co., Ltd.) was applied onto one of the surfaces of a glass substrate, and allowed to stand at room temperature for 9 hours to achieve a semi-cured state (flowable polymer state). The surface of the epoxy resin base member on the substrate was brought into contact with the surface of the transfer member fabricated in Example 11 on the side on which the mesoporous-silica nanoparticles were provisionally fixed. Further, after pressing under a pressure of approximately 1.5 kg/cm$^2$ for 10 seconds, the release base member was peeled off. Thus, the nanoparticles were transferred to the surface of the resin base member. Further, by allowing the resin base member to stand at room temperature for 15 hours, the epoxy resin was sufficiently cured. Thus, an antireflection member having a particle layer of the nanoparticles directly fixed to the surface of the resin base member was obtained.

The obtained antireflection member was observed with an atomic force microscope, and the height profile was measured. The result showed that the mesoporous-silica nanoparticles were almost completely transferred from the transfer member to the surface of the resin base member, and densely arranged in a mono-particle layer (single-particle layer) as shown in FIG. 47. In addition, it was found that the nanoparticles were embedded in the resin base member by about 50 to 70 nm, the average value of depths of portions (nanoparticle-embedded portions) of the nanoparticles embedded in the surface of the resin base member was 60 nm, and the average value of the depths was 35.3% of the average particle diameter. Table 1 shows the obtained results.

Next, the obtained antireflection member (Example 14) and an epoxy-coated substrate for comparison (Reference Example 4) to which the nanoparticles were not transferred were measured for the light transmittance and the light reflectance. FIG. 48 shows a graph showing wavelength dependence of light transmittance of the antireflection member obtained in Example 14 and the epoxy-coated substrate of Reference Example 4. FIG. 49 shows a graph showing wavelength dependence of light reflectance of the antireflection member obtained in Example 14 and the epoxy-coated substrate of Reference Example 4. As is apparent from a comparison between the results of Example 14 and the results of Reference Example 4 shown in FIGS. 48 and 49, the results of the measurement of the optical characteristics in the visible light wavelength region showed that the antireflection member obtained in Example 14 was improved in transmittance by 2.0 to 2.3% and reduced in reflectance by 1.5 to 3.3% in comparison with the epoxy-coated substrate (Reference Example 4) to which the nanoparticles were not transferred. Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

Example 15

Fabrication of Antireflection Member Using Transfer Member 4

Hot air (approximately 150 to 200° C.) was applied to a polymethyl methacrylate (PMMA) resin substrate (thickness: 2 mm) by using a heat gun to raise the temperature of the surface of the resin base member to approximately 130° C. In this manner, the surface of the resin base member was plasticized into a flowable polymer state. This surface of the resin base member was brought into contact with the surface of the transfer member fabricated in Example 11 on the side on which the mesoporous-silica nanoparticles were provisionally fixed. Further, after pressing under a pressure of approximately 1.5 kg/cm$^2$ for 10 seconds, the release base member was peeled off. Thus, the nanoparticles were transferred to the surface of the resin base member. After that, the surface of the resin base member in the flowable polymer state was hardened by cooling to room temperature. Thus, an antireflection member having a particle layer of the nanoparticles directly fixed to the surface of the resin base member was obtained.

The obtained antireflection member was observed with an atomic force microscope, and the height profile was measured. The result showed that the mesoporous-silica nanoparticles were almost completely transferred from the transfer member to the surface of the resin base member, and densely arranged in a mono-particle layer (single-particle layer) as shown in FIG. 50. In addition, it was found that the nanoparticles were embedded in the resin base member by about 50 to 70 nm, the average value of depths of portions (nanoparticle-embedded portions) of the nanoparticles embedded in the surface of the resin base member was 60 nm, and the average value of the depths was 35.3% of the average particle diameter. Table 1 shows the obtained results.

Next, the obtained antireflection member (Example 15) and a PMMA substrate for comparison (Reference Example 1) to which the nanoparticles were not transferred were measured for the light transmittance and the light reflectance. FIG. 51 shows a graph showing wavelength dependence of light transmittance of the antireflection member obtained in Example 15 and the PMMA substrate of Reference Example 1. FIG. 52 shows a graph showing wavelength dependence of light reflectance of the antireflection member obtained in Example 15 and the PMMA substrate of Reference Example 1. As is apparent from a comparison between the results of Example 15 and the results of Reference Example 1 shown in FIGS. 51 and 52, the results of the measurement of the optical characteristics in the visible light wavelength region showed that the antireflection member obtained in Example 15 was improved in transmittance by approximately 2.0% and reduced in reflectance by approximately 4.0% in comparison with the PMMA substrate (Reference Example 1) to which the nanoparticles were not transferred. Note that Table 2 shows the highest transmittance and the lowest reflectance of the obtained antireflection member. Further, a transparency evaluation test was conducted based on visual observation, and the result was that the antireflection member was substantially completely transparent. Table 2 shows the obtained results.

Moreover, the obtained antireflection member was subjected to the tape peel test and the cotton abrasion test, and the results were that no detachment of the nanoparticles from the surface of the antireflection member was observed. Table 2 shows the obtained results.

(Results of Evaluation Tests)

As is apparent from a comparison between the results of Examples 1 to 15 and the results of Comparative Examples 1 to 5 shown in Tables 1 and 2 and FIGS. 1 to 52, it was found that an antireflection member having a sufficiently good antireflection performance and a sufficiently high wear resistance and being excellent in durability against deformation of a base member was obtained in each of Examples 1 to 15. In addition, it was found that such an antireflection member was easily obtained by the method for producing an antireflection member in each of Examples 1 to 15, and the production method was easily applied also to a resin base member having a curved surface or a complicated shape. In sum, the following were found out. Specifically, the antireflection member obtained in each of Examples 1 to 15, in which the nanoparticles were directly fixed to the resin surface, was improved in optical characteristics. Further, the antireflection member had sufficient mechanical characteristics, and was excellent in durability against deformation of the base member. Moreover, the antireflection member was easily obtained.

INDUSTRIAL APPLICABILITY

As described above, according to the present invention, it is possible to provide an antireflection member having a sufficiently good antireflection performance and a sufficiently high wear resistance and being excellent in durability against deformation of a base member. In addition, according to the present invention, it is possible to provide a method for producing an antireflection member which makes it possible to easily obtain the above-described antireflection member of the present invention and which can be easily applied also to a resin base member having a curved surface or a complicated shape, as well as a transfer member which can be used in the method to obtain an antireflection member in a simple and efficient manner.

Accordingly, the antireflection member of the present invention, which is excellent in antireflection performance, wear resistance, and durability against deformation of the base member, is useful as an antireflection member used as a material for a display device such as a display, windshield glass for a vehicle or the like, etc.

What is claimed is:

1. An antireflection member, comprising:
a resin base member; and
a particle layer comprising mesoporous-silica nanoparticles directly fixed to a surface of the resin base member without any other substance present therebetween, the mesoporous-silica nanoparticles being surface-hydrophobized mesoporous-silica nanoparticles having surfaces to which alkyl groups as hydrophobic groups are introduced,
wherein the nanoparticles are at least partially embedded in the surface of the resin base member,
the nanoparticles are arranged in a mono-particle layer to form the particle layer, and
in the antireflection member, a ratio of an area occupied by the nanoparticles to an entire area of a surface of the antireflection member on which the particle layer is formed is in a range from 40 to 91%.

2. The antireflection member according to claim 1, wherein
the nanoparticles have an average particle diameter of 50 to 300 nm, and
an average value of depths of portions of the nanoparticles embedded in the surface of the resin base member is 5 to 70% of the average particle diameter.

3. A transfer member, comprising:
a release base member; and
mesoporous-silica nanoparticles provisionally fixed to a surface of the release base member in a detachable state, while forming a mono-particle layer, the mesoporous-silica nanoparticles being surface-hydrophobized mesoporous-silica nanoparticles having surfaces to which alkyl groups as hydrophobic groups are introduced,
wherein, in the transfer member, a ratio of an area occupied by the nanoparticles to an entire area of a surface of the transfer member on which the nanoparticles are provided is in a range from 40 to 91%.

4. The transfer member according to claim 3, wherein
the nanoparticles have an average particle diameter of 50 to 300 nm, and
an average value of depths of portions of the nanoparticles embedded in the surface of the release base member is 2 to 20% of the average particle diameter.

5. A method for producing an antireflection member, comprising the steps of:
embedding mesoporous-silica nanoparticles arranged on a surface of a resin base member at least partially in the surface of the resin base member placed in a flowable polymer state, the mesoporous-silica nanoparticles being surface-hydrophobized mesoporous-silica nanoparticles having surfaces to which alkyl groups as hydrophobic groups are introduced; and
fixing the nanoparticles directly to the surface of the resin base member without any other substance present therebetween by hardening the surface of the resin base member in the flowable polymer state to thereby obtain the antireflection member according to claim 1.

6. The method for producing an antireflection member according to claim 5, further comprising the step of removing mesoporous-silica nanoparticles which have not been fixed to the surface of the resin base member.

7. The method for producing an antireflection member according to claim 5, wherein
the surface of the resin base member is plasticized into the flowable polymer state by subjecting the surface of the resin base member to at least one plasticizing treatment selected from the group consisting of a solvent vapor treatment, a heat treatment, and a gas treatment.

8. The method for producing an antireflection member according to claim 5, wherein
the resin base member comprises a thermosetting resin or a light-curable resin, and the nanoparticles are arranged on the surface of the resin base member in an unhardened and flowable polymer state, and are at least partially embedded in the surface.

9. A method for producing an antireflection member according to claim 5, further comprising the step of bringing a transfer member into contact with the resin base member to arrange the mesoporous-silica nanoparticles on the surface of the resin base member by transfer, the transfer member comprising:

a release base member; and mesoporous-silica nanoparticles provisionally fixed to a surface of the release base member in a detachable state, while forming a mono-particle layer, the mesoporous-silica nanoparticles being surface-hydrophobized mesoporous-silica nanoparticles having surfaces to which alkyl groups as hydrophobic groups are introduced.

* * * * *